United States Patent
Becerra Morales et al.

(10) Patent No.: US 11,720,879 B2
(45) Date of Patent: *Aug. 8, 2023

(54) METHOD, DEVICE AND SYSTEM FOR THE TRANSFER OF DATA

(71) Applicant: mycashless SAPI de CV, Mexico City (MX)

(72) Inventors: Enrico Becerra Morales, Mexico City (MX); Yong De Piao, Shenyang (CN)

(73) Assignee: MYCASHLESS SAPI DE CV, Mexico City (MX)

(*) Notice: Subject to any disclaimer, the term of this patent is extended or adjusted under 35 U.S.C. 154(b) by 0 days.

This patent is subject to a terminal disclaimer.

(21) Appl. No.: 17/819,223

(22) Filed: Aug. 11, 2022

(65) Prior Publication Data
US 2022/0391877 A1  Dec. 8, 2022

Related U.S. Application Data

(63) Continuation of application No. 16/886,495, filed on May 28, 2020, now Pat. No. 11,455,616.

(30) Foreign Application Priority Data

May 31, 2019  (MX) .................. MX/A/2019/006412

(51) Int. Cl.
*G06Q 20/32* (2012.01)
*G06Q 20/40* (2012.01)
(Continued)

(52) U.S. Cl.
CPC ....... *G06Q 20/3274* (2013.01); *G06F 21/602* (2013.01); *G06F 21/6209* (2013.01);
(Continued)

(58) Field of Classification Search
None
See application file for complete search history.

(56) References Cited

U.S. PATENT DOCUMENTS

2012/0151293 A1* 6/2012 Beals ................... G06K 7/1095
714/755
2013/0111208 A1 5/2013 Sabin et al.
(Continued)

*Primary Examiner* — Kristy A Haupt
(74) *Attorney, Agent, or Firm* — Heslin Rothenberg Farley & Mesiti PC

(57) ABSTRACT

A method and system for transferring encrypted data from a first electronic device to a second electronic device. The method includes the steps of displaying a first encrypted two-dimensional code at the output interface of the first electronic device, reading the first encrypted two-dimensional code with the input interface of the second electronic device, and decrypting the first two-dimensional code with the second electronic device, generating a second encrypted two-dimensional code with the second electronic device, and displaying the second encrypted two-dimensional code on the output interface of the second electronic device, reading the second two-dimensional code encrypted with the input interface of the first electronic device and decrypting the second two-dimensional code with the first electronic device and generating an action on the first electronic device based on the second decrypted two-dimensional code. The second two-dimensional code is a plurality of two-dimensional codes.

15 Claims, 32 Drawing Sheets

(51) Int. Cl.
*G06Q 20/38* (2012.01)
*G06F 21/62* (2013.01)
*G06K 7/14* (2006.01)
*G06K 19/06* (2006.01)
*G06F 21/60* (2013.01)
*G06Q 20/34* (2012.01)

(52) U.S. Cl.
CPC ......... *G06K 7/1417* (2013.01); *G06K 7/1439* (2013.01); *G06K 19/06037* (2013.01); *G06Q 20/322* (2013.01); *G06Q 20/3276* (2013.01); *G06Q 20/3415* (2013.01); *G06Q 20/3829* (2013.01); *G06Q 20/401* (2013.01)

(56) References Cited

U.S. PATENT DOCUMENTS

| 2015/0178721 | A1 | 6/2015 | Pandiarajan et al. |
| 2016/0042485 | A1* | 2/2016 | Kopel ................ G06Q 20/3276 705/13 |

* cited by examiner

METHOD, DEVICE AND SYSTEM FOR THE TRANSFER OF DATA

CROSS REFERENCE TO RELATED APPLICATIONS

This Application is a continuation application of U.S. Ser. No. 16/886,495, filed on May 28, 2020, entitled, METHOD, DEVICE AND SYSTEM FOR THE TRANSFER OF DATA, which claims priority to Mexico Patent Application No. MX/a/2019/006412, filed on May 31, 2019, both of which are incorporated in their entirety herein.

FIELD OF INVENTION

This invention refers to methods, devices and systems for the transfer of data without active connections, such as an Internet connection, using a mobile devices' reading device, such as an optical reading device, and a Secure Animated Response (SAR) code.

BACKGROUND

Computer systems and networks facilitate data transfer processes. It is common in the art for data transfer, e.g. in a transaction, to be performed by two devices, such as two mobile devices that require an active connection, such as a connection to a network, to perform authentication and security operations, to access user accounts, to verify data, and to ensure that at least one of the two devices is authorized to perform the data transfer.

Occasionally, at least one of the two devices may not have a connection to a data network, such as the Internet, while it is still desirable to carry out the data transfer using the device. In the art, this is solved by using wireless technologies that use short radio waves, such as Bluetooth technology or Near Field Communications (NFCs).

In methods that use QR codes, the QR codes are generated on mobile devices which have a connection to a network, such as a mobile network with an Internet connection. An example of this is given in US 2015/0178721. US 2013/0111208 provides techniques for authentication via a mobile device.

In the prior art there is no method, device or system that is capable of carrying out an active offline communication, such as a connection to a network, that performs authentication and security operations, to access accounts of the user to verify data, and to ensure that at least one of the two devices is authorized to carry out the data transfer.

It is therefore necessary to provide methods, devices and systems capable of communication without an active connection, e.g. to a network or by means of an NFC, that provide the required security for data transfers wherein high security is needed, such as e.g. a financial transaction.

BRIEF DESCRIPTION OF THE INVENTION

A Secure Animated Response (SAR) code is a set of encrypted quick response (QR) codes or any other two-dimensional code, such as e.g. a Universal Product Code (UPC). The SAR code is used to transfer data, wherein the devices that are being used in the transfer are validated while the nodes of the devices do not have an active connection to the network, thus still allowing a safe and fast transfer of data.

Unlike NFCs, the SAR code requires a direct line of sight between the QR code and an optical reading device, such e.g. as a camera or a reader, enabling the optical reading device to obtain an image of the code. As a result thereof, QR codes cannot be listened in by third-party devices. While the QR code can be kept sufficiently secure by limiting the time that it is displayed or exhibited and by monitoring the QR code as regards its line of sight, the code could be subject to decryption. A SAR code, on the other hand, is a sequence of QR codes in which at least one of the QR codes is valid. The present invention displays the SAR code as a video, wherein the optical reading device obtains all the images, and the device connected to the optical reading device, by means of at least one processor and one memory, and identifies the at least one valid QR code and decrypts the information to be transferred.

The system preferably requires at least two devices, each device having a processor, a flash memory and a storage memory, an input/output interface, such as e.g. a screen and a camera, a keyboard, etc., and a communication interface. However, the system can understand and work with any of the two complete Turing devices that can drive the one-way communication, e.g. one device can provide an output, such as on a screen, and the second device can receive an input, such as with a camera. A device, on the user side, can be replaced with a chip containing NFC technology. For the generation of the SAR code, in a first device, such as e.g. a first mobile device, the data to be transferred is encrypted with an encryption key and with a private key, a set of data that is encrypted with encryption standards, such as e.g. a 256-bit advanced encryption standard (AES), thereby being generated. A frame number is added to the encrypted data, and a set of QR codes are generated, wherein at least one QR code includes the encrypted data. The SAR code is displayed on the first device in a video format, the set of QR codes being sequentially or randomly displayed. The reading of the SAR code is carried out in a second device, such as e.g. a second mobile device, which reads the SAR code by means of an optical reader, such as e.g. a camera, capturing the SAR as images. The at least one valid code within the SAR code is identified in the second device, wherein the encrypted data is integrated into the at least one valid code. The at least one valid code is then decrypted with a decryption key, the frame number being deleted and the transfer information extracted.

With the above, different data transfers can be carried out. Exemplarily, a data transfer such as a financial or goods transaction can be carried out with the method of the present invention, even without having an active connection to a network, such as the Internet. For example, a reload, a purchase or a refund can be envisaged within the data transfers.

An object of the present invention is to provide a method, a device and a system for the transmission of data between at least two electronic devices without an active network connection or a connection between the two devices.

Another potential object of this invention is to provide a method, a device and a system for the efficient transfer of data between at least two electronic devices without the need for external devices and systems.

Another potential object of the invention is to provide a method, a device and a system for the transmission of data between at least two electronic devices in a secure manner, by carrying out authentication and security operations, accessing the accounts of the parties by verifying data, and ensuring that at least one of the two devices is authorized to carry out the data transfer.

BRIEF DESCRIPTION OF THE FIGURES

These and other objects will be evident when the following description is taken into account in correlation with the figures detailed below.

DETAILED DESCRIPTION OF THE INVENTION

Definitions

Figure 1:
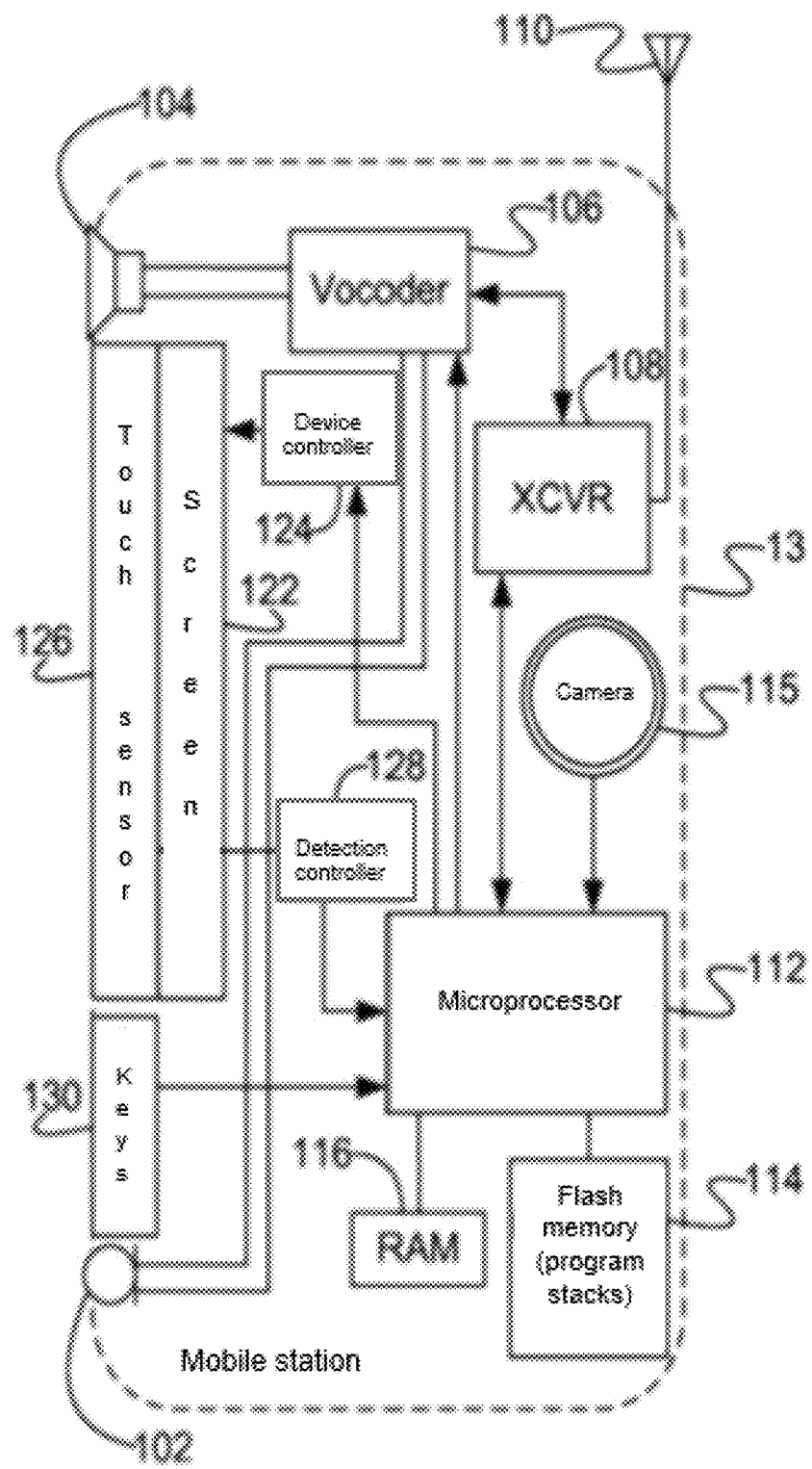
FIG. 1 is a high-level block diagram of at least one of the two devices in this invention, such as a mobile device, of a preferred embodiment.

Device: Device is understood to mean any type of mobile device such as e.g. a smartphone, a mobile computer, a personal digital assistant (PDA), a tablet, a smartwatch or another electronic 'smart device'. Likewise, a device can be a bracelet containing an NFC-compatible chip or a fitness tracker that may or may not have a display; if it does not have a display, it is preferred that the fitness tracker have an NFC-compatible chip.

Card: Any type of card, including, but not limited to, a credit or debit card, a bank card, other types of transaction cards, a driver's license, a passport, other identification cards, or any other type of card that may contain personal information.

Two-dimensional code: At least a QR code with information that is readable by the devices used in the invention; more than one QR code can be used by the method of the present invention. One or more two-dimensional codes are needed to carry out the method and the system of the present invention.

SAR code: A video that comprises at least two QR codes, wherein the video is displayed in an animated manner.

Generally, both the two-dimensional code and the SAR code include information that is necessary for the validation of a transaction of information, information that in an illustrative but not limiting way may include a date, an event number or name, a provider's name, order numbers, order data, etc. In general, it is preferred that security animations be included in order for it, if touched on a touchscreen, to move with the movement of a finger to ensure the image is not a screen shot or fake video. Other security systems known and to be known in the art can also be deemed to be included in the present invention in a non-limiting but exemplary way.

Data Signal or Network Connection: Data signal or network connection refers to the processing and transmission of data (a bitstream) over a point-to-point or point-to-multipoint communication channel by means of wired or wireless connections through WAN-, MAN- and/or LAN-type networks, wherein, in one embodiment, the WAN connection can be the Internet.

In the described methods, there can be sub-methods that can be carried out in a face-to-face embodiment, wherein the devices have at least one camera on the same side as the screen and the reading/scanning method is carried out without intervention of the operator and/or the user when the respective mobile device is flipped-over.

The following detailed description may indistinctly refer to the figures. In the following detailed description, several specific details are disclosed as examples to provide for a complete understanding of the relevant concepts. On other occasions, methods, processes, components and/or circuits have been described at a relatively high level, without detail, to avoid obscuring the teachings herein in an unnecessary manner.

Several methods and systems described herein are related to the generation of two-dimensional codes, preferably at least two two-dimensional codes, such as a QR code or a SAR video with at least two QR codes and more preferably a plurality of QR codes for secure communication between/to devices 13, such as a mobile device.

FIG. 1 shows a block diagram illustration of a device 13, such as a mobile device. Mobile device 13 may be a smartphone or it may be another portable device, such as a personal digital assistant (PDA), a tablet, a smartwatch, a smart headphones/glasses, and/or a similar device. In another embodiment, mobile device 13 may be a customized device such as a smart card with a display built in the card (e.g., e-ink, OLED, etc.), a processor, a built-in power supply and/or other suitable elements. In the embodiment, the headset of mobile device 13 works like a standard digital cordless phone. For that function, the device includes a microphone 102, a loudspeaker 104, and coding and decoding (vocoder) circuits 106 for an input and output audio signal.

For digital wireless communications, device 13 also includes at least one digital transceiver (XCVR) 108 connected to an antenna 110. The concepts discussed herein include embodiments of device 13 that use any digital transceiver pursuant to current or future digital wireless communication standards. Device 13 can also be capable of analog operation via legacy network technology. The mobile device may also include several transceivers configured for communication over different types of networks, such as Wi-Fi, Bluetooth, infrared, mobile or similar networks.

Device 13 includes a screen 122 for displaying messages, menus, applications, etc., including two-dimensional codes such as the QR and SAR codes generated by the applications running on device 13. Keypads 130, touch sensors 126 and touch controllers 128 provide a data input interface for receiving selections and commands from the user. Screen 118, keypads 130 and touch sensor 126 are physical elements that provide a graphical or contextual user interface. Other physical elements of the mobile device may be included additionally and incorporated into the operation of device 13 and the user interactions, such as an inertial measurement sensor, biometric sensors, spatial image sensors and the like. Various combinations of keyboard 120, screen 118, microphone 102 and speaker 104 can be used as output elements of the graphical user interface (GUI), for multimedia communications, e.g. audio or video. Of course, other interface elements may be used, such as a mouse, as is the case in certain PDAs or smartphones.

Device 13 additionally includes one or more cameras 115 that are used to capture static images or video footage. Camera 115, in particular, can be used to capture images of two-dimensional codes, such as a QR code or a SAR video with at least two QR codes and more preferably a plurality of QR codes, to be processed in a QR reading application running on device 13. Camera 115 provides captured image data to processor 112 for storage in a memory 114, 116 and/or processing.

In addition to standard data communication and telephone input/output, the user interface elements can also be used for displaying menus and other information to the user and the user's selection entries, including any that is needed during the dynamic generation of QR codes.

Microprocessor 112 acts as a programmable controller for device 13, wherein it controls the operations of device 13 in accordance with the commands executed, for all standard operations, and for operations involved in the functionalities related to two-dimensional codes under the considerations herein. For example, mobile device 13 includes a flash-type programming memory 114 for storing various settings programming and configuration routines.

Device 13 may also include a random-access memory (RAM) 116 for a working data processing memory. Of course, other storage devices or configurations may be added to or replaced with those in this example. In one embodiment of the present invention, flash-type memory 114 stores commands such as reboot routines, controller information, an operating system, vocoder call and control processing routines, and a variety of other applications, such as browsers, messaging services and the like. Memories 114 and 116 also store other information, such as telephone numbers and server addresses, downloaded data such as multimedia content and various user-entered data such as account configuration data. The information stored in memory 114 is normally loaded and executed in microprocessor 112.

As mentioned above, the devices 13 include a processor, and a memory 114 that comprises algorithms configured so that the device's processor is capable of performing various desired functions, including the functions described below with the two-dimensional codes. As mentioned below, the functions relating to the generation and display of two-dimensional codes via graphical user interfaces of the devices 13 can be implemented in computers with the abovementioned components. Special-purpose devices may also be used; such devices must be capable of implementing the authentications that are discussed below without a connection to a network. In general terms, the functions related to the generation and display of two-dimensional codes via a graphical user interface of devices may be implemented in any complete Turing device 13 that includes a graphic display; the complete Turing device preferably includes the previously mentioned components.

The method of the present invention can be carried out on a general-purpose computer that can function as an application server and/or that functions as a device 13. In operation, the method can be stored on a platform of the general-purpose computer. Likewise, the method can be stored in other locations and/or carried to be loaded into the appropriate general-purpose computer system. Carrying out the method in the computer's processor enables the implementation of the methodology for dynamically generating and processing two-dimensional codes, such as QR codes for the secure communication to/from devices 13, essentially in the manner discussed and illustrated herein.

Figure 2:
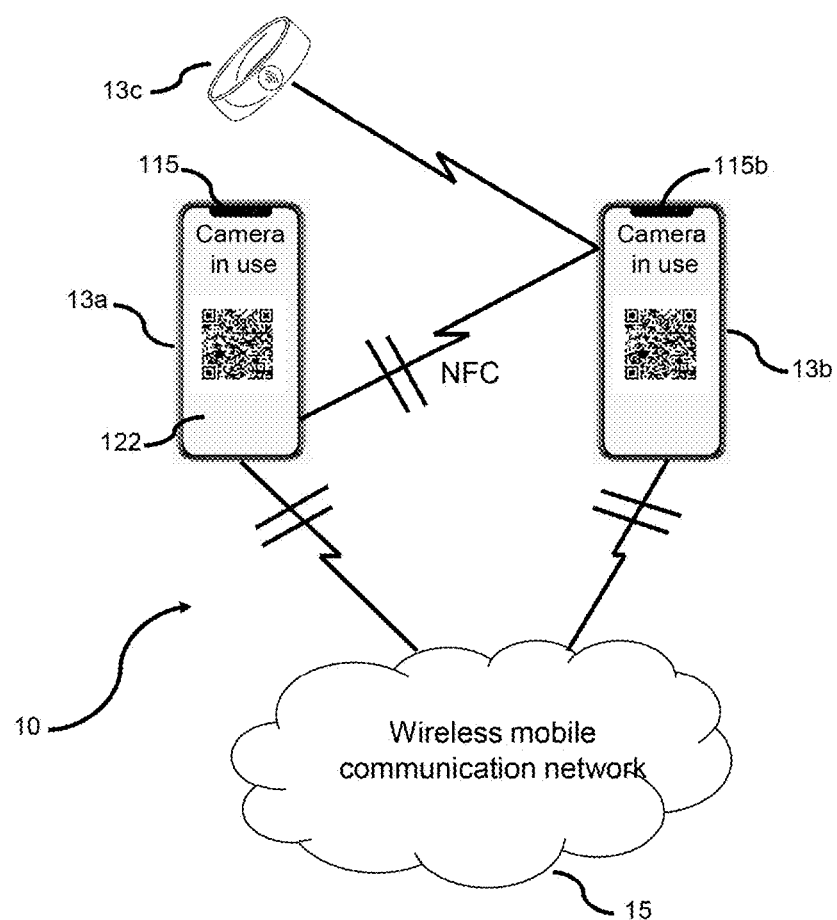
FIG. 2 is a high-level functional block diagram of an illustrative device/communication system providing communication between devices with the two-dimensional code generation service of a preferred embodiment.

FIG. 2 illustrates a system 10 that provides a variety of mobile communication services, including communications for dynamically generating two-dimensional codes for a secure communication from/to devices 13a, 13b. The example shows two mobile devices 13a and 13b without an active connection to mobile wireless communications network 15. Mobile devices 13a and 13b (referenced as devices 13) are examples of devices that can be used for the two-dimensional code generation service. However, the method of the present invention can be carried out with similar devices having the components mentioned above in relation to FIG. 1. In each case, the device does not need an active connection to a network, such as mobile wireless communication network 15, the Internet, a LAN, or any other type of wired or wireless connection. The system may use another device 13 that is not a mobile device, such as e.g. among others a general-purpose computer, a bracelet 13c containing an NFC-compatible chip, or a fitness tracker that may or may not have a display. If it does not have a display, it is preferred that the fitness tracker has an NFC-compatible chip. It is important to stress that during the execution of the method of the present invention there is no network 15 or connection to a network 15 from/to the devices 13, as could happen in saturated events, such as e.g. a music festival. The devices can then be connected to a network 15 with current or future standards. As mentioned, one or both of the devices can operate in the modes described herein without a data network connection, a telephone network connection and/or any suitable communication channel outside the visual communication channel enabled through the system and the method described herein. The devices may not have an active NFC either, and in some variations, the active NFC may be disabled, so in some implementations it may be useful to prevent the theft of transaction data. However, the system and the method for the transfer of data described herein can still operate with an existing network connection. Preferably, the system and the method for the communication of data are implemented without a direct dependence on a wireless digital communication, although it can be used when available.

The devices 13 can be capable of generating two-dimensional code services without an active connection to network 15. User devices 13a and 13c are capable of executing the two-dimensional code generator service, as well as applications written in different programming languages. Likewise, operator devices 13b are capable of executing the two-dimensional code generator service, as well as applications written in different programming languages. Devices 13a-13c interact with each other in such a way that, without an NFC, they are able to scan and/or read two-dimensional codes placed within a line of sight, such as two-dimensional codes displayed on mobile devices placed in a reader. The reader can be a camera 115 of devices 13a-13c, a barcode reader or any other suitable peripheral device. Device 13a-13c may include an incoming interface and an outgoing interface used for interacting with the users, for receiving commands and for providing notifications and other outgoing information to the user/operator.

The devices 13 can be mobile devices such as smartphones, personal assistants or general computers, among others, as well as a bracelet containing an NFC-compatible chip or a fitness tracker. The devices are capable of executing applications for a two-dimensional code generator service as well as for a two-dimensional code reader service, wherein the two-dimensional code generator and reader services can be written in different languages and be executed in different environments, wherein some of these devices can employ a multi-tasking operating system.

The devices 13 usually include a camera 115 that can be used to capture images including two-dimensional codes. A device 13 running a two-dimensional code reading application can use a camera as a reader of the two-dimensional code to obtain or scan a QR code. The devices 13 also include an outgoing interface, such as a screen 122, for displaying two-dimensional codes that can be read by a two-dimensional code reader of another device.

The two-dimensional code reader and generator applications, which include the two-dimensional code reader and generator services, include authentication services configured to authenticate the codes generated and displayed by the devices 13. The authentication service may also include services related to encryption, such as the generation, distribution and/or authentication of encryption keys, including pairs of encryption/description keys.

Various methods implemented in connection with the system described herein and utilizing the method for the offline communication of data are described herein, however the process and the use of SAR-based data communication can be tailored to other suitable interactions of the user, data management, account management, authentication and/or suitable forms of coordination between two devices.

Figure 3:
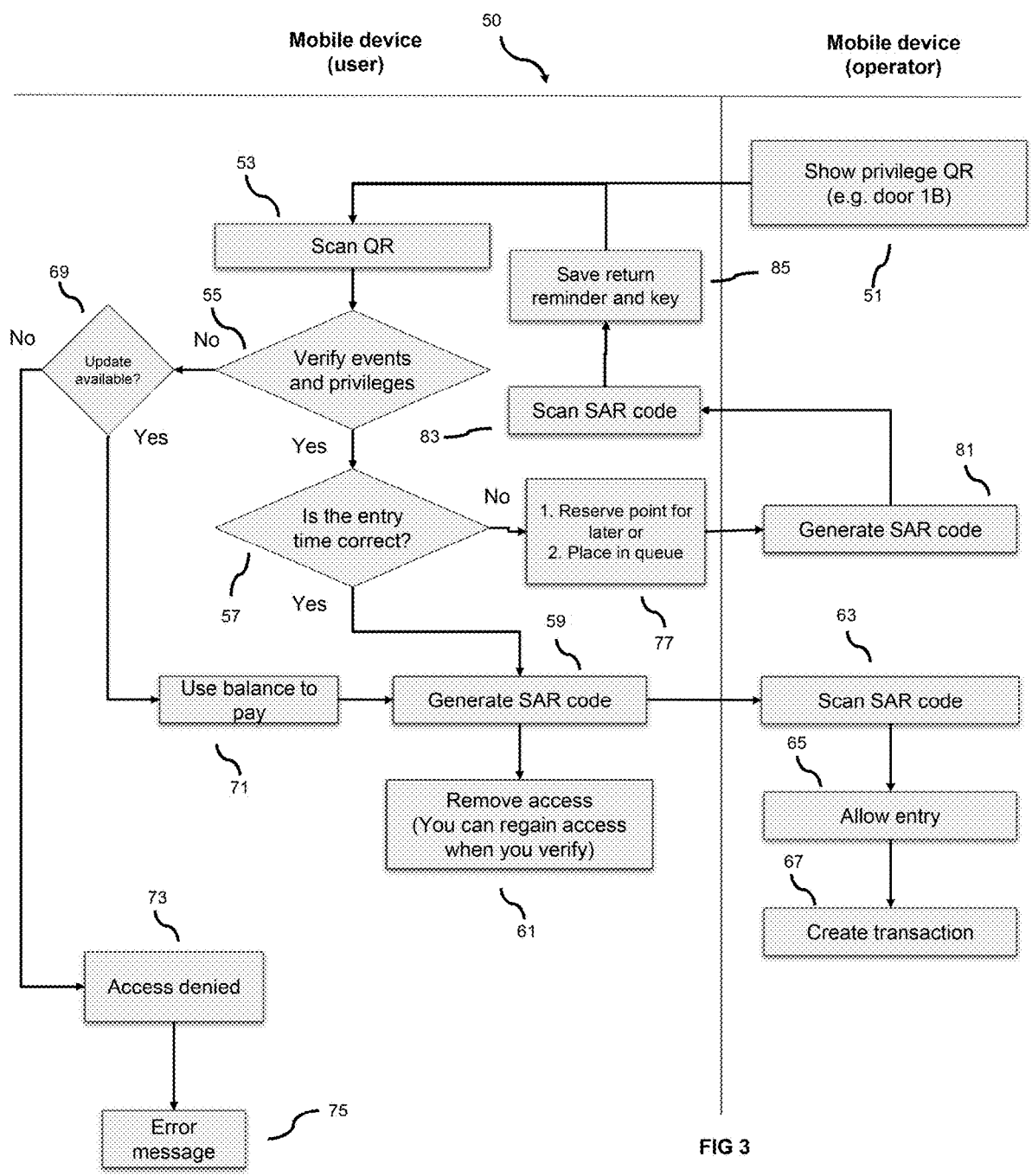
FIG. 3 is a flowchart that illustratively shows the steps of the method for an access to the site of a preferred embodiment.

FIG. 3 is a flowchart that illustratively shows the steps of method 50 for an access to the site by a user, two-dimensional codes being generated and read by the devices 13. The method starts when device 13b of the operator displays 51 a two-dimensional code by means of its screen 122, which is scanned or captured 53 by camera 115 of user device 13a. The method subsequently verifies the event and the privileges 55 that user device 13a has. If user device 13a indeed has the appropriate event and privileges, the method can check to see whether the entry time is correct 57. If the method confirms that the entry time is correct, a plurality of two-dimensional codes are generated 59, which are displayed as a secure animated response (SAR) code, wherein the plurality of two-dimensional codes can be a plurality of quick response (QR) codes, wherein at least one of the two-dimensional codes includes encrypted information to be validated by operator device 13b. After a plurality of two-dimensional codes are generated 59 and displayed on screen 122 of user device 13a, access 61 to the event is withdrawn and the generated SAR code is scanned and/or read 63 by means of a camera 115b of operator device 13b. By means of the two-dimensional code reader service, the method is able to read all the two-dimensional codes provided in the SAR code and to distinguish the at least one valid two-dimensional code which must be decrypted. The decryption service is capable of decrypting the at least one valid two-dimensional code, validating the information of the two-dimensional code, allowing access 65 to user device 13a and its respective user and creating the transaction 67.

If it is verified that the user does have access to the event or the appropriate privileges 55, the method checks to see whether a potential improvement/upgrade 69 is available. If there is a potential improvement/upgrade 69 available, the method is capable of granting the access and privileges 71 and thus generating the necessary SAR code 59 on user device 13a. Likewise, if a potential improvement/upgrade 69 is available, before granting access and privileges 71, a onsite reload can be sent to user device 13a, a new SAR code for accessing the granted privilege being obtained. If a potential improvement/upgrade 69 is not available, access is denied 73 to user mobile device 13*a* and the user carrying it, and an error message 75 is generated.

If entry time 57 is incorrect, an invitation to return can be generated 77; the invitation to return includes booking a place for a later date or time 77 and putting the invitation to return in a queue 77 related to an specific time or date. Upon this invitation being generated, a new SAR code, which includes the refund time and/or date, is generated 81 on operator device 13*b*, the SAR code that device 13*a* scans 83, and a reminder to return is generated 85 on user device 13*a*.

Figure 3A:
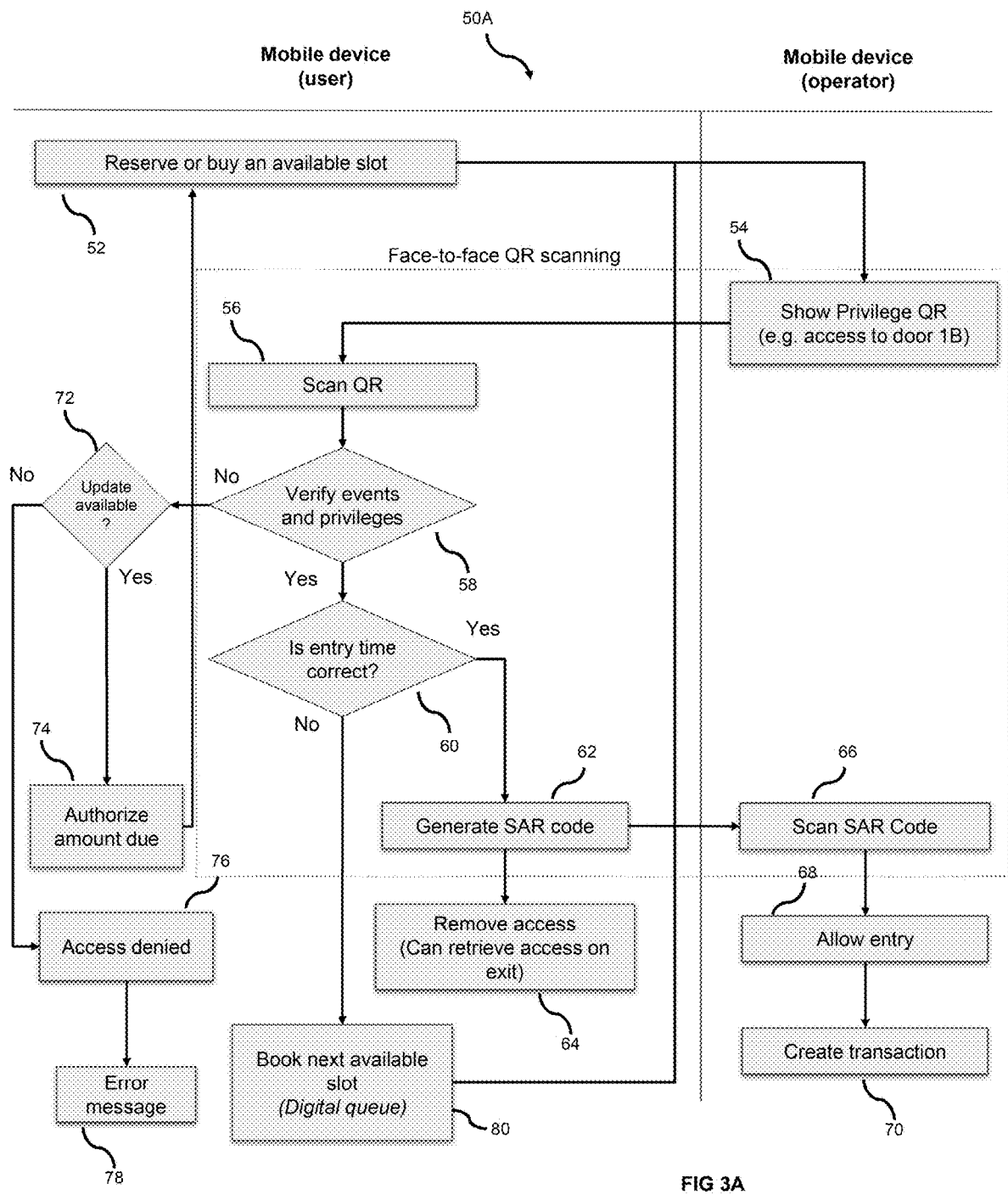
FIG. 3A is a flowchart that illustratively shows the steps of the method for another access to the site of a preferred embodiment.

FIG. 3A is a flowchart that illustratively shows the steps of another method 50A for an access to the site by a user, two-dimensional codes being generated and read by the devices 13. The method starts when device 13*a* of the user books or buys an available slot 52 of an access to an event. Device 13*b* of the operator displays 54 a two-dimensional code by means of its screen 122, which is scanned or captured 56 by camera 115 of user device 13*a*. The two-dimensional code displayed 54 by device 13*b* of the operator may include the average time per ticket and/or the next available shift, if a digital queue is required. The method subsequently verifies the event and the privileges 58 that user device 13*a* has. If user device 13*a* indeed has the appropriate event and privileges, the method can check to see whether the entry time is correct 60. If the method confirms that the entry time is correct, a plurality of two-dimensional codes are generated 62, which are displayed as a secure animated response (SAR) code, wherein the plurality of two-dimensional codes can be a plurality of quick response (QR) codes, wherein at least one of the two-dimensional codes includes encrypted information to be validated by operator device 13*b*. After a plurality of two-dimensional codes 62 are generated and displayed on screen 122 of user device 13*a*, access to the event is withdrawn 64, which could be retrieved on exiting, and the SAR code generated by means of a camera 115*b* of operator device 13*b* is scanned and/or read 66. The sub-method ranging from displaying 54 the two-dimensional code to scanning 66 the plurality of two-dimensional codes can be carried out in a face-to-face embodiment, wherein the mobile devices have at least one camera on the same side as screen 122 and the read/scan method is carried out without the intervention of the operator and/or user regarding turning over the respective mobile device. By means of the two-dimensional code reader service, the method is able to read all the two-dimensional codes provided in the SAR code and to distinguish the at least one valid two-dimensional code which must be decrypted. The decryption service is capable of decrypting the at least one valid two-dimensional code, validating the information of the two-dimensional code, allowing access 68 to user device 13*a* and its respective user and creating the transaction 70.

If it is verified that the user does have access to the event or the appropriate privileges 58, the method checks to see whether an update is available 72. If an update is available 72, the method is capable of authorizing the balance to be paid 74 and thus allowing an available slot to be booked or purchased 52 on user device 13*a*. If a potential update 72 is not available, access is denied 76 to user mobile device 13*a* and an error message is generated 78.

If entry time 60 is incorrect, the next available slot is booked by putting it in a digital queue 80 so that subsequently the operator, by means of their device 13*b*, may display 54 the two-dimensional code through their screen.

Figure 4:
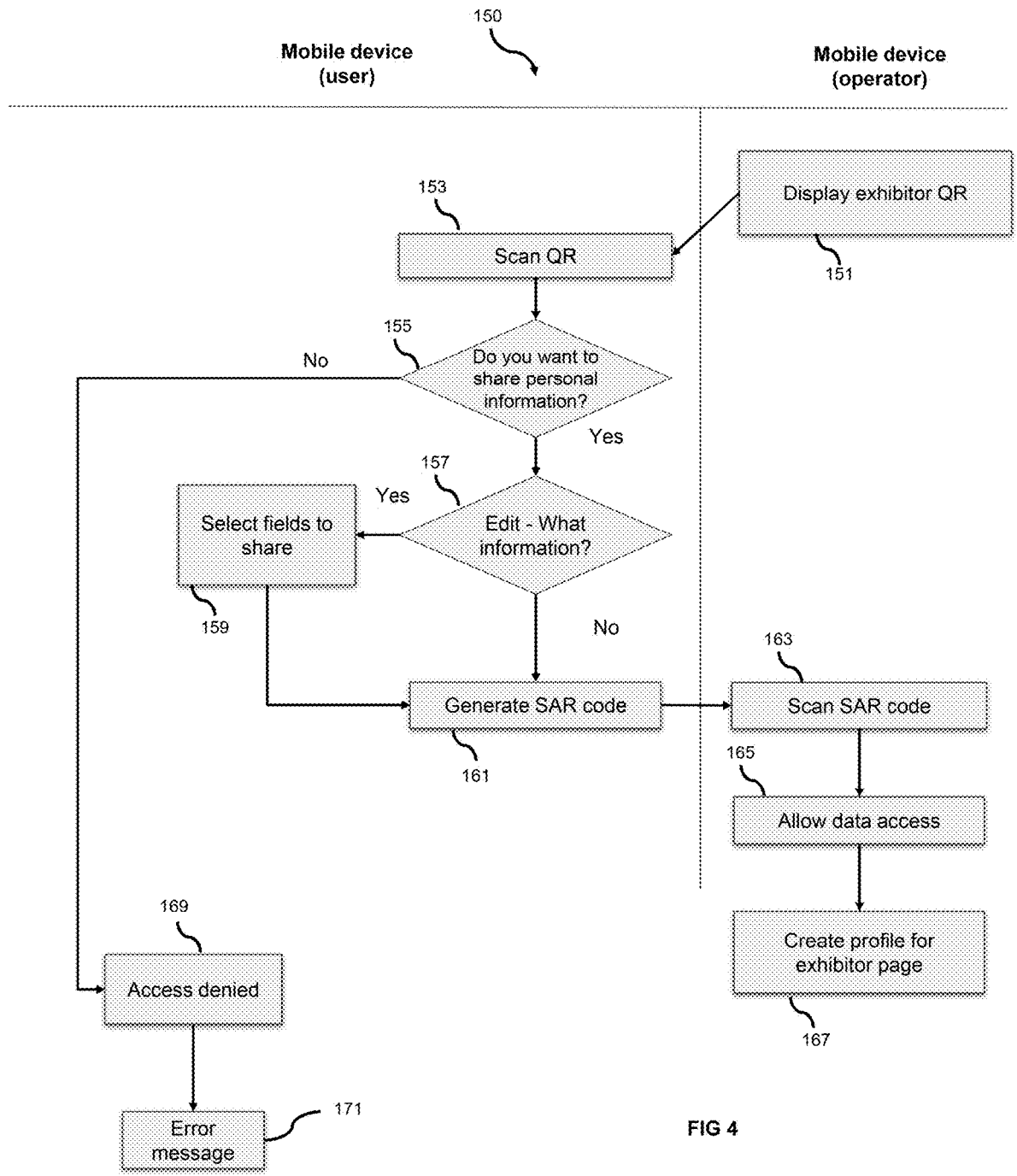
FIG. 4 is a flowchart that illustratively shows the steps of the method for sharing personal information from a user to an operator of a preferred embodiment.

FIG. 4 is a flowchart that illustratively shows the steps of method 150 for sharing personal information from the user to the operator, two-dimensional codes being generated and read by the devices 13. Method 150 starts when operator device 13*b* displays 151 a two-dimensional code by means of its screen 122, which is scanned or captured 153 by camera 115 of user device 13*a*. The method subsequently asks the user whether they want to share personal information 155. If the user selects on user device 13*a* that it wants to share personal information, the method asks the user what information they want to edit 157. If the user wants to edit information, the method allows the user to select on user device 13*a* which fields are going to be shared 159. Otherwise, the method shares all available fields. By selecting which fields are going to be shared 159 or by sharing all fields, a plurality of two-dimensional codes are generated 161, which are displayed as a secure animated response (SAR) code, wherein the plurality of two-dimensional codes can be a plurality of quick response (QR) codes, wherein at least one of the two-dimensional codes includes encrypted information to be validated by operator device 13*b*.

After a plurality of two-dimensional codes are generated 161 and displayed on screen 122 of user device 13*a*, the generated SAR code is scanned and/or read 163 by means of a camera 115*b* of operator device 13*b*. By means of the two-dimensional code reader service, the method is able to read all the two-dimensional codes provided in the SAR code and to distinguish the at least one valid two-dimensional code which must be decrypted. The decryption service is capable of decrypting the at least one valid two-dimensional code, validating the information of the two-dimensional code, allowing access to data 165 on operator device 13*b* and creating a profile 167 for the user of user device 13*a*.

In case the user does not want to share personal information 155, access to the data of user mobile device 13*a* is denied 169 and an error message 171 generated.

Figure 4A:
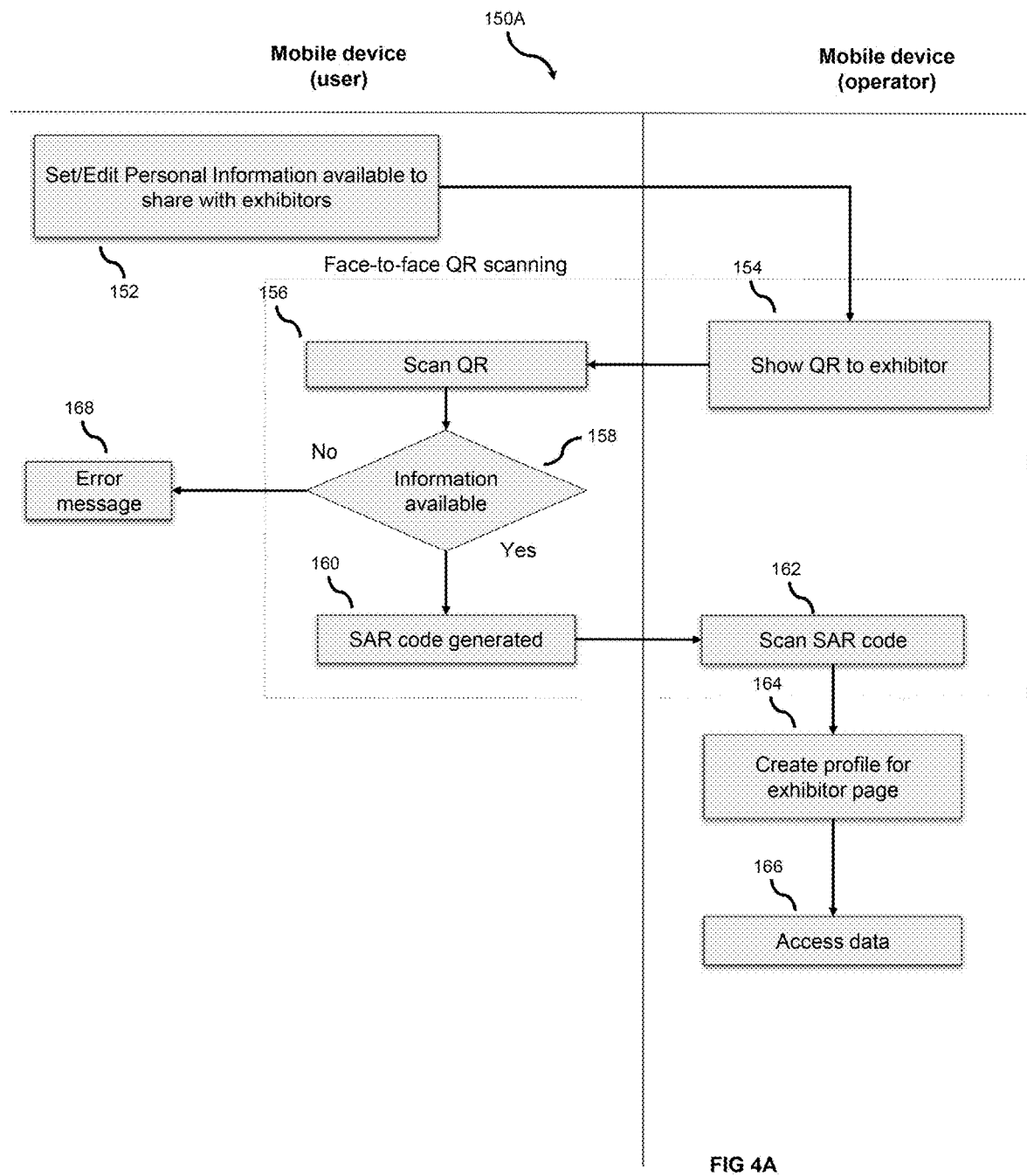
FIG. 4A is a flowchart that illustratively shows the steps of another method for sharing personal information from a user to an operator of a preferred embodiment.

FIG. 4A is a flowchart that illustratively shows the steps of another method 150A for sharing personal information from the user to the operator, two-dimensional codes being generated and read by the devices 13. Method 150A starts when device 13*a* of the user configures and/or edits personal information 152, which is made available for sharing with some device 13*b* of the operator. Device 13*b* of the operator displays 154 a two-dimensional code by means of its screen 122, which is scanned or captured 156 by camera 115 of user device 13*a*. Device 13*a* of the user subsequently determines whether there is personal information 158 available for sharing and, if there is any, a plurality of two-dimensional codes are generated 160, which are displayed as a secure animated response (SAR) code, wherein the plurality of two-dimensional codes can be a plurality of quick response (QR) codes, wherein at least one of the two-dimensional codes includes encrypted information to be validated by operator device 13*b*. After a plurality of two-dimensional codes are generated 160 and displayed on screen 122 of user device 13*a*, the generated SAR code is scanned and/or read 162 by means of a camera 115*b* of operator device 13*b*. By means of the two-dimensional code reader service, the method is able to read all the two-dimensional codes provided in the SAR code and to distinguish the at least one valid two-dimensional code which must be decrypted. The sub-method ranging from displaying 154 the two-dimensional code to scanning 162 the plurality of two-dimensional codes can be carried out in a face-to-face embodiment, wherein the mobile devices have at least one camera on the same side as screen 122 and the read/scan method is carried out without the intervention of the operator and/or user regarding turning over the respective mobile device. The decryption service is capable of decrypting the at least one valid two-dimensional code, validating the information of the two-dimensional code, creating a profile for the user 164 on operator device 13b and accessing the data of the user 166 on operator device 13b.

In case it is determined that there is no personal information 158, access to the data of user mobile device 13a is denied and an error message 168 generated.

Figure 5:
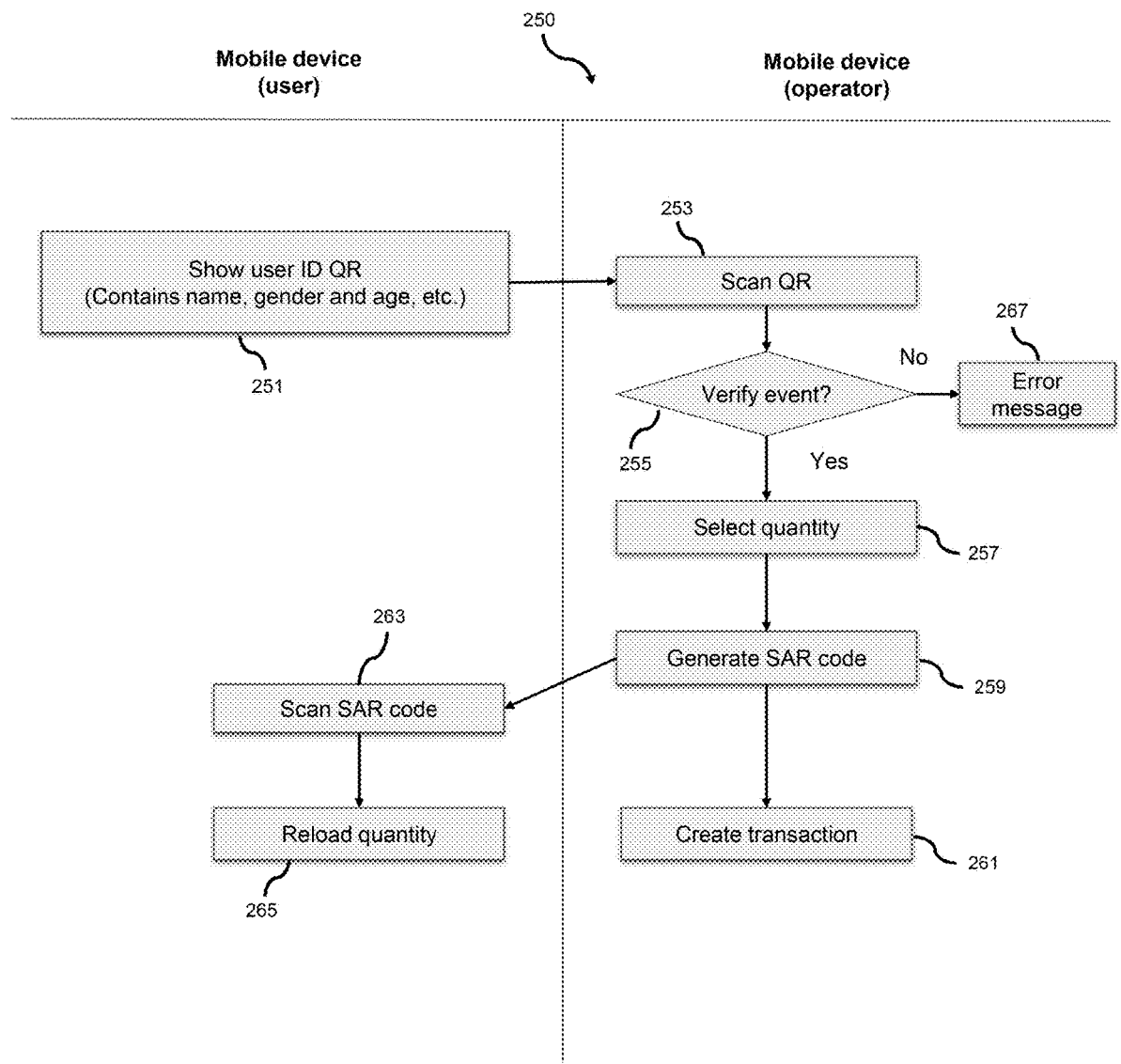
FIG. 5 is a flowchart that illustratively shows the steps of the method for an onsite recharging of a preferred embodiment.

FIG. 5 is a flowchart that illustratively shows the steps of method 250 for an onsite reload, two-dimensional codes being generated and read by the devices 13. Method 250 starts when user device 13a displays 251 a two-dimensional code by means of its screen 122 and it is scanned or captured 253 by camera 115 of operator device 13b. The two-dimensional code may contain information such as the identifier of the event, a name, a code, a gender and an age, among other data. The method then asks whether the identifier of the event corresponds to the event 255 and, if this is not the case, it sends an error message 267 on operator device 13b. If it does correspond, a quantity to be reloaded and a potential payment method, such as e.g. cash or debit/credit, are selected 257. A plurality of two-dimensional codes 259 are generated on operator device 13b, which are displayed as a secure animated response (SAR) code, wherein the plurality of two-dimensional codes can be a plurality of quick response (QR) codes, wherein at least one of the two-dimensional codes includes encrypted information to be validated by user device 13a. After a plurality of two-dimensional codes 259 are generated and displayed on screen 122 of operator device 13b, the generated SAR code is scanned and/or read 263 by means of a camera 115a of user device 13a. By means of the two-dimensional code reader service, the method is able to read all the two-dimensional codes provided in the SAR code and to distinguish the at least one valid two-dimensional code which must be decrypted. The decryption service is capable of decrypting the at least one valid two-dimensional code, validating the information of the two-dimensional code, and allowing the recharging of the selected quantity 265 on user device 13a. By allowing the recharging of the selected quantity 265 on the user's device, a message for validating the transaction can be generated, displaying, for example, the aggregated balance and the new total balance, the transaction being saved to a personal account of the user. Parallel to recharging the selected quantity 265, a transaction is created 261 on operator device 13b. It is clear, in view of FIG. 5, that a person skilled in the art can see the way in which, instead of an onsite reload, a post-reload method, i.e., recharging subsequently to the event, can be carried out, two-dimensional codes being generated and read by the devices.

Figure 5A:
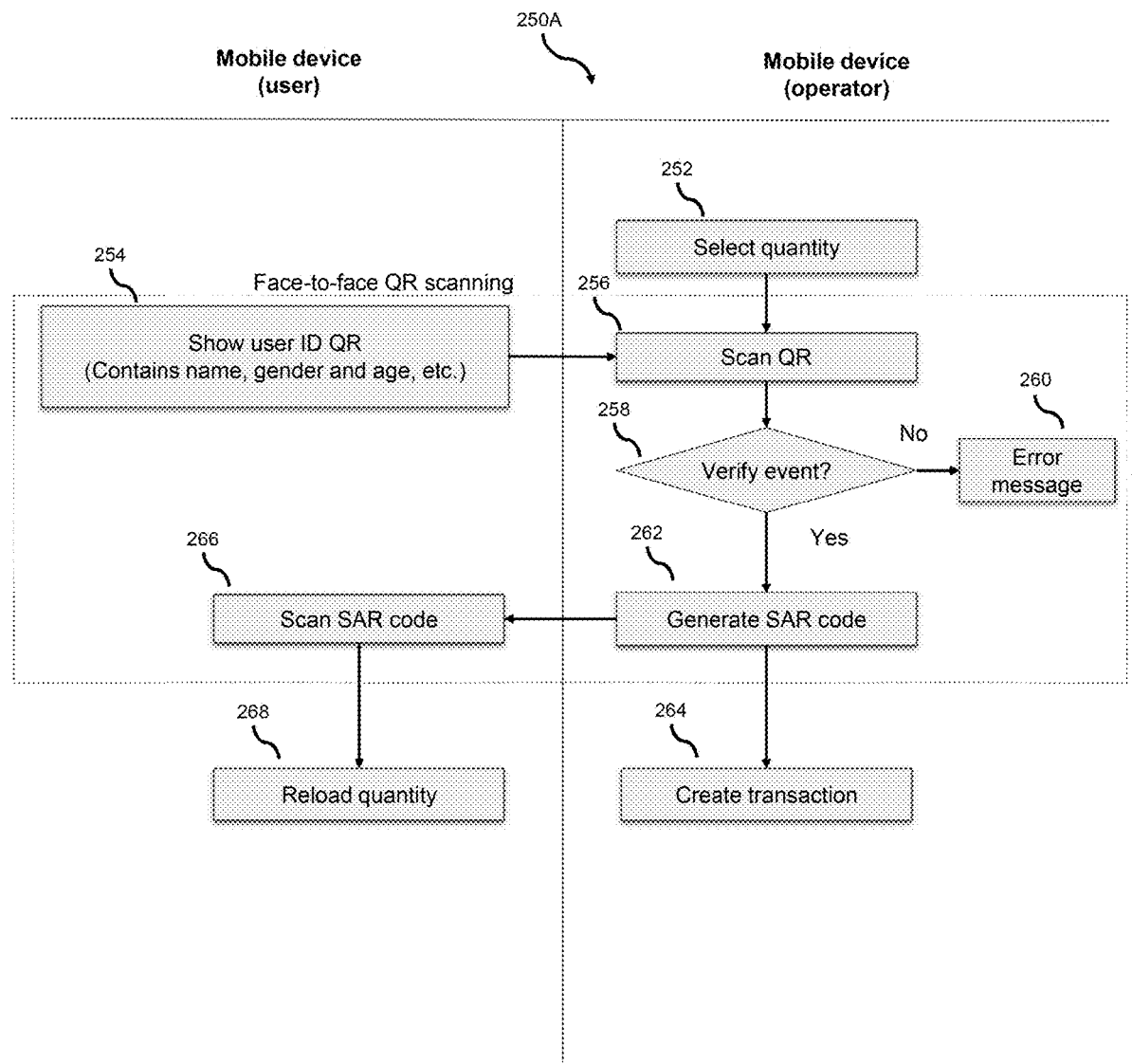
FIG. 5A is a flowchart that illustratively shows the steps of another method for an onsite recharging of a preferred embodiment.

FIG. 5A is a flowchart that illustratively shows the steps of method 250A for an onsite reload, two-dimensional codes being generated and read by the devices 13. Method 250A starts when operator device 13b selects a quantity to be reloaded 252. On user device 13a a two-dimensional code is displayed 254 by means of its screen 122, which is scanned or captured 256 by camera 115 of operator device 13b. The method subsequently checks to see whether the event 258 corresponds and, if this is not the case, it sends an error message 260 to the operator device 13b. If it does correspond, a plurality of two-dimensional codes are generated 262 on operator device 13b, which are displayed as a secure animated response (SAR) code, wherein the plurality of two-dimensional codes can be a plurality of quick response (QR) codes, wherein at least one of the two-dimensional codes includes encrypted information to be validated by user device 13a. After a plurality of two-dimensional codes 262 are generated and displayed on screen 122 of operator device 13b, the generated SAR code is scanned and/or read 266 by means of a camera 115a of user device 13a. The sub-method ranging from displaying 254 the two-dimensional code to scanning 266 the plurality of two-dimensional codes can be carried out in a face-to-face embodiment, wherein the mobile devices have at least one camera on the same side as screen 122 and the read/scan method is carried out without the intervention of the operator and/or user regarding turning over the respective mobile device. By means of the two-dimensional code reader service, the method is able to read all the two-dimensional codes provided in the SAR code and to distinguish the at least one valid two-dimensional code which must be decrypted. The decryption service is capable of decrypting the at least one valid two-dimensional code, validating the information of the two-dimensional code, and allowing the recharging of the selected quantity 268 on user device 13a. By allowing the recharging of the selected quantity 268 on the user's device, a message for validating the transaction can be generated, displaying, for example, the aggregated balance and the new total balance, the transaction being saved to a personal account of the user. Parallel to recharging the selected quantity 268, a transaction is created 264 on operator device 13b. It is clear, in view of FIG. 5A, that a person skilled in the art can see the way in which, instead of an onsite reload, a post-reload method, i.e., recharging subsequently to the event, can be carried out, two-dimensional codes being generated and read by the devices.

Figure 6:
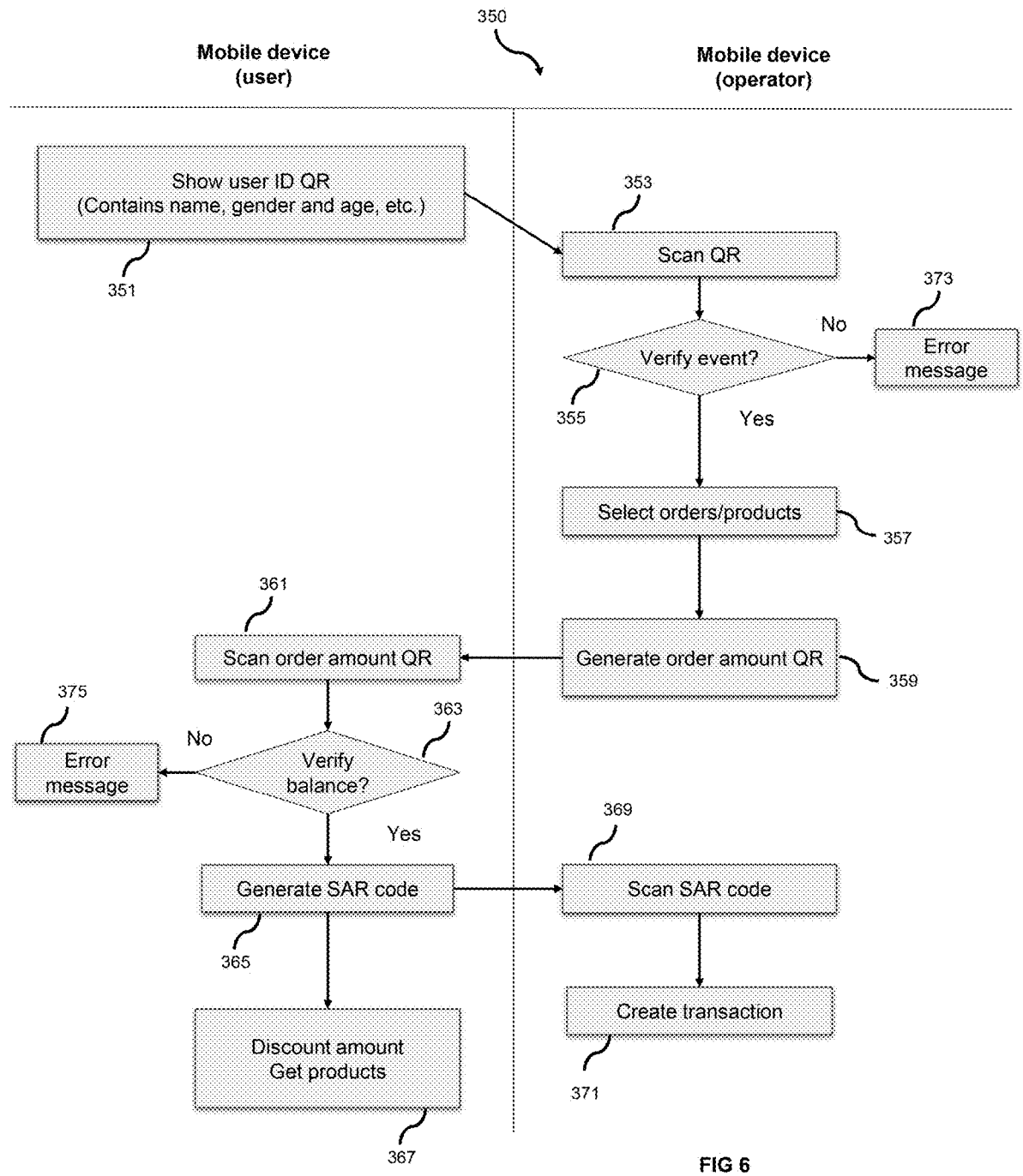
FIG. 6 is a flowchart that illustratively shows the steps of the method for an onsite purchase of a preferred embodiment.

FIG. 6 is a flowchart that illustratively shows the steps of method 350 for an onsite purchase, two-dimensional codes being generated and read by the devices 13. Method 350 starts when user device 13a displays 351 a two-dimensional code by means of its screen 122, which is scanned or captured 353 by camera 115 of operator device 13b. The two-dimensional code may contain information such as the identifier of the event, a name, a code, a gender and an age, among other data. The method then asks whether the identifier of the event corresponds to the event 355 and, if this is not the case, it sends an error message 373 on operator device 13b. If it does correspond, the order(s)/product(s) to be purchased is(are) selected 357 and a plurality of two-dimensional codes 359 are generated with the purchase order. In case the two-dimensional codes are plurality, they are displayed as a secure animated response (SAR) code, wherein the at least one two-dimensional code can be a plurality of quick response (QR) codes, wherein the at least one two-dimensional code includes encrypted information to be validated by user device 13a. The purchase order contains information such as the identifier of the event, a code, a quantity, the transaction number, the user's name, the price and the amount, among others. After a plurality of two-dimensional codes 359 are generated and displayed on screen 122 of operator device 13b, the generated SAR code is scanned and/or read 361 by means of a camera 115a of user device 13a. By means of the two-dimensional code reader service, the method is able to read all the two-dimensional codes provided in the SAR code and to distinguish the at least one valid two-dimensional code which must be decrypted. The decryption service is capable of decrypting the at least one valid two-dimensional code and validating the information of the two-dimensional code. Subsequently, the method checks the balance 363 and, if it cannot verify the balance 363, generates and sends an error message 375. If the balance can be verified 363, it generates a second plurality of two-dimensional codes 365 with the balance, which are displayed as a secure animated response (SAR) code, wherein the second plurality of two-dimensional codes can be a plurality of quick response (QR) codes, wherein at least one of the two-dimensional codes includes encrypted information to be validated by operator device 13b. The two-dimensional code with the verified information contains information such as the identifier of the event, a code, a quantity and the transaction number, among others. Preferably, at this point, the quantity is deducted 367 from the user's offline personal balance account. After a second plurality of two-dimensional codes are generated 365 and displayed on screen 122 of user device 13a, the generated SAR code is scanned and/or read 369 by a camera 115b of operator device 13b. By means of the two-dimensional code reader service, the method is able to read all the second plurality of two-dimensional codes provided in the SAR and to distinguish the at least one valid two-dimensional code which must be decrypted. The decryption service is capable of decrypting the at least one valid two-dimensional code and validating the information of the two-dimensional code. After the SAR code is scanned and/or read 369 by means of operator device 13b, the purchase and the record/transfer is validated/closed and a new transaction is created 371.

Figure 6A:
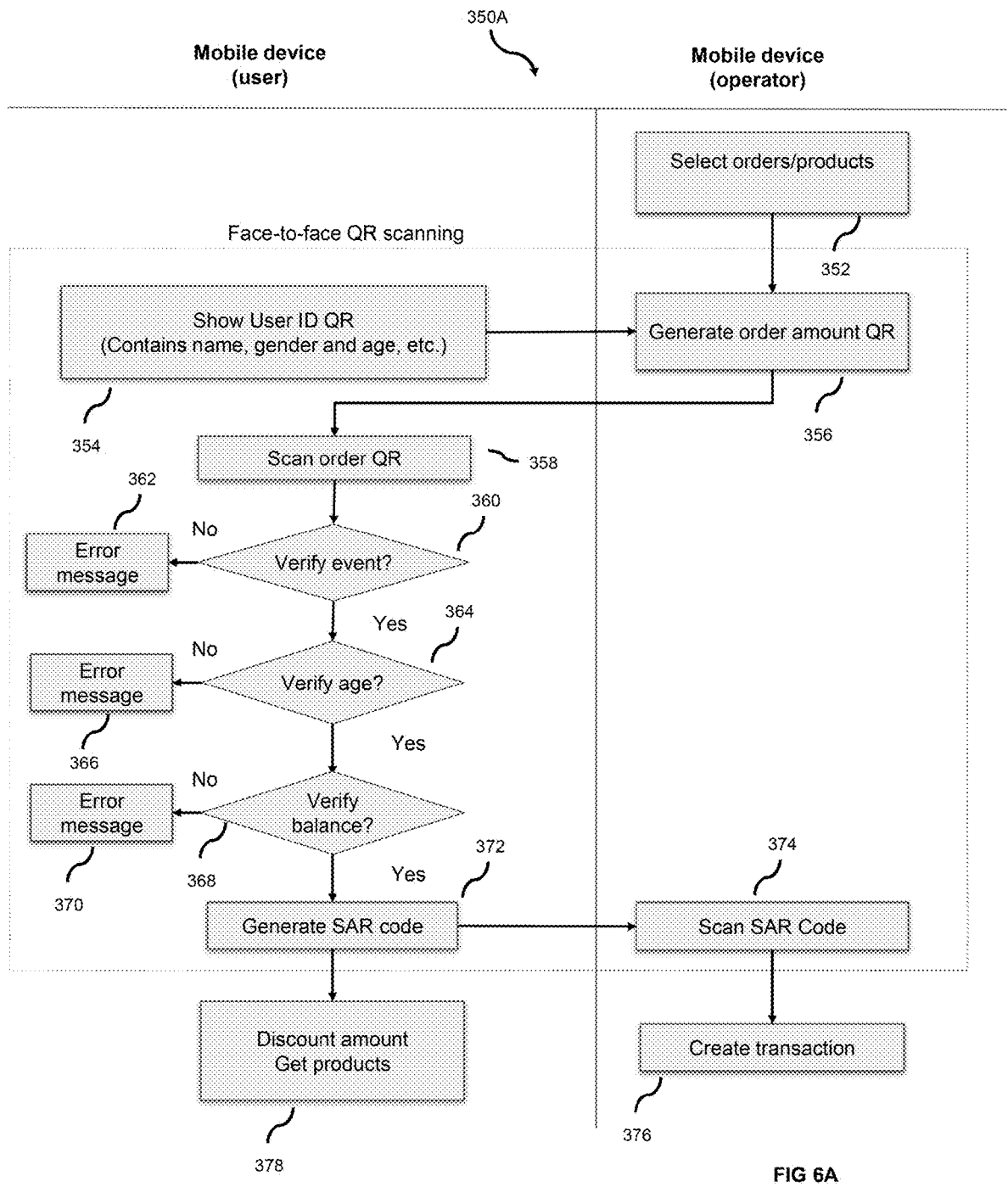
FIG. 6A is a flowchart that illustratively shows the steps of another method for an onsite purchase of a preferred embodiment.

FIG. 6A is a flowchart that illustratively shows the steps of method 350A for an onsite purchase, two-dimensional codes being generated and read by the devices 13. Method 350A starts when the operator's device selects the orders and/or the products 352. In turn, a two-dimensional code is shown 354 on user device 13a by means of its screen 122 and is scanned or captured 353 by camera 115 of operator device 13b. The two-dimensional code may contain information such as the identifier of the event, a name, a code, a gender and an age, among other data. The method subsequently generates at least one two-dimensional code 356 with the selected orders and/or products and information of the two-dimensional code displayed from user device 13a. If there is a plurality of two-dimensional codes, these are displayed as a secure animated response (SAR) code, wherein the at least one two-dimensional code can be a plurality of quick response (QR) codes, wherein the at least one two-dimensional code includes encrypted information to be validated by user device 13a. The at least one two-dimensional code contains information such as the identifier of the event, a code, a quantity, the transaction number, the user's name, the price and the amount, among others. After a plurality of two-dimensional codes 356 are generated and displayed on screen 122 of operator device 13b, the generated SAR code is scanned and/or read 358 by means of a camera 115a of user device 13a. By means of the two-dimensional code reader service, the method is able to read all the two-dimensional codes provided in the SAR code and to distinguish the at least one valid two-dimensional code which must be decrypted. The decryption service is capable of decrypting the at least one valid two-dimensional code and validating the information of the two-dimensional code. Subsequently, the method checks the event 360 and, if it cannot verify the event 360, generates and sends an error message 362. If it can verify event 360, it checks the age 364. If it cannot verify the age 364, it generates and sends an error message 366. If it can verify the age 364, it checks the balance 368 and, if it cannot verify the balance 370, it generates and sends an error message 375. If the balance can be verified 370, it generates a second plurality of two-dimensional codes 372 with the balance, which are displayed as a secure animated response (SAR) code, wherein the second plurality of two-dimensional codes can be a plurality of quick response (QR) codes, wherein at least one of the two-dimensional codes includes encrypted information to be validated by operator device 13b. The two-dimensional code with the verified information contains information such as the identifier of the event, a code, a quantity and the transaction number, among others. Preferably, at this point the quantity is deducted 378 from the user's offline personal balance account. After a second plurality of two-dimensional codes are generated 374 and displayed on screen 122 of user device 13a, the generated SAR code is scanned and/or read 374 by a camera 115b of operator device 13b. The sub-method ranging from displaying 254 the two-dimensional code to scanning 374 the plurality of two-dimensional codes can be carried out in a face-to-face embodiment, wherein the mobile devices have at least one camera on the same side as screen 122 and the read/scan method is carried out without the intervention of the operator and/or user regarding turning over the respective mobile device. By means of the two-dimensional code reader service, the method is able to read all the second plurality of two-dimensional codes provided in the SAR and to distinguish the at least one valid two-dimensional code which must be decrypted. The decryption service is capable of decrypting the at least one valid two-dimensional code and validating the information of the two-dimensional code. After the SAR code is scanned and/or read 374 by means of operator device 13b, the purchase and the record/transfer is validated/closed and a new transaction is created 376.

Figure 7:
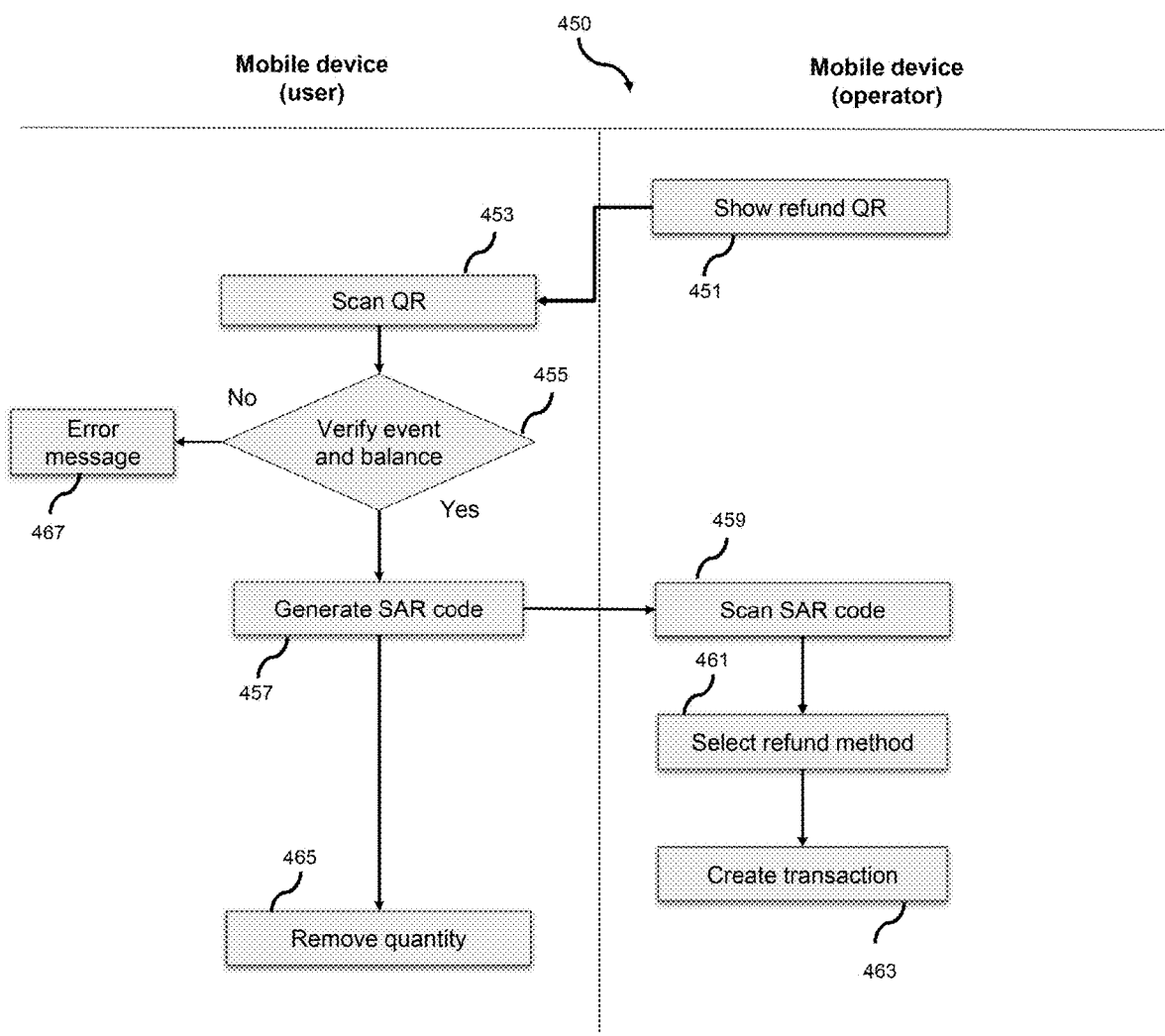
FIG. 7 is a flowchart that illustratively shows the steps of the method for an onsite refund of a preferred embodiment.
Figure 7A:
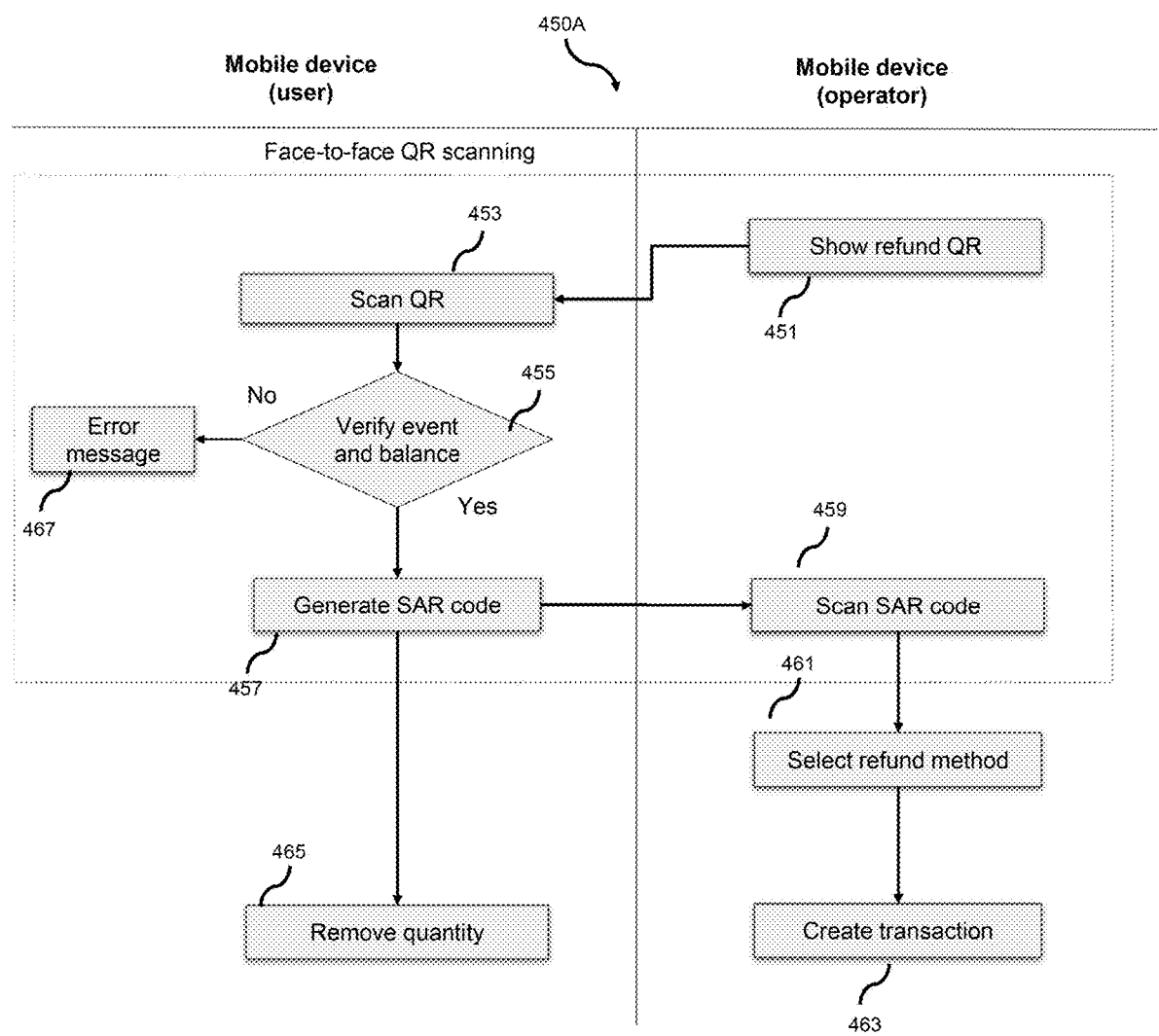
FIG. 7A is a flowchart that illustratively shows the steps of another method for an onsite refund of a preferred embodiment.

FIG. 7 is a flowchart that illustratively shows the steps of method 450 for an onsite refund, two-dimensional codes being generated and read by the devices 13. Method 450 starts when operator device 13b displays 451 a two-dimensional code by means of its screen 122, which is scanned or captured 453 by camera 115 of user device 13a. The two-dimensional code may contain information such as the identifier of the event, a name and a code, a gender and an age, among other data. The method subsequently asks whether the identifier of the event corresponds to the event, as well as the balance 455 to be refunded. If the event identifier does not correspond to the event, an error message is sent 467 to user device 13a. If it does correspond, a plurality of two-dimensional codes 457 is generated with the details of the refund, which are displayed as a secure animated response (SAR) code, wherein the plurality of two-dimensional codes can be a plurality of quick response (QR) codes, wherein at least one of the two-dimensional codes includes encrypted information to be validated by operator device 13b. The details of the refund, i.e. the encrypted information, may contain information such as the identifier of the event, a code, a refund quantity, the transaction number, the date of the initial transaction, the refund date, the reason code or the reason for refund, and the user's name, among others. After a plurality of two-dimensional codes are generated 457 and displayed on screen 122 of user device 13a, the generated SAR is scanned and/or read 459 by a camera 115a of operator device 13b. By means of the two-dimensional code reader service, the method is able to read all the two-dimensional codes provided in the SAR code and to distinguish the at least one valid two-dimensional code which must be decrypted. The decryption service is capable of decrypting the at least one valid two-dimensional code and validating the information of the two-dimensional code. After the scanning and/or the reading 459 of the SAR code on operator device 13b, the operator selects the method of the refund, e.g. cash, goods or to a chip with NFC technology. If it were to a chip with NFC technology, the operator, possibly by means of device 13b, activates the NFC chip of the user 13c with the user's code and a quantity. Alternatively, the user can be instructed to request the refund on device 13*a* by adding data for the refund, such as e.g. a bank account for crediting of the refund. After selecting the method of the refund 461, a new transaction is created 463. The refund method can be carried out in multiple ways, in cash among them. Parallel to the creation of the new transaction 463 on operator device 13*b* side, the returned, e.g. a returned quantity, is deleted 465 on user device 13*a*. As shown in FIG. 7A, the method 450A, which includes the sub-method ranging from displaying 451 the two-dimensional code to scanning 459 the plurality of two-dimensional codes, can be carried in a face-to-face embodiment, wherein the mobile devices at least have one camera on the same side as screen 122 and the read/scan method is carried out without intervention of the operator and/or the user regarding turning over the respective mobile device.

In a specific embodiment, it can be combined with the methods shown in FIGS. 5 to 7 in a closed circuit, by generating and reading two-dimensional codes by means of the devices 13. In one embodiment, these method and system allow communities to configure the system and to control their microeconomy, their internal consumption and their products. This combination method can be divided into three main parts—a reload process, a purchase process, and a refund process, which correspond to the reload method, the purchase method, and the refund method described above.

Figure 10:
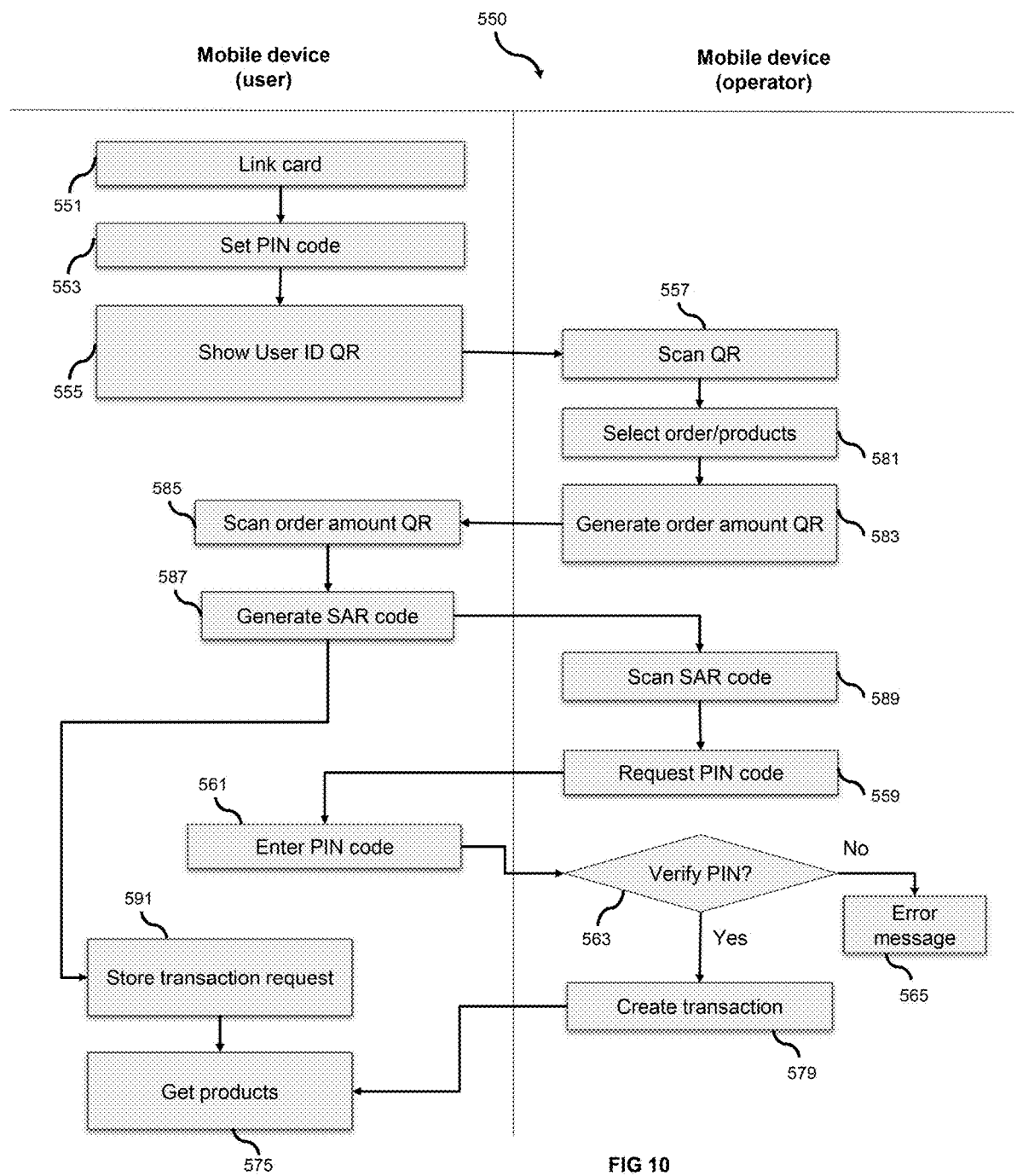
FIG. 10 is a flowchart that shows the steps of a method for validating a transaction of a preferred embodiment.

FIG. 10 is a flowchart that illustratively shows the steps of a method 550 for validating a transaction by a user, two-dimensional codes being generated and read by the devices 13. Method 550 starts when device 13*a* of the user binds or pairs 551 to a user card, and therefore to user device 13*a*. By binding or pairing 551 the card to user device 13*a*, a personal identification number (PIN) is established 553 in the system, a two-dimensional code containing user information, including data such as the PIN, the user's name, the user's date of birth, the card's identification number, or any other user information, being thereby generated. The two-dimensional code is displayed 555 on screen 122 of user device 13*a* and camera 115 of operator device 13*b* scans or captures it 557. By scanning or capturing 557 the two-dimensional code of user device 13*a*, the operator can select a particular service or order 581 on operator device 13*b*, whereby an order including the selected products and/or services, as well as the quantity, can then be generated 583 by operator device 13*b*, a two-dimensional code that includes at least the data indicated above being created. The two-dimensional code is displayed on screen 122 of operator device 13*b*, and camera 115 of user device 13*a* scans or captures it 585. Upon scanning or capturing 585 the two-dimensional code from operator device 13*b*, user device 13*a* generates a plurality of two-dimensional codes 587, which are displayed as a secure animated response (SAR) code, wherein the plurality of two-dimensional codes can be a plurality of quick response (QR) codes, wherein at least one of the two-dimensional codes includes encrypted information that must be validated by operator device 13*b*. After the SAR code is displayed on screen 122 of user device 13*a*, the SAR code is scanned or captured 589 by camera 115 of operator device 13*b*, and (b) a store transaction request is generated 591 on user device 13*a*. In the operator's device, when the camera of operator device 13*b* (a) scans or captures the SAR code 589, operator device 13*b* requests the PIN 559, which must be entered 561 by the user. The operator device 13*b* checks 563 the validity of the PIN and, if the PIN is invalid, sends an error message 565. If the checked PIN 563 is in fact valid, then operator device 13*b* gives the chance to create a transaction 579 allowing user device 13*a* to obtain the desired products or services 575.

On the user device, when the store transaction request is generated 591, the user can then obtain the desired products or services 575 on user device 13*a*. By means of the two-dimensional code reader service, the method is able to read all the two-dimensional codes provided in the SAR code and to distinguish at least one valid two-dimensional code which must be decrypted. The decryption service is capable of decrypting the at least one valid two-dimensional code and validating the information in the at least one two-dimensional code. In one embodiment, upon creating the PIN, the user can use a number associated with the user ID code to validate the PIN and perform transactions without the device 113*a* and without an NFC chip.

Figure 10A:
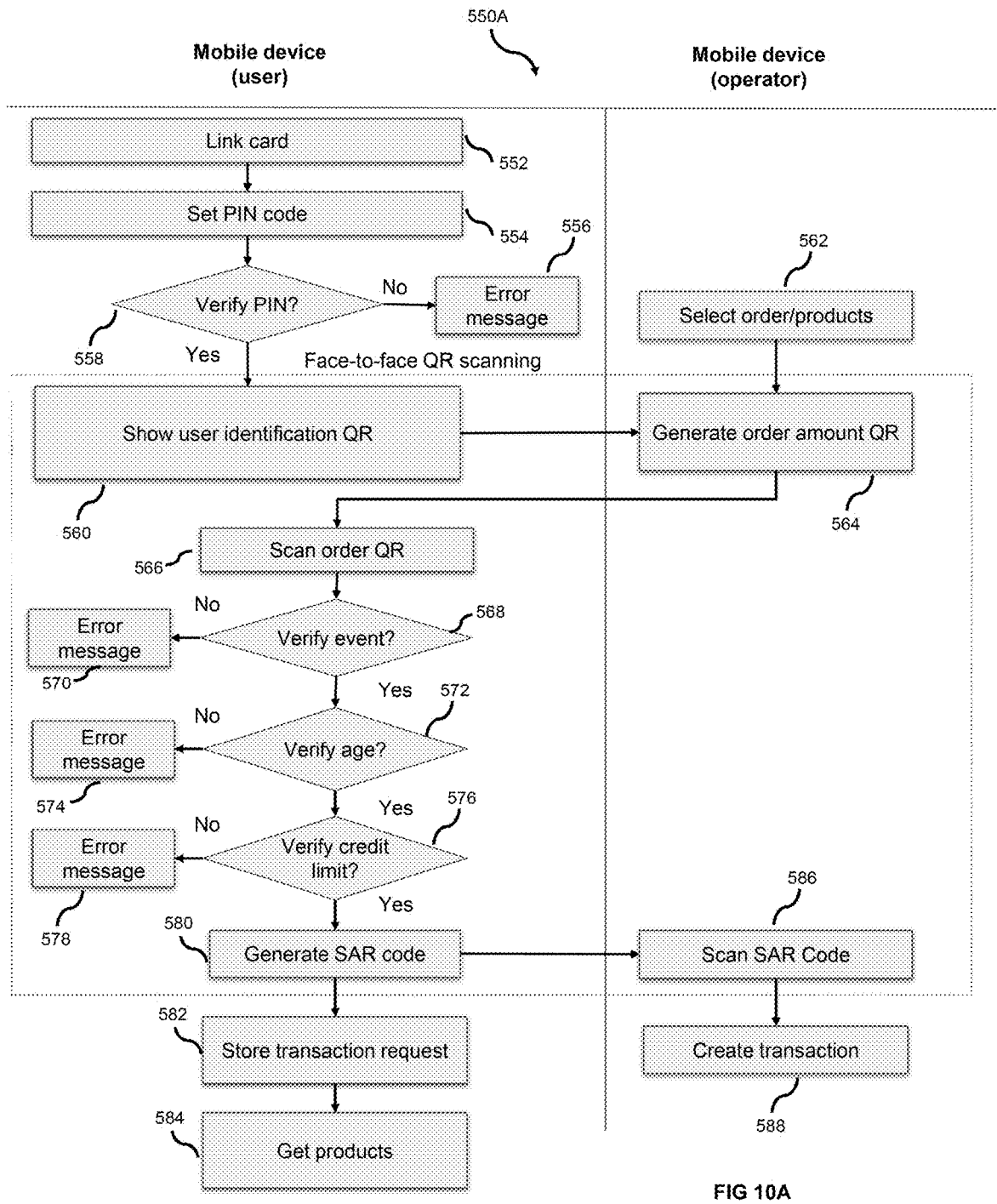
FIG. 10A is a flowchart that shows the steps of another method for validating a transaction of a preferred embodiment.

FIG. 10A is a flowchart that illustratively shows the steps of another method 550A for validating a transaction by a user, two-dimensional codes being generated and read by the devices 13. The method starts when device 13*a* of the user binds or pairs 552 to a user card, and therefore to user device 13*a*. By binding or pairing 552 the card to user device 13*a*, a personal identification number (PIN) is established 554 in the system, wherein the method verifies the PIN 556, wherein, if the PIN cannot be verified 556, an error message is generated and sent 558. If the PIN can be verified 556, a two-dimensional code that contains user information, including data such as the PIN, the user's name, the user's date of birth, the card's identification number, or any other user information, is generated. The two-dimensional code is displayed 560 on screen 122 of user device 13*a* and camera 115 of operator device 13*b* scans or captures it 564. In turn, a particular service, an order and/or an order 562 is selected on operator device 13*b*, so an order that includes the selected products and/or services, as well as the quantity, can then be generated by operator device 13*b*, which in turn generates a two-dimensional code 564 that includes at least the data indicated above. The two-dimensional code is displayed on screen 122 of operator device 13*b*, and camera 115 of user device 13*a* scans or captures it 566. Upon scanning or capturing 566 the two-dimensional code from operator device 13*b*, user device 13*a* checks the event 568 and, if it cannot verify the event 568, generates and sends an error message 570. If it can verify event 568, it checks the age 572. If it cannot verify the age 572, it generates and sends an error message 574. If it can verify the age 572, it checks the credit limit 576 or balance and, if it cannot verify credit limit 576 or balance, it generates and sends an error message 578. If the method can verify the credit limit 576 or the balance, it generates plurality of two-dimensional codes 580 which is displayed as a secure animated response (SAR) code, wherein the plurality of two-dimensional codes can be a plurality of quick response (QR) codes, wherein at least one of the two-dimensional codes includes encrypted information that must be validated by operator device 13*b*. After the SAR code is displayed on screen 122 of user device 13*a*, the SAR code is scanned or captured 586 by camera 115 of operator device 13*b*, and a transaction request 582 is generated and stored on user device 13*a*. On the operator device, when the camera of operator device 13*b* scans or captures the SAR code 586, operator device 13*b* creates a transaction 588 that enables user device 13*a* to obtain the desired products, order or services 584. By means of the two-dimensional code reader service, the method is able to read all the two-dimensional codes provided in the SAR code and to distinguish at least one valid two-dimensional code which must be decrypted. The decryption service is capable of decrypting the at least one valid two-dimensional code and validating the information in the at least one two-dimensional code. The sub-method ranging from displaying 560 the two-dimensional code to scanning 586 the plurality of two-dimensional codes can be carried out in a face-to-face embodiment, wherein the mobile devices have at least one camera on the same side as screen 122 and the read/scan method is carried out without the intervention of the operator and/or user regarding turning over the respective mobile device. In one embodiment, upon creating the PIN, the user can use a number associated with the user ID code to validate the PIN and perform transactions without the device 113a and without an NFC chip.

Figure 11:
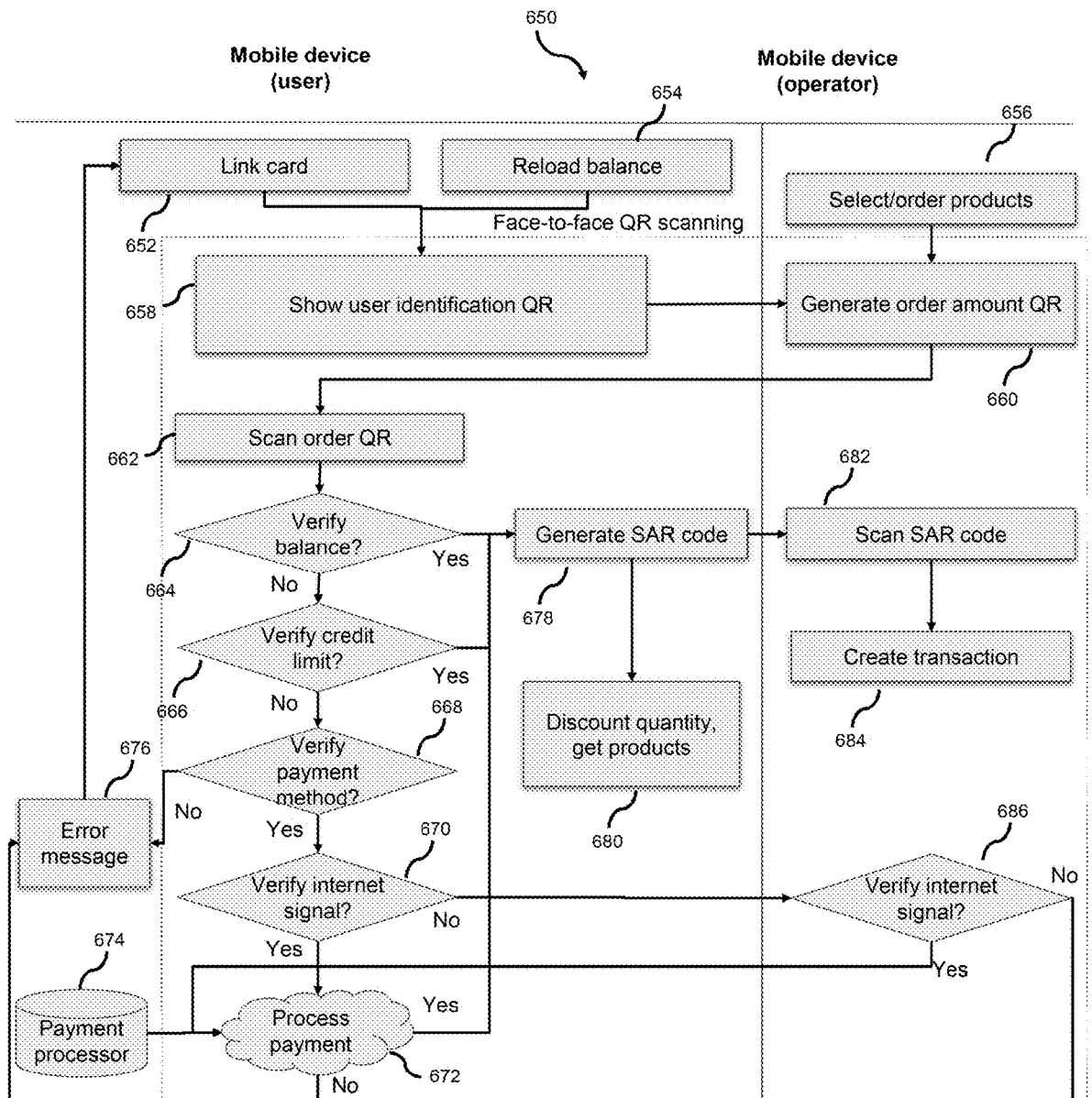
FIG. 11 is a flowchart that shows steps of a method for an onsite purchase of a preferred embodiment, wherein the method is carried out online as an alternative embodiment.

FIG. 11 is a flowchart that illustratively shows the steps of method 650 for an onsite purchase, two-dimensional codes being generated and read by the devices 13, wherein the method is alternatively carried out online. Method 650 starts when device 13a of the user binds or pairs 652 to a user card and therefore to user device 13a. Likewise, the method may start when a reload 654 is made on user device 13a, which may be as previously described according to the methods of FIG. 5 or 5A or to any other known or to be known recharging method. The binding or pairing 552 to the card can be parallel to or instead of the reload 654, and likewise, the reload 654 can be parallel to or instead of the binding or pairing 652 to a card. When biding, pairing 652 and/or recharging 654, a two-dimensional code that contains user information, including data such as the PIN, the user's name, the user's date of birth, the card's identification number, the reload done, or any other user information, is generated. The two-dimensional code is displayed 658 on screen 122 of user device 13a, and camera 115 of operator device 13b scans or captures it. In turn, a particular service, an order and/or an order 656 is selected on operator device 13b, so an order that includes the selected products and/or services, as well as the quantity, can then be generated by operator device 13b, which in turn generates a two-dimensional code 660 that includes at least the data indicated above. The two-dimensional code is displayed on screen 122 of operator device 13b, and camera 115 of user device 13a scans or captures it 662. Upon scanning or capturing 662 the two-dimensional code of operator device 13b, user device 13a checks the balance 664 and, if it cannot verify the balance 664, it checks the credit limit 666. If it cannot verify the credit limit, it checks the payment method 668 and, if cannot verify the payment method 668, it generates and sends an error message 676 indicating that a balance reload is required. If it can verify the balance 664 or if it can verify the credit limit 666, a plurality of two-dimensional codes are generated 678, which are displayed as a secure animated response (SAR) code, wherein the plurality of two-dimensional codes can be a plurality of quick response (QR) codes, wherein at least one of the two-dimensional codes includes encrypted information that must be validated by operator device 13b. After the SAR code is displayed on screen 122 of user device 13a, the SAR code is scanned or captured 682 by camera 115 of operator device 13b, and the quantity and the products to be obtained are deducted 680 on user device 13a. On the operator device, when the camera of operator device 13b scans or captures the SAR code 682, operator device 13b creates a transaction 684 that enables user device 13a to obtain the desired products, order or services 680. By means of the two-dimensional code reader service, the method is able to read all the two-dimensional codes provided in the SAR code and to distinguish at least one valid two-dimensional code which must be decrypted. The decryption service is capable of decrypting the at least one valid two-dimensional code and validating the information in the at least one two-dimensional code. If it can verify the payment method 668, it checks to see whether there is a data signal 670. If there is no data signal 670, it checks again to see whether there is a data signal 686 and, if there is no data signal, sends an error message 676 requiring, possibly, a reload 654. In case that it can be confirmed in any of the two checks 670, 686 that there is a data signal, a payment is processed 672, for which a payment processor 674 is used. If the payment cannot be processed 672, an error message 676 is sent requiring, possibly, a 654 reload. If the payment can be processed 672, a plurality of two-dimensional codes is generated 678, which are displayed as a secure animated response (SAR) code. as described above, in order for operator device 13b to create a transaction 684 and the bearer of user device 13a to be allowed to obtain the desired products, order or services 680. The sub-method ranging from displaying 658 the two-dimensional code to obtaining the desired products, order or services 680, creating a transaction 684, processing the payment 672 and verifying the data signals 670, 686 can be carried out in a face-to-face embodiment. face-to-face, wherein the mobile devices at least have one camera on the same side as screen 122 and the read/scan method is carried out without the intervention of the operator and/or the user regarding turning over the respective mobile device.

Figure 11A:
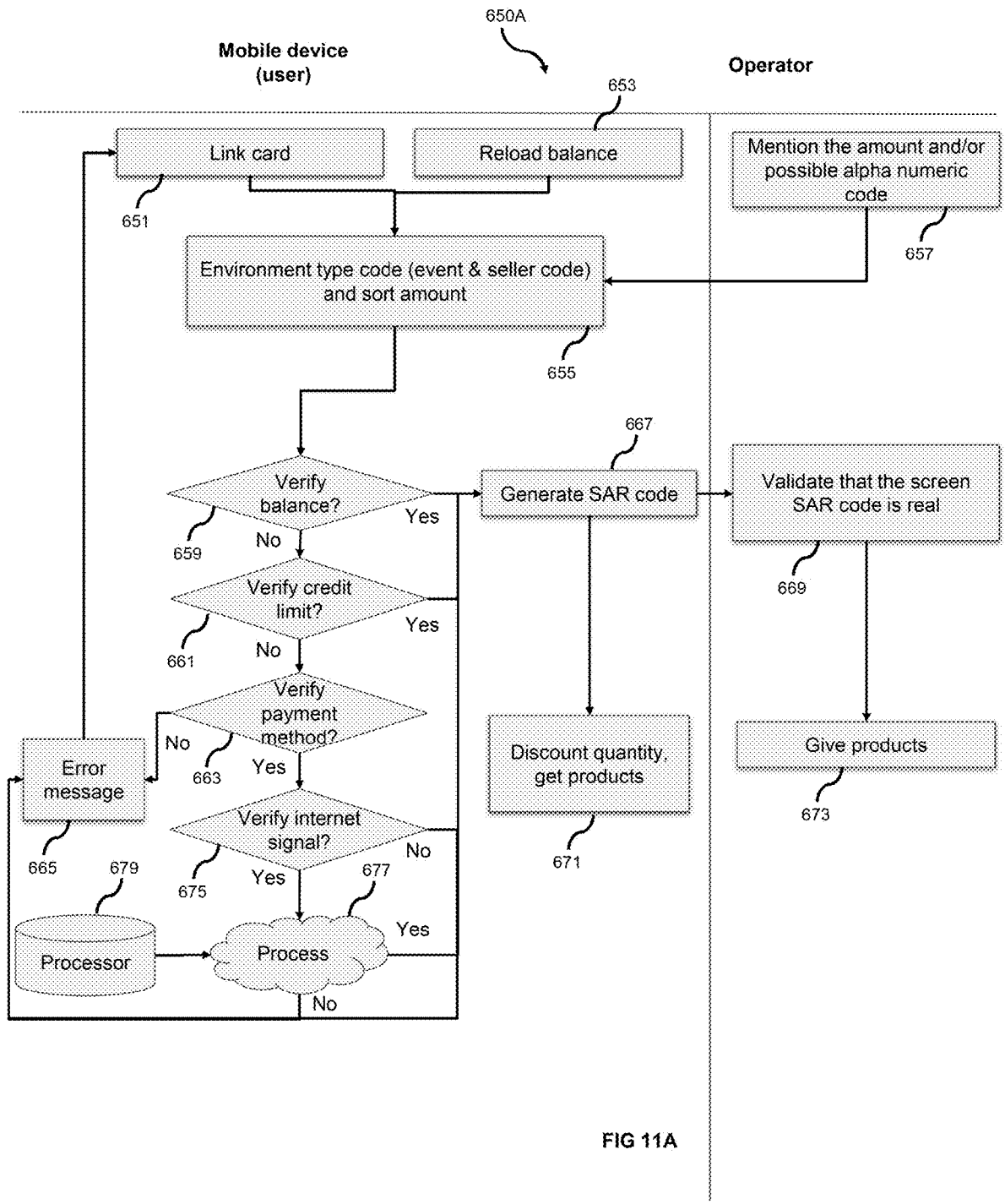
FIG. 11A is a flowchart that shows steps of another method for an onsite purchase of a preferred embodiment, wherein the method is carried out online as an alternative embodiment.

FIG. 11A is a flowchart that illustratively shows the steps of method 650A for an onsite purchase, two-dimensional codes being generated and read by at least one device 13. Method 650A starts when user device 13a binds or pairs 652 to a user card and therefore to user device 13a. Likewise, the method can start when the user device 13a reloads 654, which may be as previously described according to the methods of FIG. 5 or 5A or to any other known or to be known recharging method. The binding or pairing 652 to a card can be parallel to or instead of the reload 654 and likewise, the reload 654 can be parallel to or instead of the binding or pairing 652 to a card. In turn, the quantity to be paid is mentioned 657 by the operator, a quantity that is transmitted to the user device; the manner of transmission can be any of the prior art or as previously established. When biding, pairing 652 and/or recharging 654 and establishing the quantity to be paid 657, a code is generated, which can be two-dimensional 655 on user device 13a, which contains user information, including data such as the PIN, the user's name, the user's date of birth, the card's identification number, the reload made or any other user information, as well as the quantity to be paid as mentioned by the operator. The generated code 655 is stored on user device 13a, and the balance is checked 659 on user device 13a, and if it cannot verify the balance 659, it checks the credit limit 661. If it cannot verify the credit limit 661, it checks the payment method 663, and if cannot verify the payment method 663, it generates and sends an error message 665 indicating that a balance reload is required. If it can verify the balance 659 or if it can verify the credit limit 661, a plurality of two-dimensional codes are generated 667, which are displayed as a secure animated response (SAR) code, wherein the plurality of two-dimensional codes can be a plurality of quick response (QR) codes, wherein at least one of the two-dimensional codes includes encrypted information that must be validated by operator device 13b. After the SAR code is displayed on screen 122 of user device 13a, the SAR code is validated by the operator 669 as real, and the quantity and the products to be obtained are deducted 671 on user device 13a. The validation of the SAR code can be by means known in the art, for example if the SAR code is touched on a touchscreen, to move with the movement of a finger the SAR code to ensure the image is not a screen shot or fake video. Other security systems known and to be known in the art can also be deemed to be included in the present invention in a non-limiting but exemplary way. When the operator validates 669 the SAR code, the operator provides the products, order or services to be given 673 to the bearer of user device 13*a*. By means of the two-dimensional code reader service, the method is able to read all the two-dimensional codes provided in the SAR code and to distinguish at least one valid two-dimensional code which must be decrypted. The decryption service is capable of decrypting the at least one valid two-dimensional code and validating the information in the at least one two-dimensional code. If the payment method can be verified 663, it is checked whether there is a data signal 675. If there is no data signal 675, an error message 665 is sent requiring, possibly, a reload 653. If it can be confirmed that there is a data signal in check 675, the payment is processed 677, for which a 679 payment processor is used. If the payment cannot be processed 677, an error message 665 is sent requiring, possibly, a reload 653. If the payment if can be processed 677, a plurality of two-dimensional codes are generated 667, which are displayed as a secure animated response (SAR) code as described above, in order for the operator to be able to deliver the products, order or services 673 and the bearer of user device 13*a* to be allowed to obtain the desired products, order or services 671.

Figure 14:
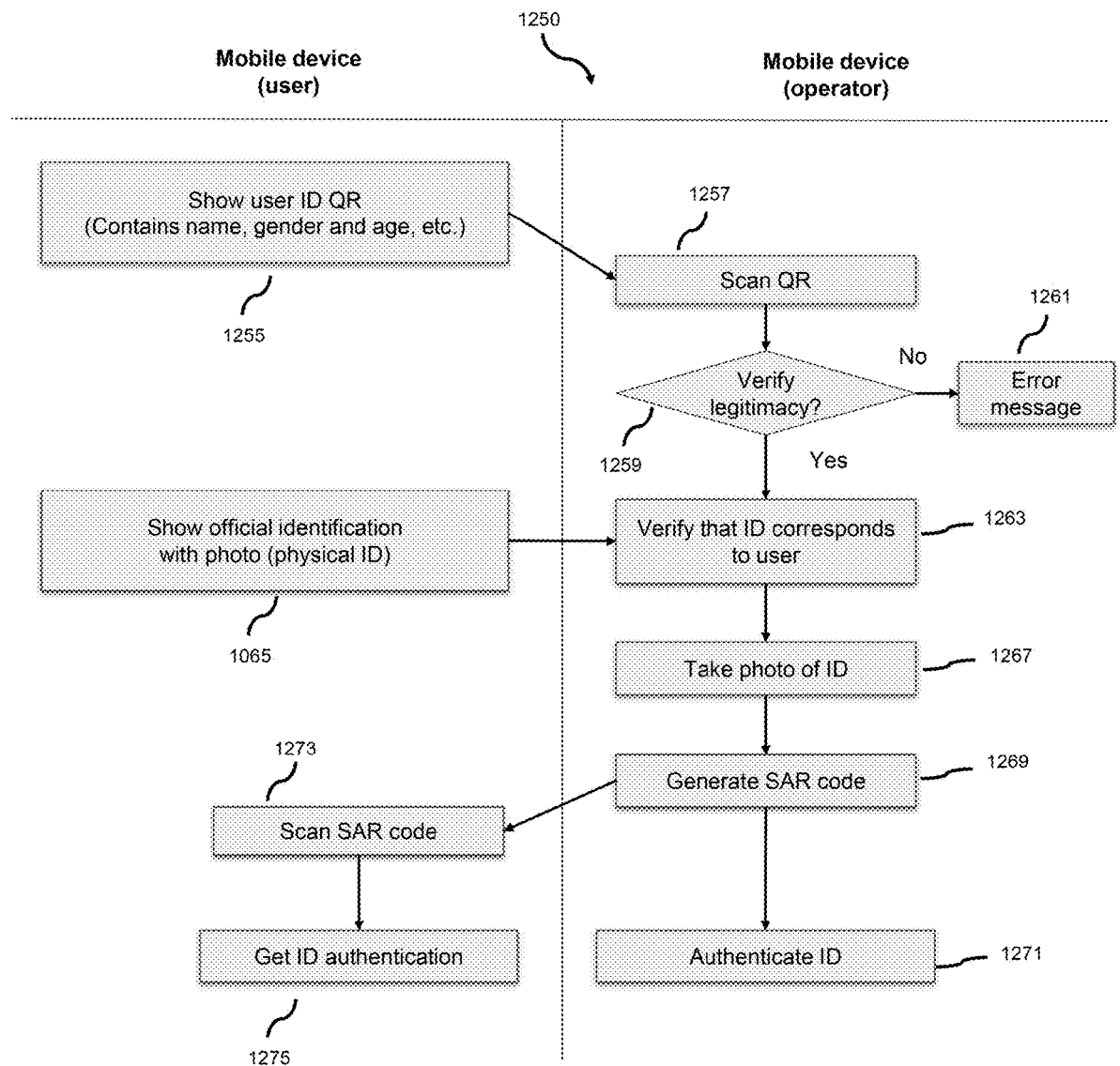
FIG. 14 is a flowchart that illustrates the method steps for an ID authentication on the site of a preferred embodiment.

FIG. 14 is a flowchart that shows the steps of method 1250 for the authentication of an identification on the site, two-dimensional codes being generated and read by these devices 13. The method starts when user device 13*a* displays 1255 a two-dimensional code containing user information, including data such as the user's name, the user's date of birth, the card's identification number, or any other user information, on screen 122 of user device 13*a*, and camera 115 of operator device 13*b* scans or captures it 1257. Upon scanning or capturing 1257 the two-dimensional code of user device 13*a*, operator device 13*b* determines 1259 whether the user is a legitimate user of the identification. If it is determined 1259 that the user is not a legitimate user of the identification, an error message 1261 is sent on operator device 13*b*. If it was determined 1259 that the user is a legitimate user, operator device 13*b* validates 1263 that the identification corresponds to the user, and the user must show the identification 1265 to the operator, the operator must take a photo of the identification 1267, which is then encrypted, and two-dimensional codes are generated 1269 and displayed as a secure animated response (SAR) code, wherein the plurality of two-dimensional codes can be a plurality of quick response (QR) codes, wherein at least one of the two-dimensional codes includes encrypted information that must be validated by user device 13*a*. The step of taking a photo of the identification 1267 does not necessarily need to be carried out. After a plurality of two-dimensional codes are generated 1269, the identification is authenticated 1271 on operator device 13*b*. Also, after the plurality of two-dimensional codes are generated 1269 and displayed on screen 122 of operator device 13*b*, the generated SAR code is scanned and/or read 1273 by a camera 115 of user device 13*a*. By means of the two-dimensional code reader service, the method is able to read all the two-dimensional codes provided in the SAR code and to distinguish at least one valid two-dimensional code which must be decrypted. The decryption service is capable of decrypting the at least one valid two-dimensional code and validating the information in the at least one two-dimensional code. After the SAR code is scanned 1273 and the valid QR code decrypted, an identification authentication 1275 is obtained on user device 13*a*.

Figure 14A:
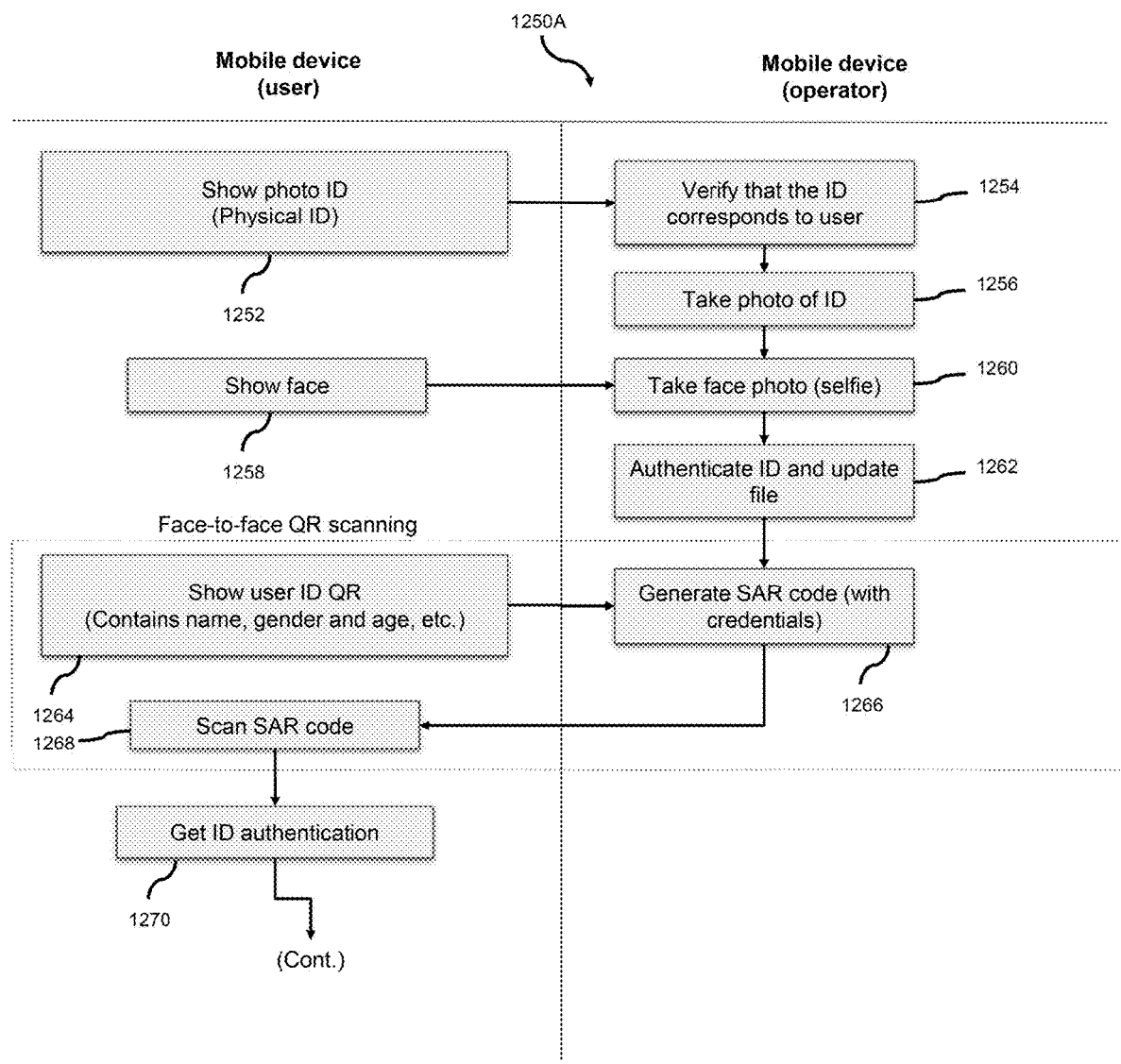
FIG. 14A is a flowchart that illustrates the method steps for another ID authentication on the site of a preferred embodiment.
Figure 14A:
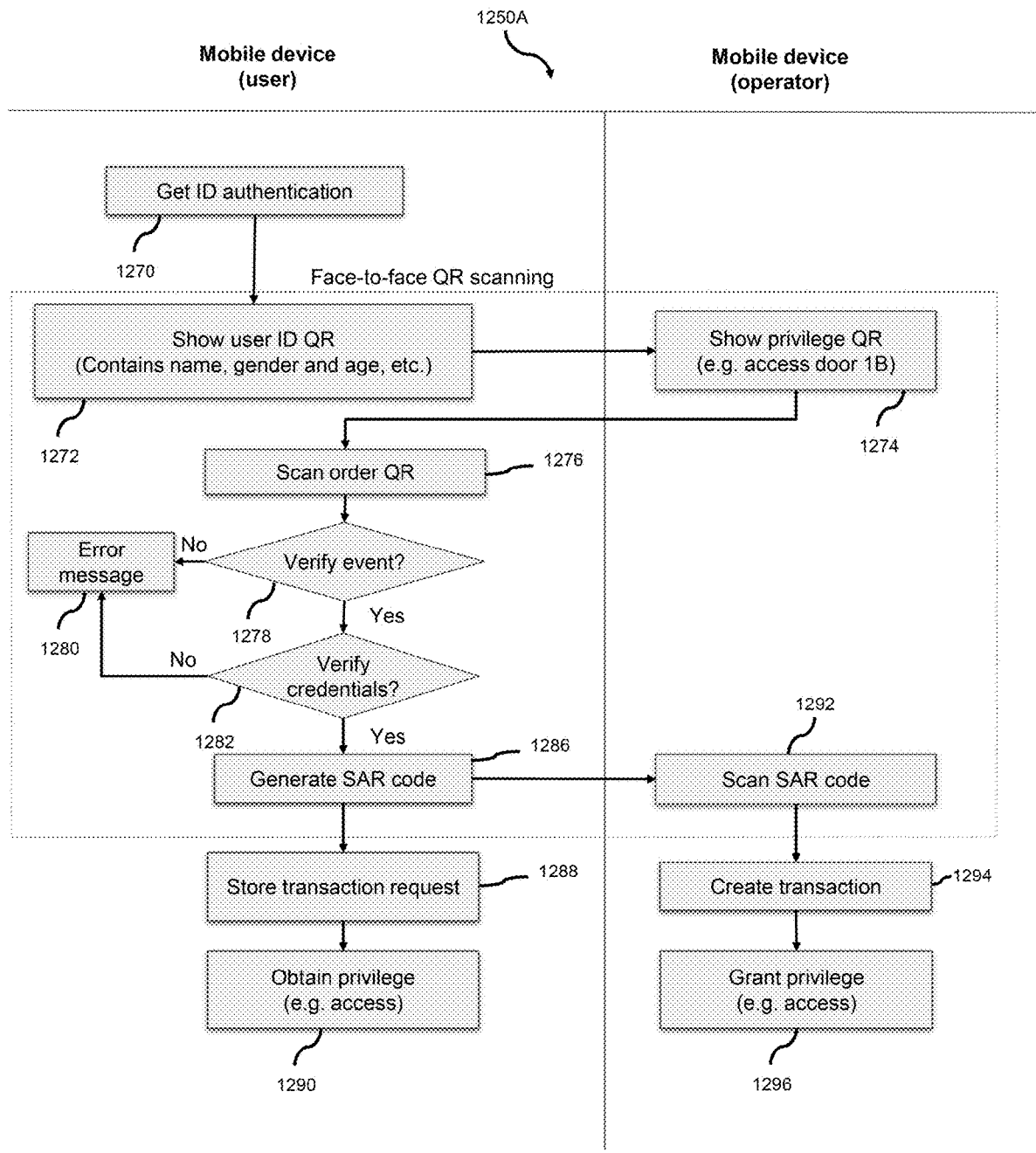

FIG. 14A is a flowchart showing the steps of another method 1250A for the authentication of an identification on the site, two-dimensional codes being generated and read through these devices 13. Method 1250A starts when the user shows 1252 a photo identification, wherein the identification can be an official photo identification, and wherein the operator validates 1254 that the identification corresponds to the user. The operator takes a photo 1256 of the user's validated identification; the step of taking a photo 1256 to the identification does not necessarily need be carried out. The user in turn shows their face 1258 in order for a file to be generated, and the operator, by means of operator device 13*b*, takes a photo of the face 1260 for the user; on operator device 13*b* the identification is authenticated and the user's file is updated 1262. The user, by means of user device 13*a*, displays 1264 a two-dimensional code containing user information, including data such as the user's name, the user's date of birth, the card's identification number or any other user information, on screen 122 of user device 13*a*, and camera 115 of operator device 13*b* scans or captures it. In operator device 13*b*, a plurality of two-dimensional codes are generated 1266 and displayed as a secure animated response (SAR) code, wherein the plurality of two-dimensional codes can be a plurality of quick response (QR) codes, wherein at least one of the two-dimensional codes includes encrypted information to be validated by user device 13*a*. After a plurality of two-dimensional codes are generated 1266, the plurality of two-dimensional codes is displayed on screen 122 of operator device 13*b*, and camera 115 of user device 13*a* scans or captures them, their being authenticated on user device 13*a*. By means of the two-dimensional code reader service, the method is able to read all the two-dimensional codes provided in the SAR code and to distinguish at least one valid two-dimensional code which must be decrypted. The decryption service is capable of decrypting the at least one valid two-dimensional code and validating the information in the at least one two-dimensional code. After the SAR code is scanned 1268 and the valid QR code decrypted, an identification authentication 1270 is obtained on user device 13*a*. The sub-method ranging from displaying the two-dimensional code 1264 and generating the SAR code 1266 to scanning the SAR code 1268 can be carried out in a face-to-face embodiment, wherein the mobile devices have at least one camera on the same side as screen 122 and the read/scan method is carried out without intervention of the operator and/or the user regarding turning over the respective mobile device. Upon the authentication of the identification 1270 being obtained on user device 13*a*, user device 13*a* displays 1272 a two-dimensional code by means of its screen 122, which is scanned or captured by camera 115 of operator device 13*b*. The two-dimensional code displayed 1272 by device 13*a* of the user can include user data such as their name, gender, and age, among others. Device 13*b* of the operator displays 1274 a two-dimensional code by means of its screen 122, which is scanned or captured 1276 by camera 115 of user device 13*a*. The method subsequently verifies the event 1278 on user device 13*a*. If user device 13*a* indeed has the appropriate event and privileges, the method checks to see whether the credentials are correct 1282. If the method confirms that the credentials are correct, a plurality of two-dimensional codes are generated 1286, which are displayed as a secure animated response (SAR) code, wherein the plurality of two-dimensional codes can be a plurality of quick response (QR) codes, wherein at least one of the two-dimensional codes includes encrypted information to be validated by operator device 13b. After a plurality of two-dimensional codes are generated 1286 and displayed on screen 122 of user device 13a, the transaction request is stored 1288 on user device 13a and the user obtains the privilege 1290. In turn, the generated SAR is scanned and/or read 1292 by means of a camera 115b of operator device 13b in order to create the transaction 1294 on operator device 13b and for the privilege 1296 to be granted by the operator. The sub-method ranging from displaying 1272 the two-dimensional code to scanning 1292 the plurality of two-dimensional codes can be carried out in a face-to-face embodiment, wherein the mobile devices have at least one camera on the same side as screen 122 and the read/scan method is carried out without the intervention of the operator and/or user regarding turning over the respective mobile device. The two-dimensional code reader service method is able to read all the two-dimensional codes provided in the SAR code and to distinguish at least one valid two-dimensional code which must be decrypted. The decryption service is capable of decrypting at least one valid two-dimensional code, validating the information of the two-dimensional code, allowing access 1290 to the user device 13a and the respective user thereof and creating the transaction 1294. In the case that, when verifying that there is no access to the event 1278 or when the credentials cannot be verified 1282, an error message 1280 is generated and sent.

Figure 14B:
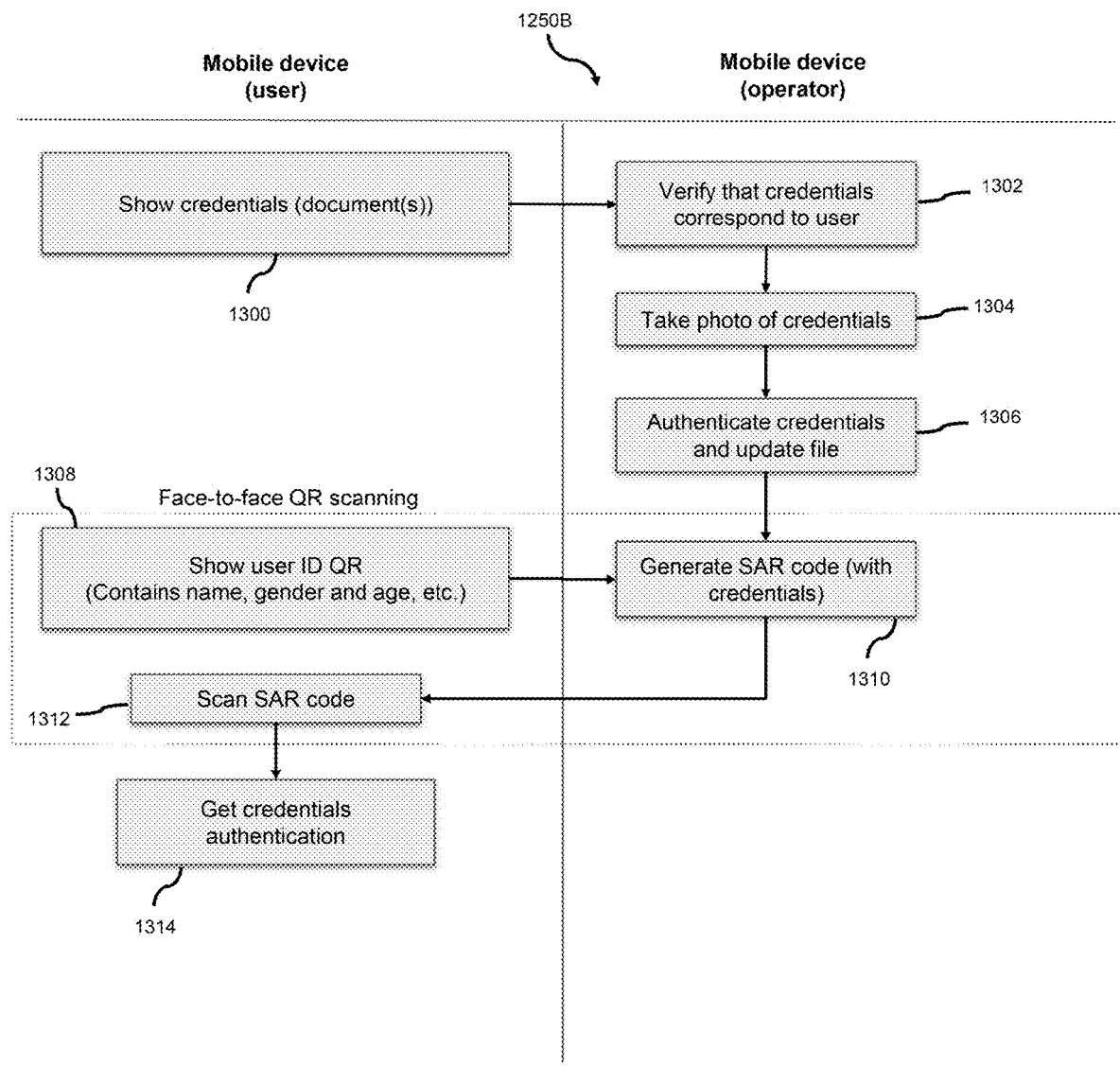
FIG. 14B is yet another flowchart that illustrates the method steps for another ID authentication on the site of a preferred embodiment.

FIG. 14B is a flowchart showing the steps of another method 1250B for on-site identification authentication, generating and reading two-dimensional codes using these devices 13. Method 1250B begins when the user displays a credential or identification 1300, wherein the credential or identification may be an official photo credential or identification, and wherein the operator validates 1302 that the identification corresponds to the user. The operator takes a photo 1304 of the user's credential or validated identification, authenticating the identification, and a user file is updated 1306. The user, by means of user device 13a displays 1308 a two-dimensional code containing user information, including data such as user name, user date of birth, card identification number or any other user information on the screen 122 of user device 13a, and the camera 115 of operator device 13b scans or captures it. In the operator device 13b, two-dimensional codes are generated 1310 and displayed as a secure animated response code (SAR code), where the plurality of two-dimensional codes can be a plurality of quick response codes (QR code), where at least one of the two-dimensional codes includes encrypted information to be validated by the user device 13a. After generating a plurality of two-dimensional codes 1310, the plurality of two-dimensional codes is displayed on the screen 122 of operator device 13b and the camera 115 of user device 13a scans or captures 1312 it, authenticating on user device 13a. The method, by means of the two-dimensional code reader service, is able to read all the two-dimensional codes provided in the SAR code and to distinguish at least one valid two-dimensional code which must be decrypted. The decryption service is capable of decrypting the at least one valid two-dimensional code and validating the information in the at least one two-dimensional code. After scanning the SAR code 1312 and decrypting the valid QR code, an identification authentication 1314 is obtained on the user device 13a. The sub-method, from displaying the two-dimensional code 1308, generating the SAR code 1266 to scanning the SAR code 1312, can be carried out in a face-to-face mode, where mobile devices have at least one camera on the same side as the screen 122 and the read/scan method is carried out without operator and/or user intervention regarding turning the respective mobile device.

Figure 15:
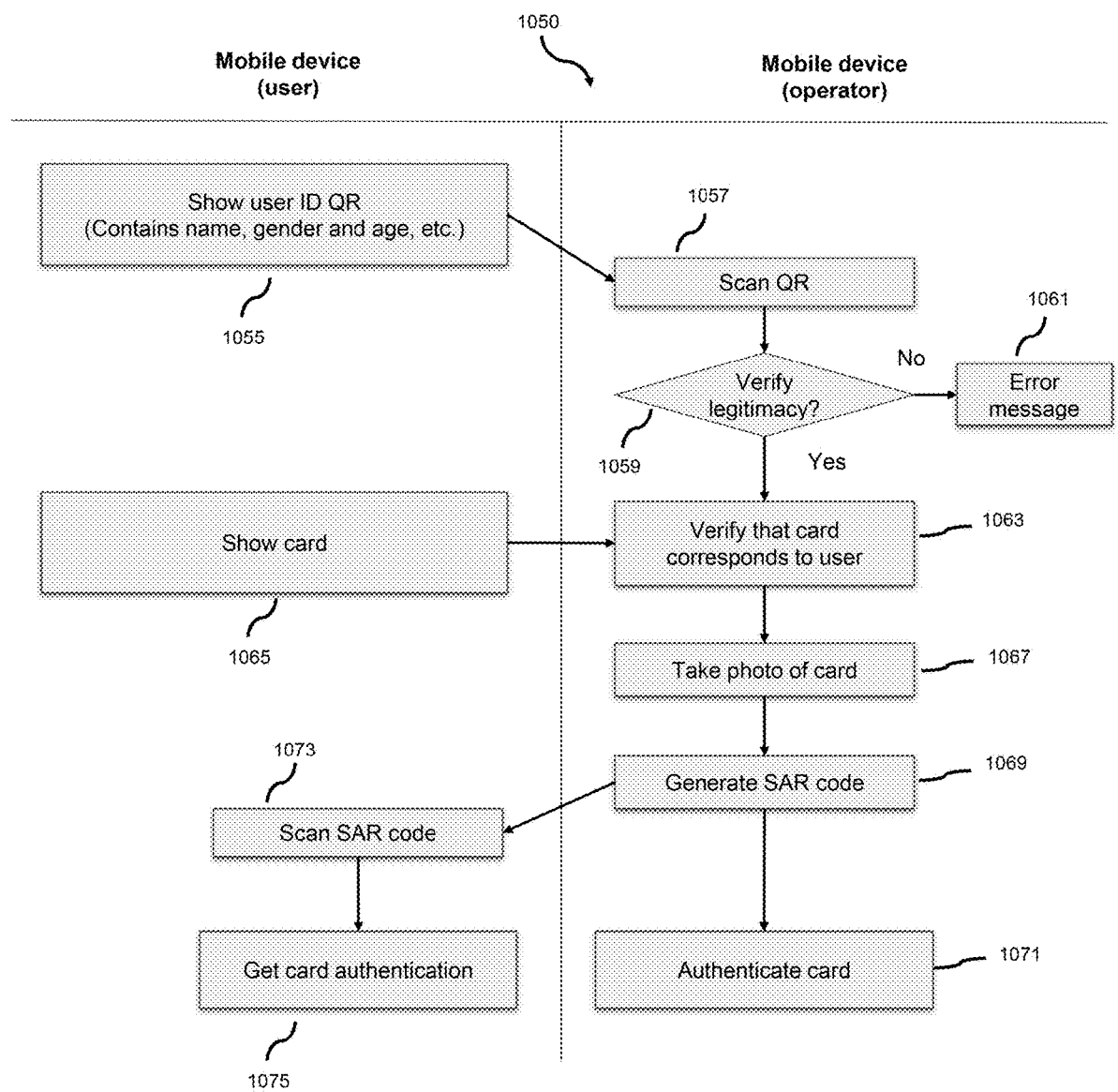
FIG. 15 is a flowchart that illustrates the method steps for an authentication of the payment method on the site of a preferred embodiment.

FIG. 15 is a flowchart showing the steps of the method 1050 for on-site payment authentication by generating and reading two-dimensional codes through these devices 13. The method begins when user device 13a displays 1055 a two-dimensional code containing user information, including data such as user name, user date of birth, card identification number, or any other user information on the screen 122 of the user device 13 a, and the camera 115 of operator device 13b scans or captures 1057 this information. By scanning or capturing 1057 the two-dimensional code of user device 13a, operator device 13b determines 1059 whether the user is a legitimate user of the card. If it is determined 1059 that the user is not a legitimate user of the card, an error message 1061 is sent on operator device 13b. If the user was determined 1059 to be a legitimate user, operator device 13b validates 1063 that the card corresponds to the user and the user must show the card 1065 to the operator, the operator must take a photo of the card 1067, which is then encrypted and a plurality of two-dimensional codes is generated 1069 and displayed as a secure animated response code (SAR code), where the plurality of two-dimensional codes can be a plurality of rapid response codes (QR codes), where at least one of the two-dimensional codes includes encrypted information to be validated by user device 13a. After generating a plurality of two-dimensional codes 1069, the card and the method of payment are authenticated 1071 on operator device 13b. Also, after generating a plurality of two-dimensional codes 1069 and displaying them on the screen 122 of operator device 13b, the generated SAR code is scanned and/or read 1073 by a camera 115 of user device 13a. The method, by means of the two-dimensional code reader service, is able to read all the two-dimensional codes provided in the SAR code and to distinguish at least one valid two-dimensional code which must be decrypted. The decryption service is capable of decrypting the at least one valid two-dimensional code and validating the information in the at least one two-dimensional code. After scanning the SAR code 1073 and decrypting the valid QR code, an identification authentication 1075 is obtained on the user device 13a.

Figure 16:
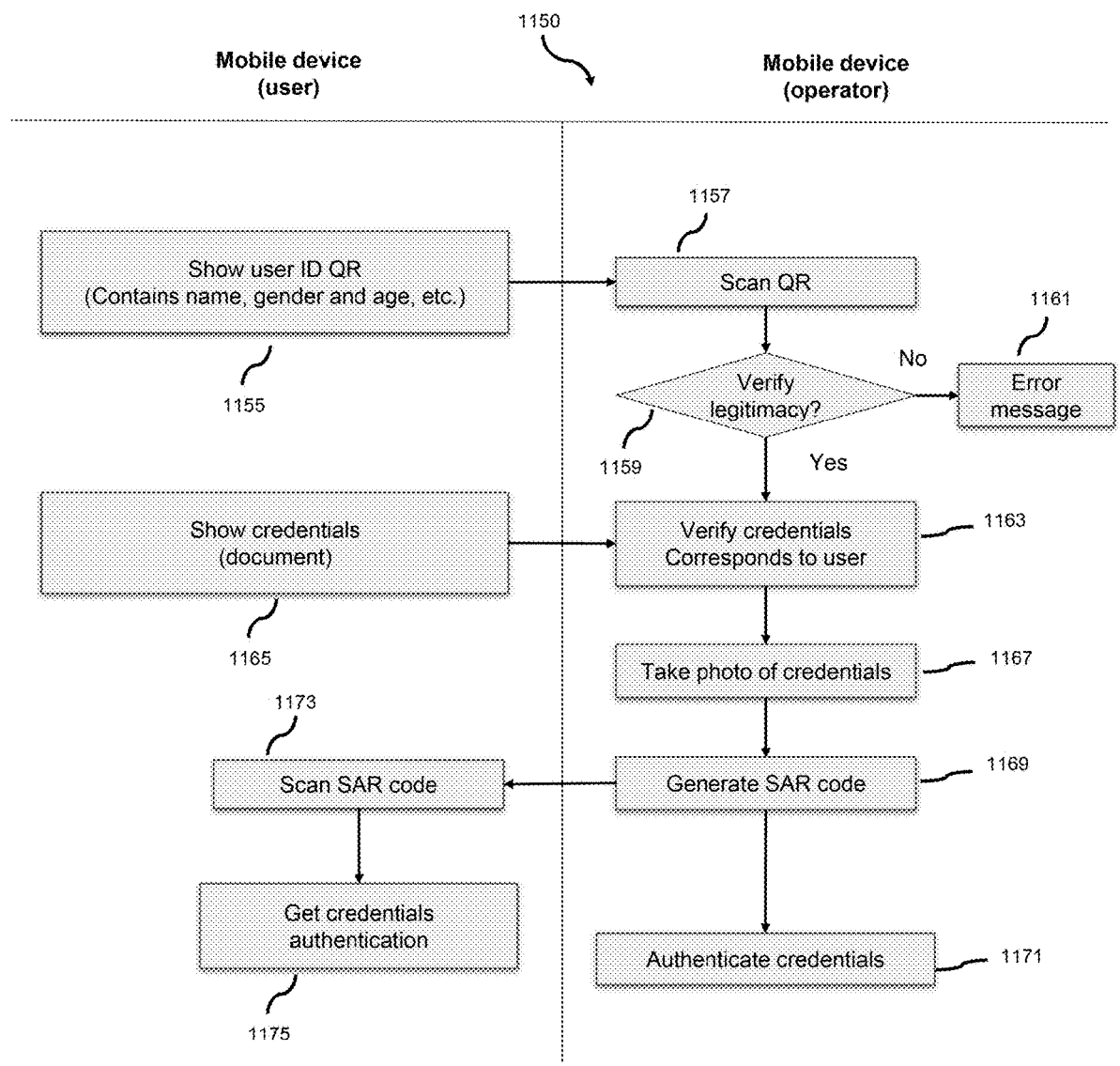
FIG. 16 is a flowchart that illustrates the method steps for an authentication of credentials on the site of a preferred embodiment.

FIG. 16 is a flowchart showing the steps of the method 1150 for on-site identification authentication by generating and reading two-dimensional codes through these devices 13. The method begins when user device 13a displays 1155 a two-dimensional code containing user information, including data such as user name, user date of birth, card identification number, or any other user information on the screen 122 of the user device 13 a, and the camera 115 of operator device 13b scans or captures 1157 this information. By scanning or capturing 1157 the two-dimensional code of user device 13a, operator device 13b determines 1159 whether the user is a legitimate user of the credential. If it is determined 1159 that the user is not a legitimate user of the credential, an error message 1161 is sent on operator device 13b. If the user was determined 1159 to be a legitimate user, operator device 13b validates 1063 that the credential corresponds to the user and the user must show the credential 1165 to the operator, the operator must take a photo of the credential 1167, which is then encrypted and a plurality of two-dimensional codes is generated 1169 and displayed as a secure animated response code (SAR code), where the plurality of two-dimensional codes can be a plurality of rapid response codes (QR codes), where at least one of the two-dimensional codes includes encrypted information to be validated by user device 13a. After generating a plurality of two-dimensional codes 1169, the credential is authenticated 1171 on operator device 13b. Also, after generating a plurality of two-dimensional codes 1169 and displaying them on the screen 122 of operator device 13b, the generated SAR code is scanned and/or read 1173 by a camera 115 of user device 13a. The method, by means of the two-dimensional code reader service, is able to read all the two-dimensional codes provided in the SAR code and to distinguish at least one valid two-dimensional code which must be decrypted. The decryption service is capable of decrypting the at least one valid two-dimensional code and validating the information in the at least one two-dimensional code. After scanning the SAR code 1073 and decrypting the valid QR code, credential authentication 1175 is obtained on user device 13 a.

Figure 16A:
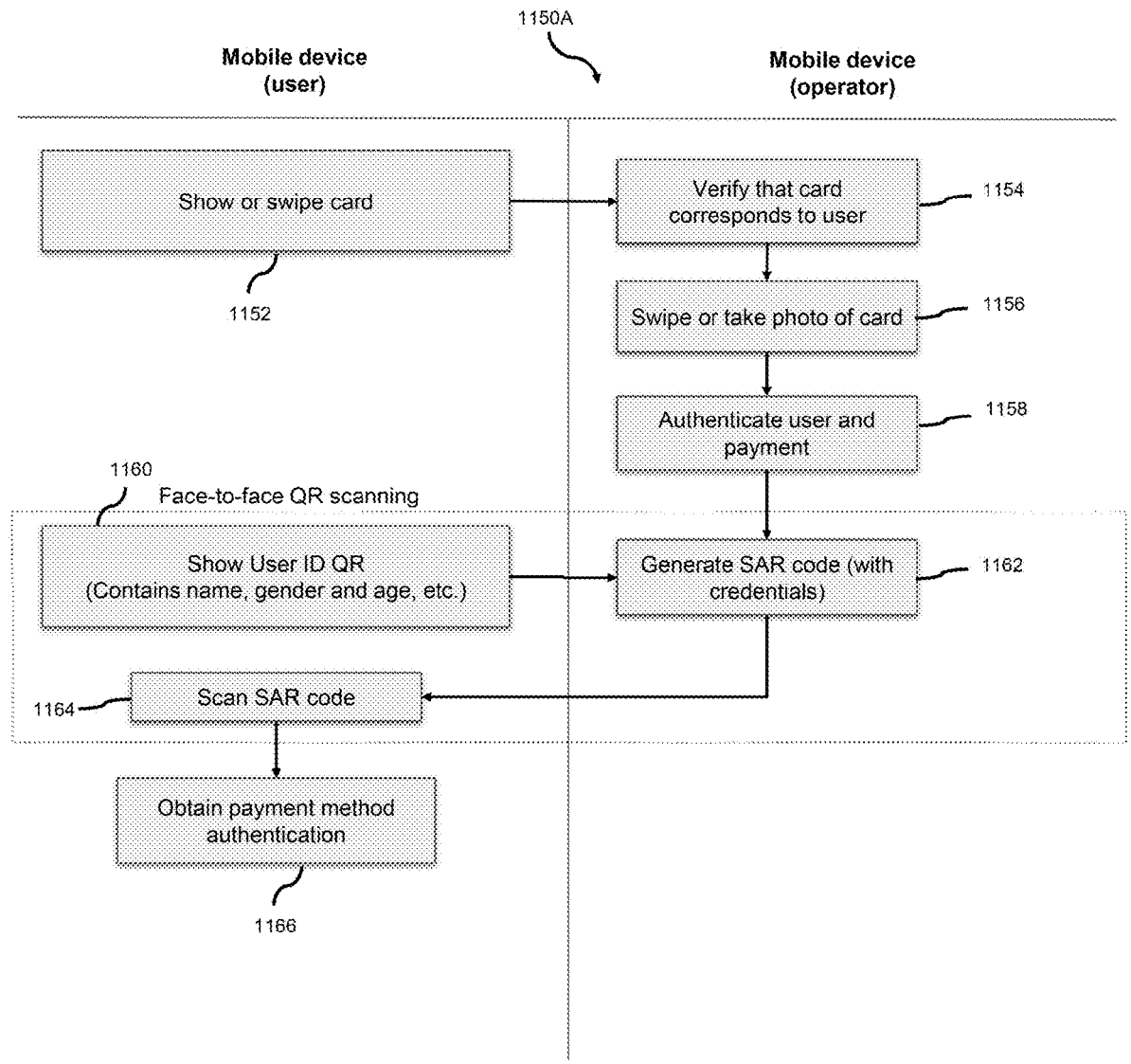
FIG. 16A is a flowchart that illustrates the method steps for obtaining the authentication of a payment method of a preferred embodiment.

FIG. 16A is a flowchart showing the steps of the method 1150A for obtaining authentication of a payment method, generating and reading two-dimensional codes through these devices 13. The method 1150A begins when a card 1152 corresponding to the user is displayed or swiped. By showing or swiping the card 1152 the operator validates that the card 1154 corresponds to the user, passes or takes a photo of the card 1156 and authenticates the user and the payment 1158. User device 13a displays 1160 a two-dimensional code containing user information, including data such as user name, user date of birth, card identification number, or any other user information on the screen 122 of user device 13a, and the camera 115 of operator device 13b scans or captures it. When scanning or capturing the two-dimensional code a plurality of two-dimensional codes is generated 1162 and displayed as a secure animated response code (SAR code), where the plurality of two-dimensional codes can be a plurality of quick response codes (QR codes), where the at least one of the two-dimensional codes includes encrypted information that must be validated by the user device 13a. After generating a plurality of two-dimensional codes 1162 and displaying them on the screen 122 of operator device 13b, the generated SAR code is scanned and/or read 1164 by a camera 115 of user device 13a. The method, by means of the two-dimensional code reader service, is able to read all the two-dimensional codes provided in the SAR code and to distinguish at least one valid two-dimensional code which must be decrypted. The decryption service is capable of decrypting the at least one valid two-dimensional code and validating the information in the at least one two-dimensional code. After scanning 1164 the SAR code and decrypting the valid QR code, authentication of the payment method 1166 is obtained in user device 13a. The sub-method, from displaying the two-dimensional code 1160, generating the SAR code 1162 to scanning the SAR code 1164, can be carried out in a face-to-face mode, where mobile devices have at least one camera on the same side as the screen 122 and the read/scan method is carried out without operator and/or user intervention regarding turning the respective mobile device.

Figure 17:
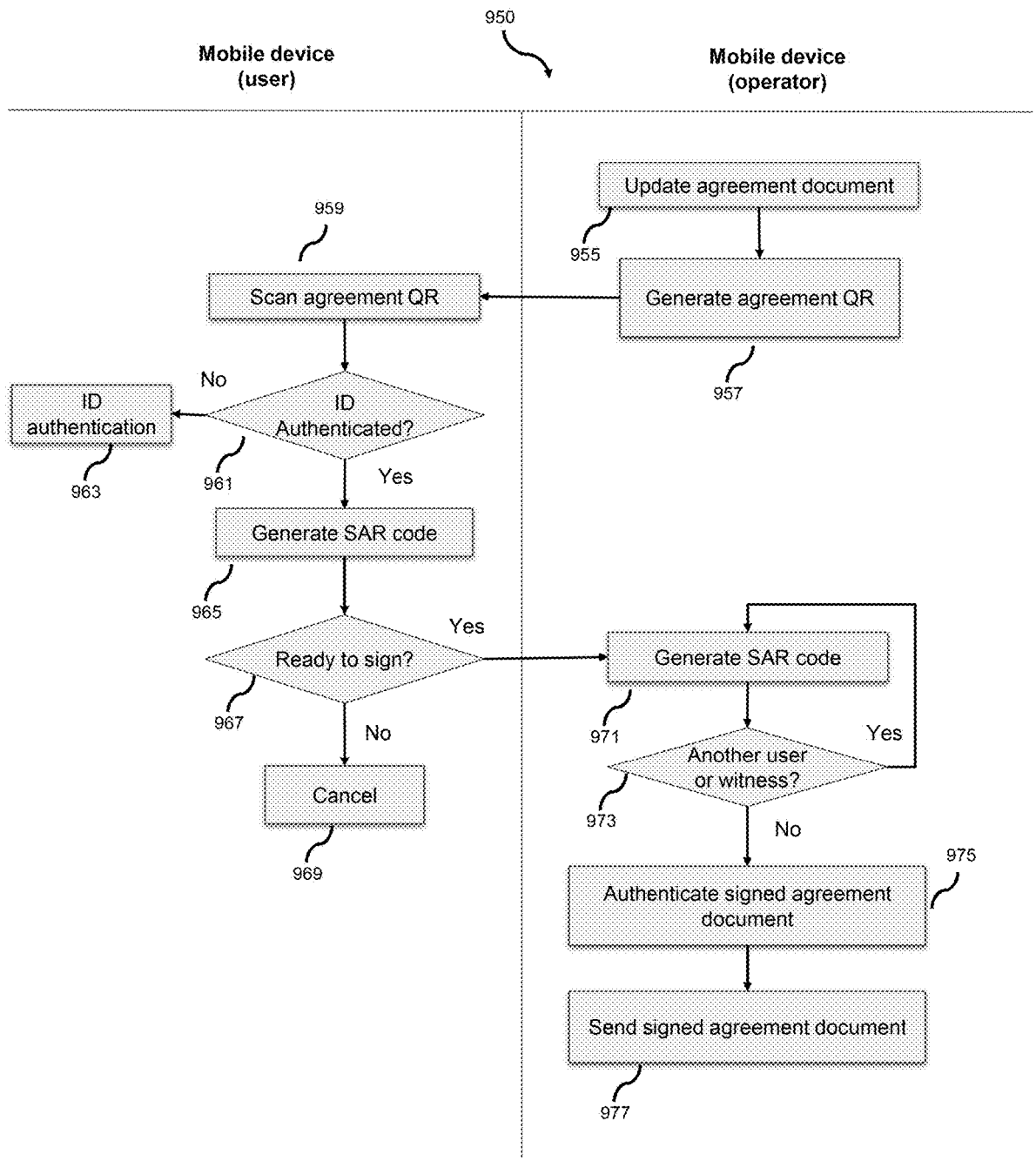
FIG. 17 is a flowchart that illustrates the method steps for an agreement document authentication on the site of a preferred embodiment.

FIG. 17 is a flowchart showing the steps of the method 950 for on-site agreement document authentication by generating and reading two-dimensional codes through these devices 13. The method begins when an agreement document 955 is uploaded to the operator device 13b. Once 955 has been uploaded, a two-dimensional code containing the user information, including data such as the agreement, an identification and any other necessary information, is generated 957 and displayed on the screen 122 of the operator device 13b, which is then scanned or captured 959 by a camera 115 of user device 13a. By scanning or capturing 959 the two-dimensional code of user device 13b, user device 13a determines 961 whether the identification has been authenticated. If it is determined 961 that the identification has not been authenticated, a request is sent to authenticate the identification 963 on the user device 13a. If the identification was determined 961 to have been authenticated, the user device 13a generates a plurality of two-dimensional codes 965 as a secure animated response code (SAR code), where the plurality of two-dimensional codes may be a plurality of quick response codes (QR codes), where at least one of the two-dimensional codes includes encrypted information that must be validated by the operator device 13b. After generating a plurality of two-dimensional codes 965, it is determined whether the agreement is ready to be signed 967. If it is determined 967 that the agreement is not yet ready to be signed, the authentication of the agreement is canceled 969. If it is determined 967 that the agreement is ready to be signed, then the generated SAR code 965 is displayed on the screen 122 of the device 13a, where the generated SAR code is scanned and/or read 971 by a camera 115 of the operator device 13b. The method, by means of the two-dimensional code reader service, is able to read all the two-dimensional codes provided in the SAR code and to distinguish at least one valid two-dimensional code which must be decrypted. The decryption service is capable of decrypting the at least one valid two-dimensional code and validating the information in the at least one two-dimensional code. After scanning 971 the SAR code and decrypting the valid QR code, it is determined 973 whether another user or witness should be added to the agreement, and if another user or witness should be added to the agreement, a new SAR code 971 is scanned. If it is determined 973 that it is not necessary to add another user or token, the user device 13a authenticates the signed agreement document 975 and sends a signed authenticated document 977 to the parties involved in the agreement.

Figure 17A:
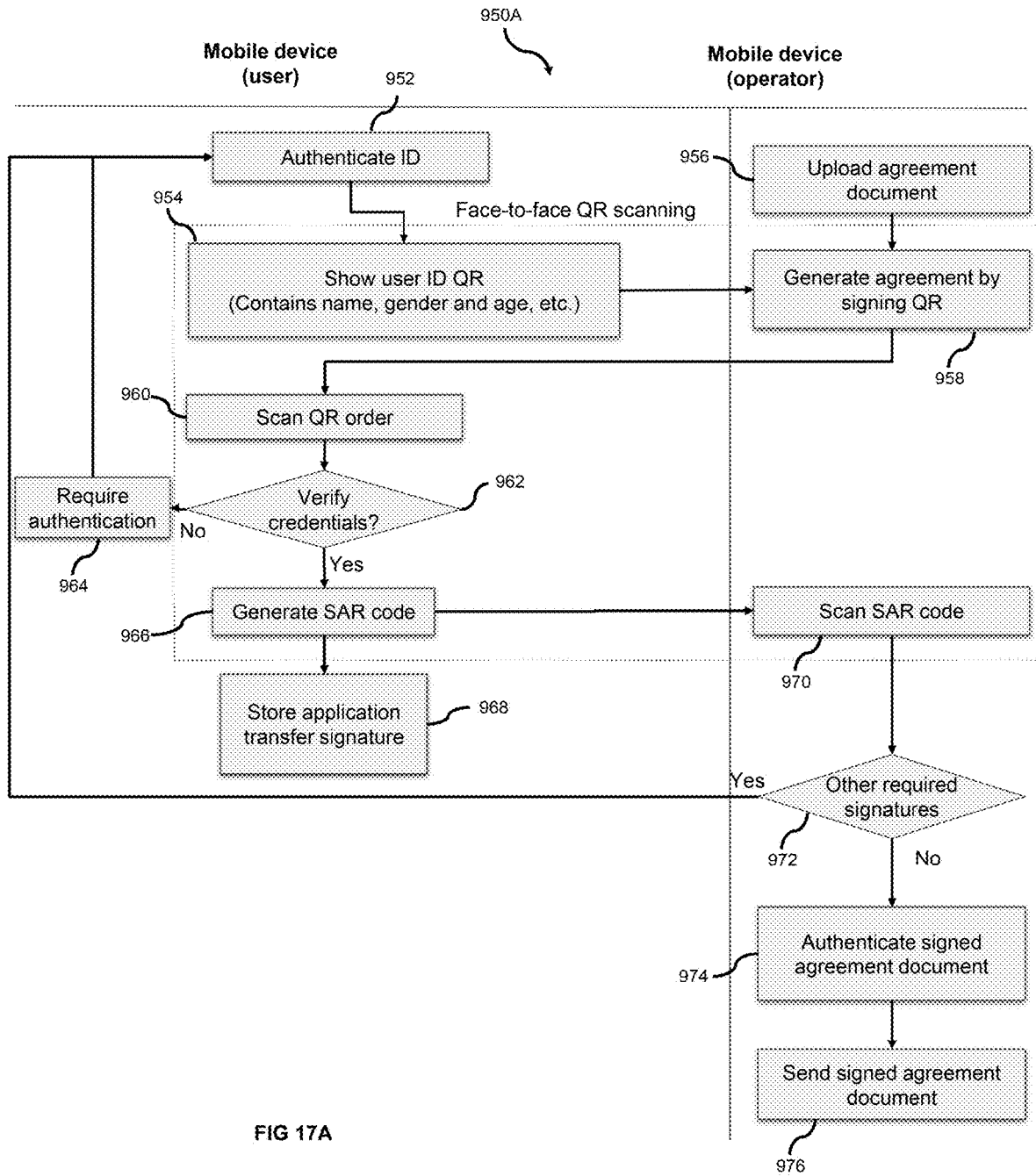
FIG. 17A is a flowchart that illustrates the method steps for another agreement document authentication on the site of a preferred embodiment.

FIG. 17A is a flowchart showing the steps of another method 950A for on-site agreement document authentication, generating and reading two-dimensional codes through these devices 13. Method 950A begins when an agreement document 956 is uploaded to operator device 13b. In turn, user device 13a authenticates an identification 952 and displays a two-dimensional code containing user information, including data such as user name, user birth date, user gender and age or any other user information, where the code is displayed on the screen 122 of user device 13a, and a camera 115 of operator device 13b scans or captures it. When scanning or capturing the two-dimensional code and the agreement document 956 is uploaded, a two-dimensional code is generated 958 that contains the information of the signed agreement, including data such as the agreement, an identification and any other necessary information, and this is displayed on the screen 122 of operator device 13b, which is then scanned or captured 960 by a camera 115 of user device 13a. In scanning or capturing 959 the two-dimensional code of user device 13b, user device 13a verifies 962 the credentials. If it is determined 962 that the credentials do not match, a request is sent to authenticate identification 964 in user device 13a and requires authentication of identification 952. If the credentials were determined 962 to correspond, user device 13a generates a plurality of two-dimensional codes 966 as a secure animated response code (SAR code), where the plurality of two-dimensional codes can be a plurality of quick response codes (QR codes), where at least one of the two-dimensional codes includes encrypted information that must be validated by operator device 13b. After generating a plurality of two-dimensional codes 966, the request transaction signature 968 is stored in the user device and the generated SAR code 966 is displayed on the screen 122 of user device 13*a*, where the generated SAR code is scanned and/or or reads 970 through camera 115 of operator device 13*b*. The method, by means of the two-dimensional code reader service, is able to read all the two-dimensional codes provided in the SAR code and to distinguish at least one valid two-dimensional code which must be decrypted. The decryption service is capable of decrypting the at least one valid two-dimensional code and validating the information in the at least one two-dimensional code. After scanning the SAR code 970 and decrypting the valid QR code, it is determined 972 whether other signatures should be added to the agreement, and if other signatures should be added to the agreement, a request is issued to authenticate a new identification 952. If it is determined 972 that it is not necessary to add another signature, user device 13*a* authenticates the signed agreement document 974 and sends a signed authenticated document 976 to the parties involved in the agreement. The sub-method, from displaying the two-dimensional code 954, generating the SAR code 958 with the signed agreement, to scanning the SAR code 970, can be carried out in a face-to-face mode, where mobile devices have at least one camera on the same side as the screen 122 and the read/scan method is carried out without operator and/or user intervention regarding turning the respective mobile device.

Figure 18:
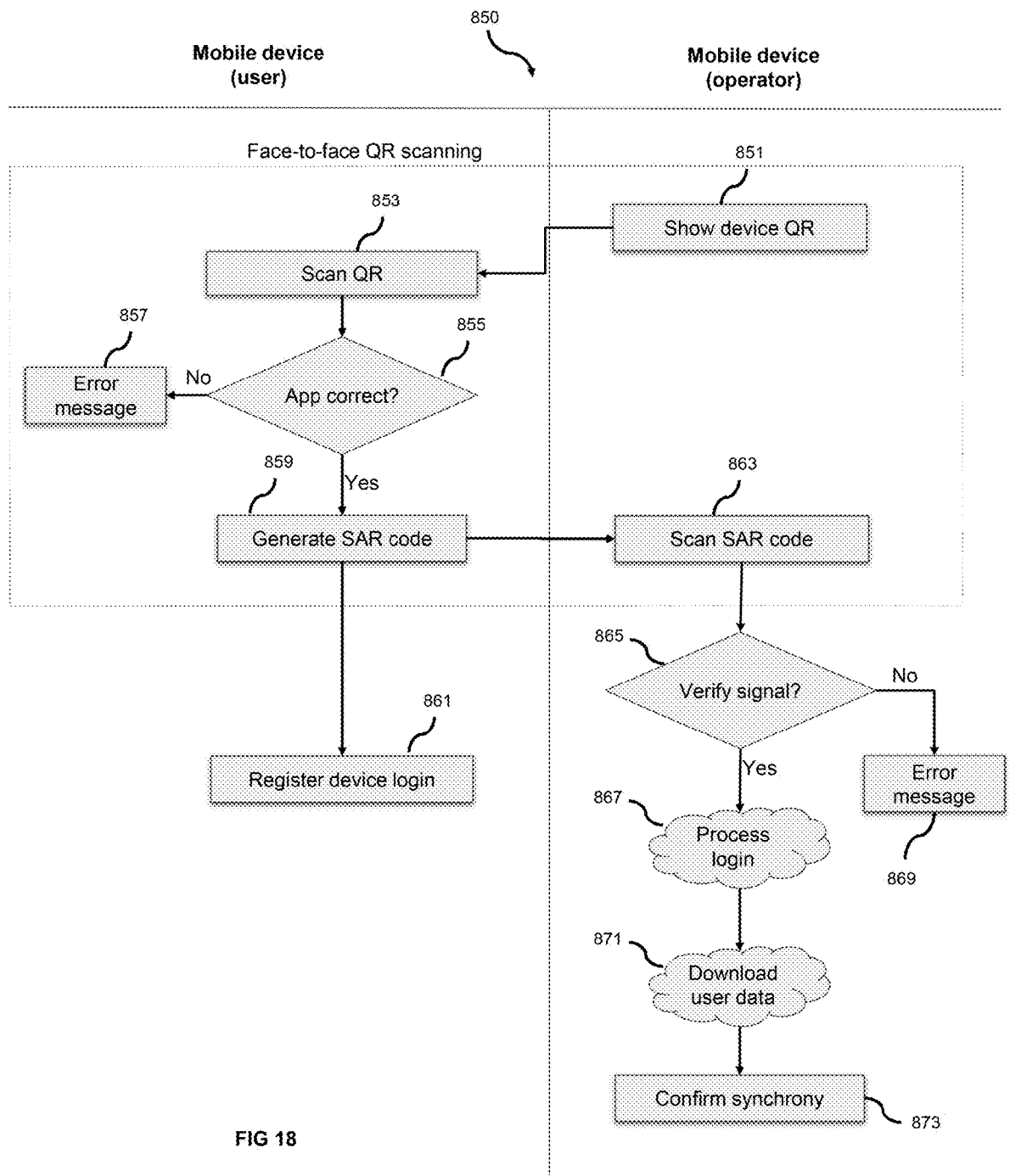
FIG. 18 is a flowchart that shows the method steps for an onsite auto-login of a device, wherein the login is partly online of a preferred embodiment.

FIG. 18 is a flowchart showing the steps of the method 850 for auto-login of an on-site device, where the login is partly online, generating and reading two-dimensional codes through these devices 13. The method begins when the operator device 13*b* displays 851 a two-dimensional code containing validation information on the screen 122 of operator device 13*b*, and the camera 115 of user device 13*a* scans or captures 853 it. By scanning or capturing 853 the two-dimensional code of operator device 13*b*, user device 13*a* determines 855 whether the application is correct. If the application is determined to be incorrect, the user device 13*b* generates and sends an error message 857 on the user device 13*a*. If the method determines 855 that the application is correct, user device 13*a* generates a plurality of two-dimensional codes 859, which are displayed as a secure animated response code (SAR code), where the plurality of two-dimensional codes can be a plurality of quick response codes (QR codes), where at least one of the two-dimensional codes includes encrypted information to be validated by operator device 13*b*. After generating a plurality of two-dimensional codes 859 and displaying them on the screen 122 of user device 13*a*, the generated SAR code is scanned and/or read 863 by a camera 115 of operator device 13*b*. The method, by means of the two-dimensional code reader service, is able to read all the two-dimensional codes provided in the SAR code and to distinguish at least one valid two-dimensional code which must be decrypted. The decryption service is capable of decrypting the at least one valid two-dimensional code and validating the information in the at least one two-dimensional code. Parallel to the scanning 863, a device login 861 is logged on user device 13*a*. After scanning the SAR code 863 and decrypting the valid QR code, the presence of data signal 865 on operator device 13*b* is verified, and if it is determined that there is no data signal, an error message 869 is generated and sent. If the presence of a data signal is determined, a data connection login 867 is processed, the user data 871 is downloaded using the data connection, and syncing 873 is confirmed. It should be noted that from the flow diagram of FIG. 18, other embodiments to the use of the system can be seen, for example the auto-start of apparatuses, more specifically instead of a login, with the flow diagram of FIG. 18 apparatuses can be started, such as vehicles or work machinery which may be available for rent.

Figure 19:
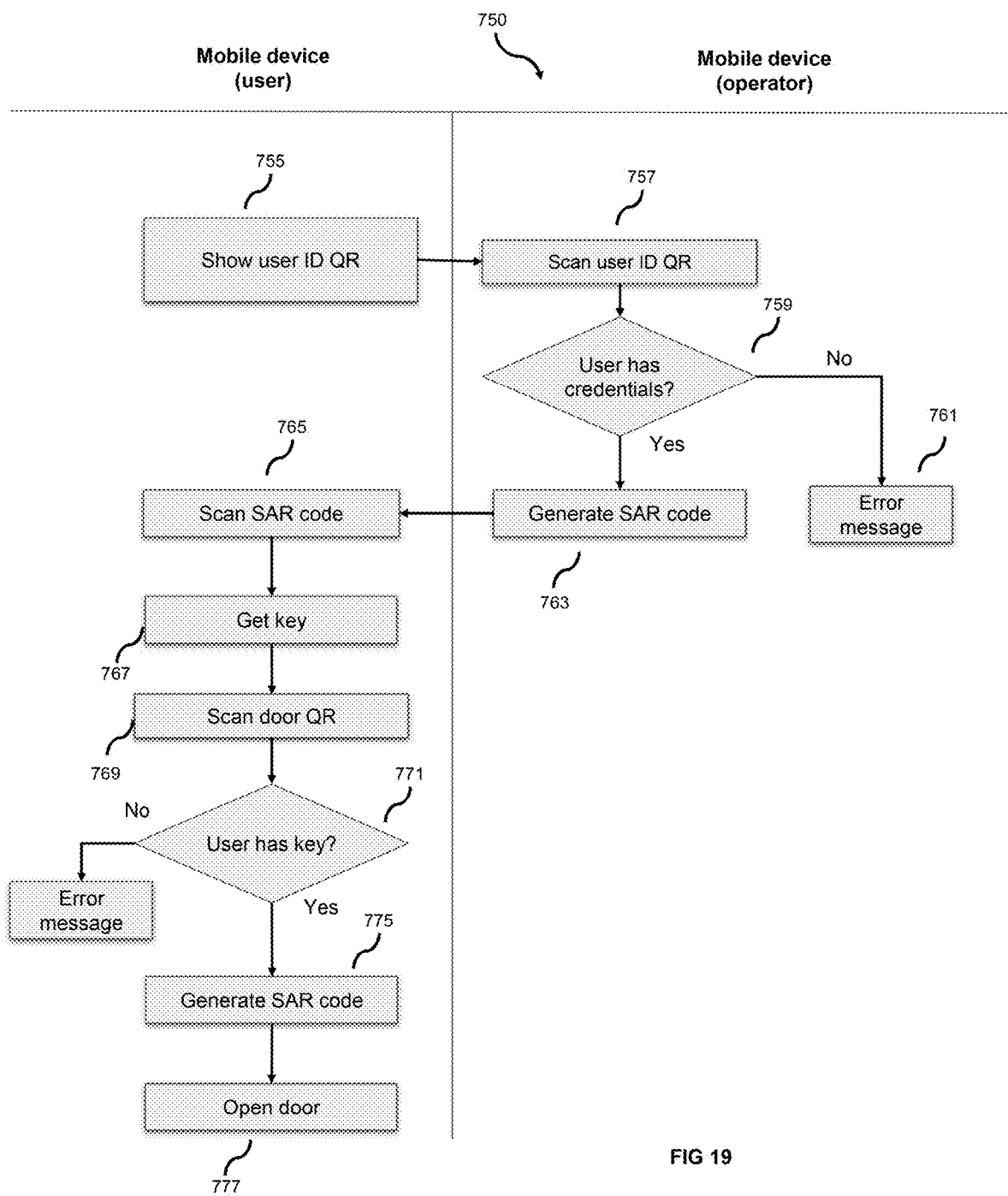
FIG. 19 is a flowchart that illustrates the method steps for a sharing of keys on the site of a preferred embodiment.

FIG. 19 is a flowchart showing the steps of the method 750 for on-site key sharing by generating and reading two-dimensional codes from these devices 13. The method begins when user device 13*a* displays 755 a two-dimensional code containing user information, including data such as user name, user date of birth, card identification number, or any other user information on the screen 122 of the user device 13*a*, and the camera 115 of operator device 13*b* scans or captures 757 this information. By scanning or capturing 757 the two-dimensional code of user device 13*a*, operator device 13*b* determines 759 whether the user has the correct credentials. If it determines 759 that the user does not have the correct credentials, an error message 761 is sent on the operator device 13*b*. If the user is determined 759 to have the correct credentials, the operator device 13*b* generates a plurality of two-dimensional codes 763 that are displayed as a secure animated response code (SAR code), where the plurality of two-dimensional codes can be a plurality of quick response codes (QR codes), where at least one of the two-dimensional codes includes encrypted information that must be validated by user device 13*a*. After generating a plurality of two-dimensional codes 763 and displaying them on the screen 122 of operator device 13*b*, the generated SAR code is scanned and/or read 765 by a camera 115 of the user device 13*a*. The method, by means of the two-dimensional code reader service, is able to read all the two-dimensional codes provided in the SAR code and to distinguish at least one valid two-dimensional code which must be decrypted. The decryption service is capable of decrypting the at least one valid two-dimensional code and validating the information in the at least one two-dimensional code. After scanning 765 the SAR code and decrypting the valid QR code, a key is obtained inside a QR and then scanned on a door 759. Then it is determined 771 whether the user device 13*a* has a key, and if the user device 13 does not have a key, an error message 773 is sent to the user device. If it is determined 771 that the user device has a key, then user device 13*a* generates a plurality of two-dimensional codes 775 which are displayed as a secure animated response code (SAR code), where the plurality of two-dimensional codes may be a plurality of quick response codes (QR codes), where at least one of the two-dimensional codes includes encrypted information and the gateway opens 777.

Figure 20:
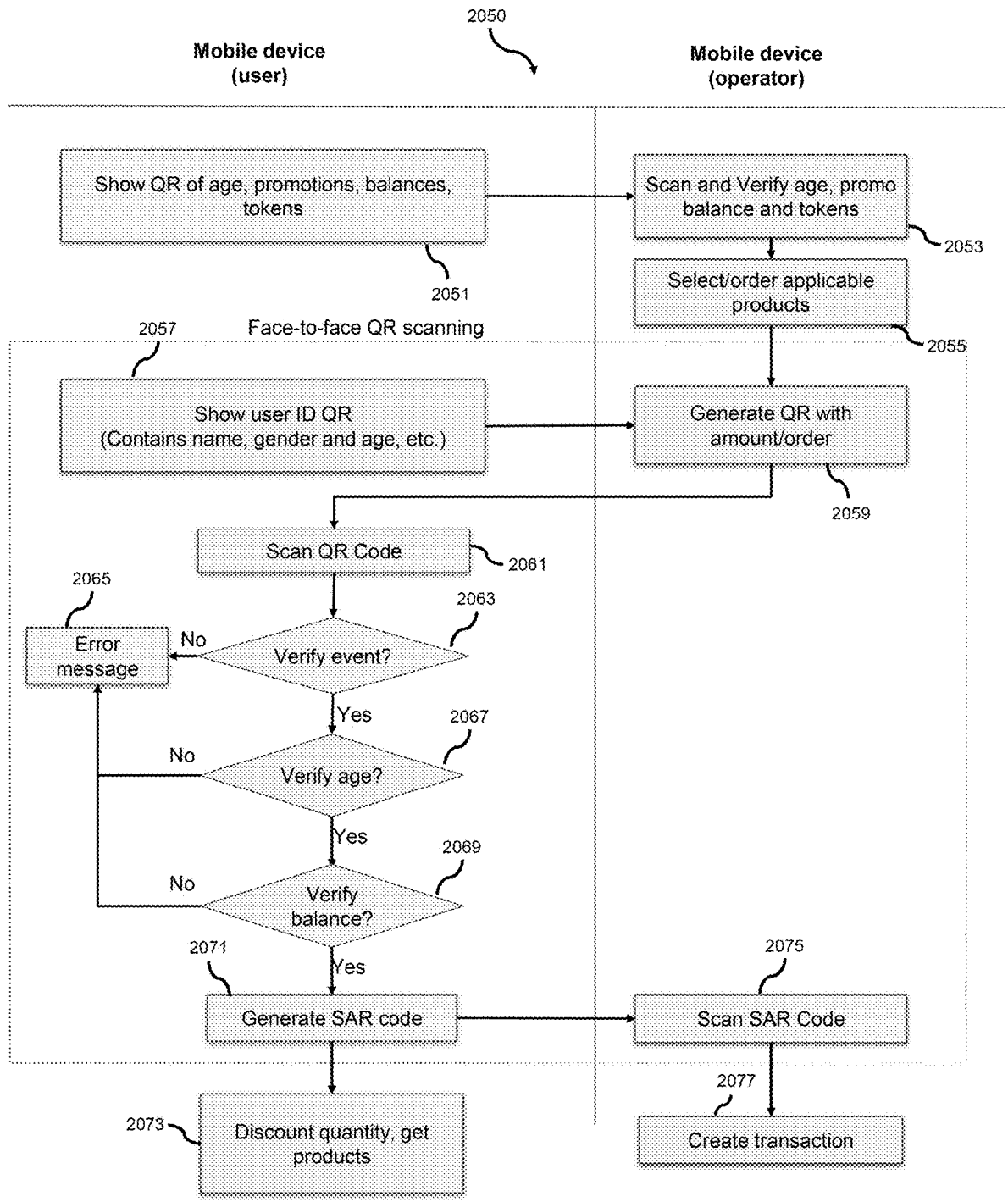
FIG. 20 is a flowchart that illustratively shows the steps of yet another method for an onsite purchase by validating the age and a special offer according to a preferred embodiment.

FIG. 20 is a flow chart showing the method 2050 for an on-site purchase validating age and a promotion, generating and reading two-dimensional codes through these devices 13. The method 2050 starts when user device 13*a* displays a two-dimensional code containing data such as age, promotions, balances and tokens, on the screen 122 of user device 13*a*, and a camera 115 of operator device 13*b* scans or captures 2053 it. When scanning or capturing 2053, the operator device also validates the age, promotions, balance, and tokens required. The operator's device then selects the orders and/or products 2055. In turn, user device 13*a* displays 2057 a two-dimensional code on the screen 122 thereof and this is scanned or captured 353 by the camera 115 of the operator device 13*b*. The two-dimensional code contains user information, including data such as user name, user date of birth, card identification number, or any other user information. The method subsequently generates at least one two-dimensional code 2059 with the selected orders and/or products and information of the two-dimensional code displayed from the user device 13*a*, as well as information on promotions, balances and tokens; in the case of being a plurality of two-dimensional codes, these are displayed as a secure animated response code (SAR code), where the at least one two-dimensional code can be a plurality of quick response codes (QR codes), where the at least one two-dimensional code includes encrypted information to be validated by user device 13a. After generating a plurality of two-dimensional codes 2059 and displaying them on the screen 122 of operator device 13b, the SAR code generated by means of a camera 115a of the user device 13a is scanned and/or read 2061. The two-dimensional code reader service method is able to read all the two-dimensional codes provided in the SAR code and to distinguish at least one valid two-dimensional code which must be decrypted. The decryption service is capable of decrypting at least one valid two-dimensional code and validating the information in the two-dimensional code. Subsequently, the method verifies the event 2063 and if it cannot verify the event 2063, it generates and sends an error message 2065. If it can verify the event 2063, it verifies age 2067, if it cannot verify age 2067, it generates and sends an error message 2065. If it can verify age 2067, it verifies the balance 2069 and if it cannot verify the balance 2069, it generates and sends an error message 2065. If the balance 2069 can be verified, it generates a second plurality of two-dimensional codes 2071 with the balance being displayed as a secure animated response code (SAR code), where the second plurality of two-dimensional codes can be a plurality of quick response codes (QR codes), where at least one of the two-dimensional codes includes encrypted information to be validated by the operator device 13b. The two-dimensional code with the verified information contains information such as the event identifier, a code, an amount and the transaction number, among others. Preferably at this point the amount 2073 is deducted from the off-line user's personal balance account. After generating a second plurality of two-dimensional codes 2071 and displaying them on screen 122 of the user device 13a, the SAR code generated by a camera 115b of the operator device 13b is scanned and/or read 2075. The sub-method from displaying 2057 the two-dimensional code to scanning 2075 the plurality of two-dimensional codes, can be carried out in a face-to-face mode, where mobile devices have at least one camera on the same side as screen 122 and the read/scan method is carried out without operator and/or user intervention regarding turning the respective mobile device. The two-dimensional code reader service method is able to read all of the second plurality of two-dimensional codes provided in the SAR code and to distinguish at least one valid two-dimensional code which must be decrypted. The decryption service is capable of decrypting at least one valid two-dimensional code and validating the information in the two-dimensional code. After scanning and/or reading 2075 the SAR code by means of the operator device 13b, the purchase and the registration/transfer is validated/closed and a new transaction 2077 is created.

Figure 12:
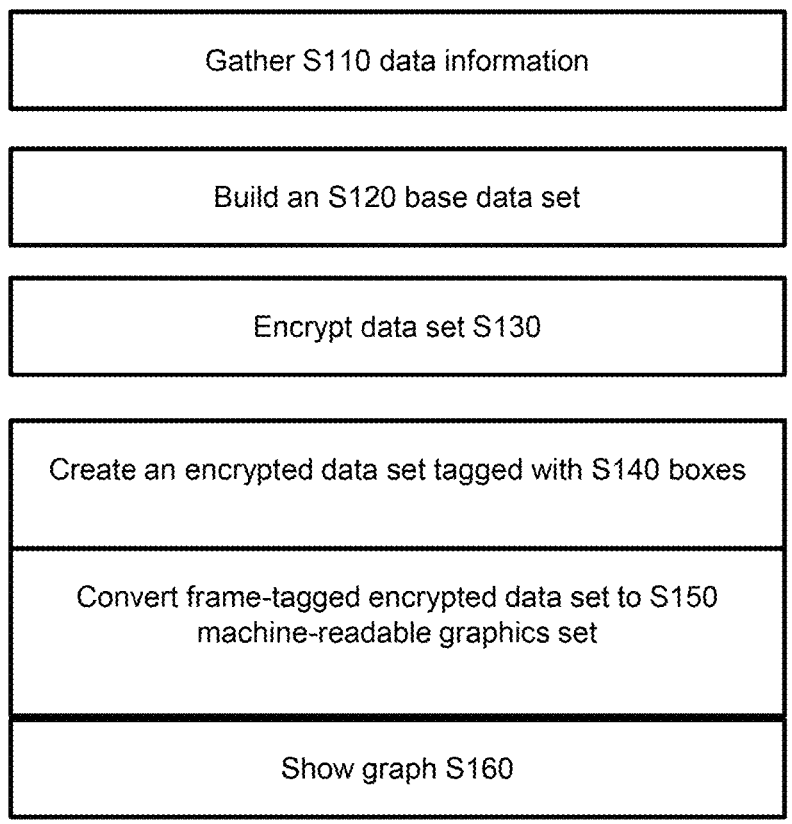
FIG. 12 is an alternative representation as a flowchart of the generation of a SAR code.

As shown in FIG. 12, a method for generating and displaying a SAR code may include mounting data information S110, building a base dataset S120, encrypting the dataset S130, creating a frame encrypted dataset S140, conversion of the frame encrypted dataset to a set of machine-readable graphics S150 and displaying such graphics S160. The mounting of data information works to collect the data to be communicated along with the initial data inputs to initiate the generation of a SAR code. The mounting of data information may include the mounting of information data (for example, the information set to be communicated I={I1, I2, I3, ... Ik}, an encryption key (Ke) a private key (Kprv), and frame number dataset (FN={FN0, FN1, FN2, ... FNk}). The frame number set (FN) preferably includes a plurality of frame numbers ((FN1, FNk, where k>1). The number of frame numbers (k) preferably corresponds to the information with the second dataset (that is, the number of data elements in the second dataset (where the second dataset is I={I1, I2, ... Ik})). Frame numbers FN0-FNk are random numbers, not duplicated from a starting number, min (FN0, FNk), to a final number, max (FN0-FNk), such that they are formatted with at least two digits. The frame numbers FNi and the private key, Kprv are stored in a memory 114, 116, preferably in a flash memory 114. Building a base dataset works for mounting a dataset from the initial data inputs. Each point in the base dataset can include a string of random data. A new dataset S6 is generated, where S={S0, ..., Smin (FN0-FNK) ..., Smax (FN0-FNK), ... Sm}, and 0<min (FN0-FNK)≤max(FN0-FNk)<M), and k is the number of datasets that are a subset of S. That is, that for an information set, I={I1, ..., Ik}, where Ii refers to the i-th information set within I; a corresponding i-th dataset is generated, SFNi=[Ii][RnS], which is an element of the new dataset generated S6. The S6 dataset is random data and not duplicates of a starting number to an end number, formatted with at least two digits. The engine uses a data length of at least 30 bytes, preferably of at least 50 bytes and most preferably of at least 70 bytes. For a new dataset Si 6 it comprises the frame number and a random string (RnS) such that S0=[FN0][RnS]. The FN0 frame data is defined as SFN0=[Kprv][FN1][FN2][FN3] ... [FNk][RnS]. The data of FN1, FN2, FN3, FNk are defined as SFN1=[I1]|[RnS], SFN2=[I2]|[RnS], SFN3=[I3]|[RnS] ... SFNk=[Ik]|[RnS]. Dataset encryption works to create an encrypted dataset. Preferably S0 and SFN0 of the base dataset are encrypted with encryption key Ke, and the remaining points in the base dataset are encrypted with the private key, Kprv. Creating a frame marked encrypted dataset works to prepare the encrypted dataset to represent frame data. Encrypted frame marked data preferably adds (or otherwise adds) a frame number corresponding to the corresponding element in the encrypted dataset. For example Ske' will be equal to [FNk][Sk] for each of k={0, 1, 2, ..., (TotalFrames−1)}. Converting the encrypted frame-in-frame dataset to a set of machine-readable graphic functions to generate a set of QR codes or other machine-readable elements to be presented in a stream. The machine readable graphics set is preferably QR codes, but alternatively it can be other forms of 2D graphic codes or even 1D graphic codes (e.g. barcodes). A machine-readable code graphically represents data that can be reliably interpreted by a machine with imaging capabilities. In one variation, the dataset can be converted to user interface output means, such as audio, vibratory patterns (output via haptic feedback), infrared light patterns (used in projected light cameras), and/or other suitable means of user interface output. The graphics display can display the set of machine-readable graphics. Machine readable graphics are preferably displayed in the designated order thereof indicated by the frame numbers. Alternatively, machine-readable graphics can be displayed out of order or in a continuously changing order. Furthermore, some of the frameworks that lack informational data or data for reading a SAR code can be omitted. Noise frames could also be added. In a variation, each of the different frames is selected and displayed individually to simulate a video or animation. In another variation, the frames are mounted in a video, GIF, or other suitable video format.

Figure 8:
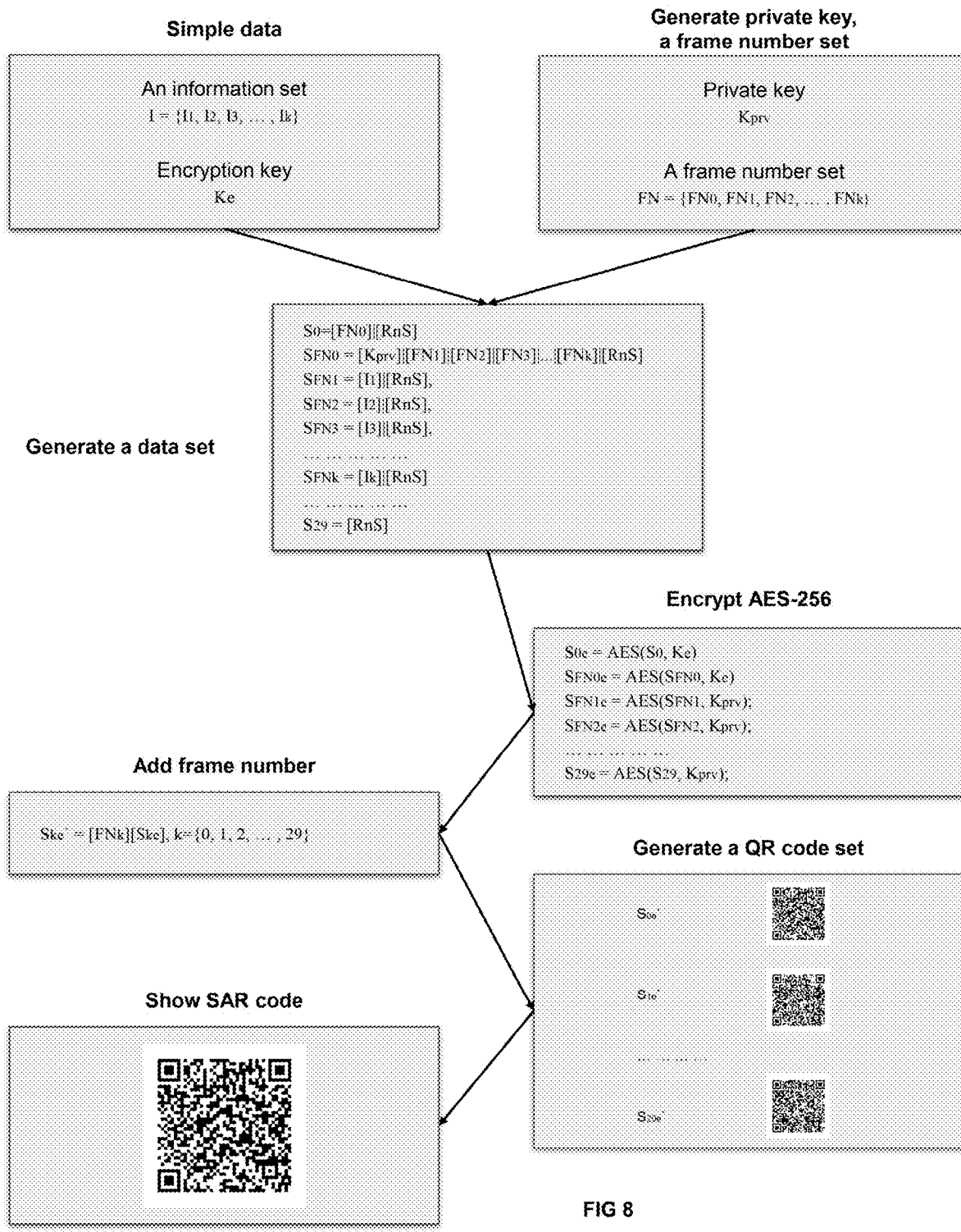
FIG. 8 is a flowchart that shows the generation and encryption of two or more two-dimensional codes in the form of SAR codes of a preferred embodiment.

FIG. 8 is a flowchart showing the generation of two or more two-dimensional codes in the form of a SAR code.

Dataset 2 to be encrypted in the SAR code includes any of the desired or relevant data. As mentioned above, the data may include an event identifier, a user name, the gender of the user, a code, such as a transaction code and/or an event code, the age of the user, etc., amongst other data. Dataset 2 preferably includes an encryption key, wherein the encryption key and the dataset are stored in a memory 114, 116, preferably in a flash memory 114. As part of FIG. 8, the generation of a second dataset 4 to be encrypted in the SAR code can also be included, the second dataset 4 including a private Kprv key to encrypt the data, with a random and/or pseudorandom character string that can have 8 or more bytes. A frame that includes a frame number FN and the private key Kprv is generated for the second dataset 4. A plurality of frame numbers FNk is generated and the number of frames FNi stored in i times the Ii information is stored. Frame numbers FN0~FNk are random, non-duplicated numbers from an initial number to a final number that are formatted with at least two digits. The frame numbers FNk and the private key Kprv are stored in a memory 114, 116, preferably in a flash memory 114. From the first dataset 2 and the second dataset 4, a new dataset S6 is generated by an algorithm engine, where the number of datasets S6 is random and not duplicated from an initial number to a final number, formatted with at least two digits. The engine uses a data length of at least 30 bytes, preferably of at least 50 bytes and most preferably of at least 70 bytes. The new dataset S6 comprises the frame number and a random string RNS such that S0=[FN0][RnS]. The FN0 frame data is defined as SFN0=[Kprv][FN1][FN2][FN3] ... [FNk][RnS]. The data of FN1, FN2, FN3, FNk are defined as SFN1= [I1]|[RnS], SFN2=[I2]|[RnS], SFN3=[I3]|[RnS] SFNk= [Ik]|[RnS]. In order to avoid hacking or piracy, the engine uses random strings as additional data. To improve security, the engine can use 8 types of AES-256 encryption and at least two keys or another technology that uses similar or higher standards, where one key (Ke) is the public key and the other key (Kprv) is the private key. S0 and SFN0 are encrypted with the Kmi key, while other data is encrypted with the Kprv key, such that:

S0e=AES(S0,Ke)
SFN0e=AES(SFN0,Ke)
SFN1e=AES(SFN1,Kprv)
SFN2e=AES(SFN2,Kprv)
...
SFN29e=AES(SFN29,Kprv)

In addition to decoding the SAR code, the set is changed by adding a frame number 10 to the front of each of datum, so that Ske'=[FNk][Ske], k=(0, 1, 2, . . . , 29)

In this example, 30 frames are used as an example, but any suitable number of frameworks or value k can be used. After adding a frame number 10, the two-dimensional code set is generated 12, corresponding to each of the data using a ZXing library or the like. The size of a preferred two-dimensional code is 300×300 pixels and this set of two-dimensional codes is stored in memory, preferably in an image format. At the end of this process, the SAR code is shown 14 in the method to display a two-dimensional code at a rate of at least 1 every 70 ms, preferably 1 two-dimensional code every 40 ms. To prevent hacking, the SAR code is not stored in the device 13, it is only temporarily stored in the memory 114, 116.

Figure 13:
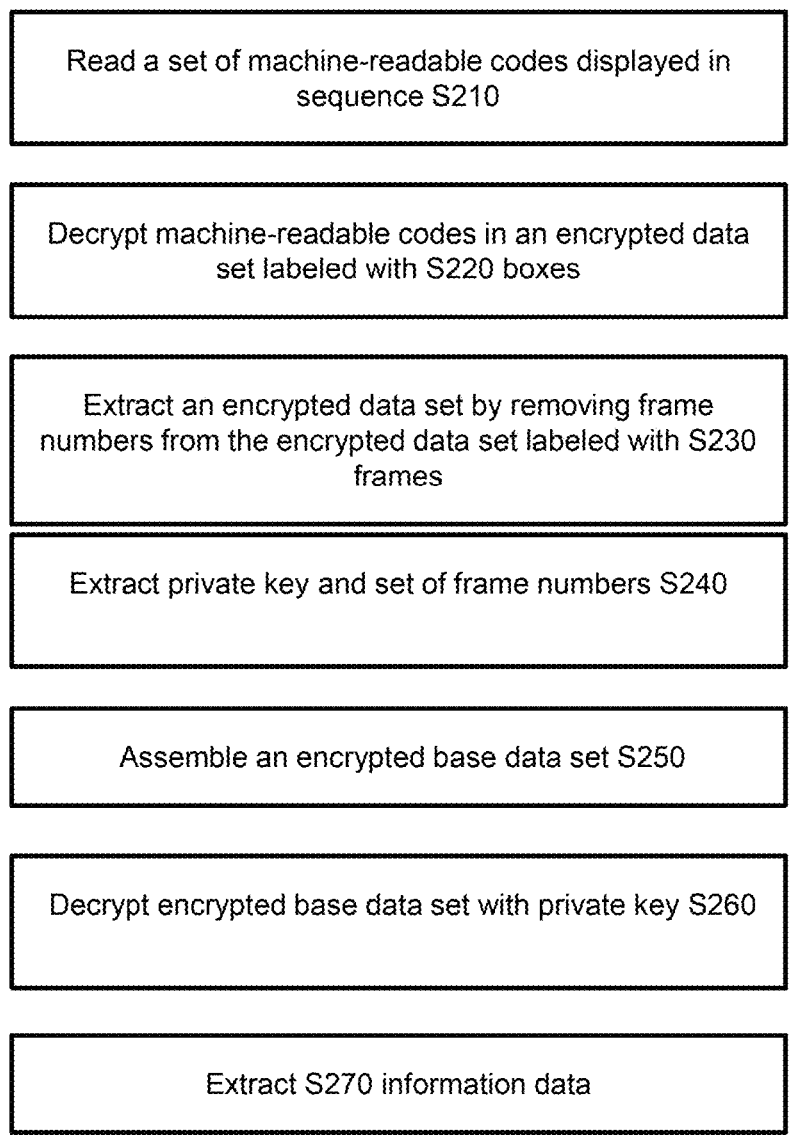
FIG. 13 is an alternative representation as a flowchart of the reading of a SAR code.

As shown in FIG. 13, reading and interpreting the SAR code preferably includes reading a set of machine-readable codes shown in sequence S210, decryption of machine-readable codes in a set of encrypted frame-marked data S220, extracting an encrypted dataset created by removing frame numbers from the encrypted frame marked dataset S230, extracting the private key and frame number set S240, mounting an encrypted base dataset S250, decryption of the encrypted base dataset with the private key S260, and extraction of the information data S270.

Figure 9:
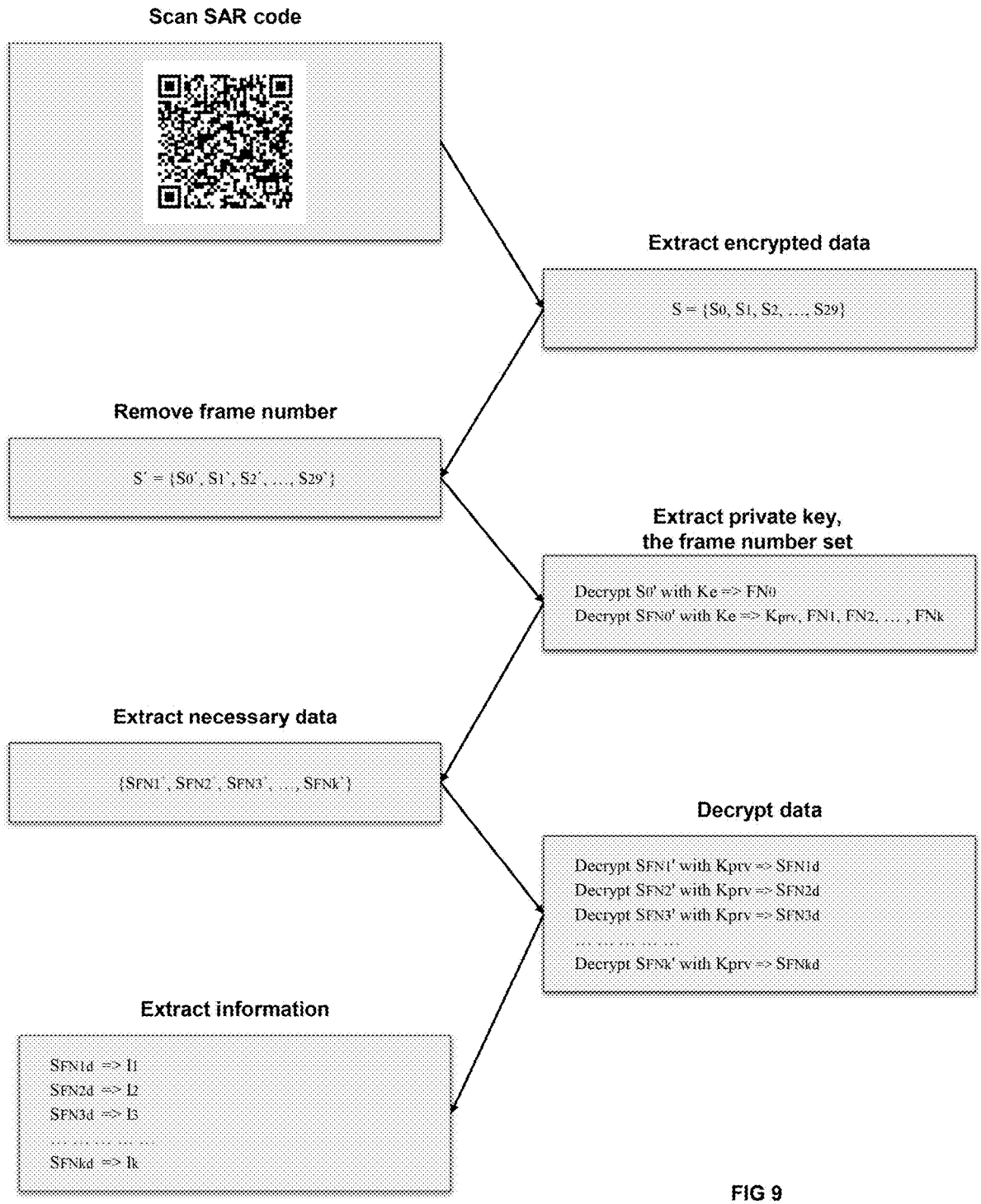
FIG. 9 is a flowchart that shows the decryption of previously encrypted two-dimensional codes in the form of SAR codes of a preferred embodiment.

FIG. 9 is a flowchart showing the decryption of previously encrypted two-dimensional SAR codes. Using the camera, the device 13 provides captured image data 20 to the processor 112 for storage in memory 114, 116 and/or processing with a ZXing library or similar; the engine extracts all frames 22 (two-dimensional code set) from the SAR code and converts them into an encrypted dataset:

S=(S0, S1, S2, . . . , S29)

Before encryption, the frame number is removed from each of the data in such a way that:

S'=(S'0, S'1, S'2, . . . , S'29)

This set is stored in memory 114, 116 for decryption. Each encrypted datum starts with a prefixed frame number; therefore the engine extracts FN0 from S0' (first frame data) by decrypting 26 the AES-256 with the public key, Ke. When S0' is decrypted with Ke, FN0 is extracted. FN0 is then stored in memory 114, 116 to extract the private key and other frame numbers. The private key (Kprv) and the frame number set, FN=(FN1, FN2, FN3 FNk), are extracted to decrypt SFN0 (AES-256 with Ke key). The Kprv and the FN are stored in memory 114, 116 to decrypt the dataset. Using the frame number set (FN), the engine extracts the necessary data 28 from S'(SFN1', SFN2', SFN3', SFNk'). The data of SFN1', SFN2', SFN3', SFN1k' is decrypted with the AES-256 private key (Kprv), therefore when decrypting with the private key Kprv:

SFN1'=>SFN1d
SFN2'=>SFN2d
SFN3'=>SFN3d
...
SFNk'=>SFNkd

From each decrypted datum, the engine extracts the corresponding information 32, for example from:

SFN1d=>
SFN2d=>12
SFN3 d=>13
...
SFNkd=>Ik in such a way that all the information is decrypted and extracted from the SAR code.

Unless previously defined herein, the terms and expressions used herein should be understood in the normal sense given to these terms and expressions with respect to the respective areas of study thereof, except, as mentioned above, in those defined above. Relationship terms such as above, below, first, second, and the like can only be used to distinguish one entity or action from another, without the need to necessarily imply such a current relationship or request between such entities or actions. The terms "comprises", "includes" "contains" or any other variant thereof are intended to make a non-exclusive inclusion such that a process, method, article, system, device or product comprising a list of elements not only includes those elements but may also include other elements which are not expressly listed or inherent to the process, method, article, system, device or product. The brief description of the invention is provided to acquaint the reader with the technical nature of the description. It is provided with the understanding that it will not be used to interpret or limit the scope or meaning of the claims. Furthermore, in the detailed description, several features that are grouped into various embodiments can be seen in order to give a correct understanding of the description. This way of describing should not be interpreted as reflecting an intention that the claimed embodiments require more characteristics than those expressly stated in each claim. On the contrary, as the following claims reflect, the inventive features lie in fewer than all the characteristics of a described embodiment. Therefore, the following claims are incorporated into the detailed description, with each claim cited separately as subject matter to be claimed. While some aspects have been described in the context of an device, it is evident that these aspects also represent a description of the corresponding method, where a block or device corresponds to a process step or a characteristic of a process step. Similarly, aspects described in the context of a method step represent a description of a corresponding or characteristic block or element of a corresponding device. Depending on certain requirements for implementation, the embodiments of the invention can be implemented on hardware or software. It can be implemented using a digital storage medium, e.g. a floppy disk, DVD, CD, ROM, PROM, EPROM, EEPROM or FLASH memory, containing stored electronically readable control signals, that cooperate (or are able to cooperate) with a computer programmable system such that the respective method is carried out. Some embodiments according to the invention comprise a data carrier that has electronically readable control signals, which are capable of cooperating with a computer programmable system, such as to execute one of the methods described herein. Generally, the embodiments of the present invention can be implemented as a computer program product with a program code, the program code being operational to perform one of the methods when the computer program runs on a computer. The program code may, for example, be stored on a machine-readable carrier. While the above description has been described with the best modalities and/or other examples, it is understood that various modifications may apply or can be made to it and that the subject matter described herein can be implemented in various forms and examples, and that such concepts can be carried out in different applications, some of which have been described above. The following claims are intended to claim any and all applications, modifications and variations that fall within the scope of the concepts herein.

The invention claimed is:

1. A system for transferring encrypted data between electronic devices, the system comprising:
    a first electronic device with an input/output interface, a memory and a processor;
    a second electronic device with an input/output interface, a memory and a processor;
    where the devices are configured to:
    display at least one first encrypted two-dimensional code on the output interface of the first electronic device;
    read the at least one first encrypted two-dimensional code with the input interface of the second electronic device and decrypting the at least one first two-dimensional code with the processor and memory of the second electronic device;
    generate at least one second two-dimensional code encrypted with the processor and memory of the second electronic device in response to the decryption of the first two-dimensional code, and displaying the at least one second two-dimensional code at the output interface of the second electronic device; and
    read the at least one second two-dimensional code with the input interface of the first electronic device and decrypting the at least one second two-dimensional code with the processor of the first electronic device;
    wherein generating the at least one first encrypted two-dimensional code or the at least second encrypted two-dimensional code comprises:
    generating a dataset to be transferred that comprises a first dataset and a second dataset with a character string, the first and second datasets comprising a frame with a random and non-duplicate frame number, and a key to encrypt the data from the other dataset, the dataset to be transferred further comprising a frame number and a random string,
    encrypting the dataset to be transferred with a first public key and encrypting second data from the dataset to be transferred with a second private key, and
    creating a box-tagged encrypted dataset and converting the box-tagged encrypted dataset to a processor-readable set of graphics;
    wherein decrypting the at least one first code or the at least second encrypted two-dimensional code comprises
    extracting all frames from the transferred two-dimensional code and remove the frame number from each dataset;
    converting the frames into an encrypted dataset and decrypting the frame data with the public key;
    extracting the private key and frame number set, decrypting the datasets with the private key and extracting information data;
    wherein the dataset comprises identification data of an event, a name and a unique code.

2. The system of claim 1, wherein the at least one second two-dimensional code is a plurality of two-dimensional codes displayed in secure animated response video format at a rate of at least 1 every 70 ms, preferably 1 two-dimensional code every 40 ms, wherein the at least second two-dimensional code is not stored in the second electronic device and where the electronic devices do not have an active network connection and/or an active connection therebetween.

3. A system for transferring encrypted data between electronic devices, the system comprising:
    a first electronic device with an input/output interface, a memory and a processor;
    a second electronic device with an input/output interface, a memory and a processor;
    where the devices are configured to:
    display at least one first encrypted two-dimensional code on the output interface of the first electronic device;
    read the at least one first two-dimensional code with the input interface of the second electronic device and decrypting the at least one first two-dimensional code with the processor and memory of the second electronic device;
    generate at least one second two-dimensional code encrypted with the processor and memory of the second electronic device in response to the decryption of the first two-dimensional code, and displaying the at least one second two-dimensional code at the output interface of the second electronic device; and
    read the at least one second two-dimensional code with the input interface of the first electronic device and decrypting the at least one second two-dimensional code with the processor of the first electronic device;
    wherein reading and decrypting the at least first two-dimensional code with the processor and memory of the second electronic device additionally comprises:

verifying the validity of event data and privileges received in the first two-dimensional code on the second electronic device;
verifying that an entry time is correct in the case that the event data and privileges are correct on the second electronic device;
placing the second electronic device in a queue, generating a two-dimensional code on the first electronic device that is read by the input interface of the second electronic device;
generating the second two-dimensional code in the case that the event and privilege and in the case that the entry time has been verified as correct in the second electronic device; and
removing an access on the second electronic device.

4. The system of claim 3, wherein the method further comprises:
verifying if updates are available if the event data and privileges are not valid on the second electronic device;
using a balance to validate the event and privileges in the case that updates are available on the second mobile device; and
saving a reminder and key on the second electronic device.

5. A system for transferring encrypted data between electronic devices, the system comprising:
a first electronic device with an input/output interface, a memory and a processor;
a second electronic device with an input/output interface, a memory and a processor;
where the devices are configured to:
display at least one first encrypted two-dimensional code on the output interface of the first electronic device;
read the at least one first two-dimensional code with the input interface of the second electronic device and decrypting the at least one first two-dimensional code with the processor and memory of the second electronic device;
generate at least one second two-dimensional code encrypted with the processor and memory of the second electronic device in response to the decryption of the first two-dimensional code, and displaying the at least one second two-dimensional code at the output interface of the second electronic device; and
read the at least one second two-dimensional code with the input interface of the first electronic device and decrypting the at least one second two-dimensional code with the processor of the first electronic device;
wherein reading and decrypting the at least first two-dimensional code with the processor and memory of the second electronic device additionally comprises:
editing and selecting personal information to share in the case that a user wants to share personal information on the second electronic device;
generating the second two-dimensional code upon completion of editing and selecting the information to be shared on the second electronic device;
allowing data access and profile creation on the first electronic device.

6. A system for transferring encrypted data between electronic devices, the system comprising:
a first electronic device with an input/output interface, a memory and a processor;
a second electronic device with an input/output interface, a memory and a processor;
where the devices are configured to:
display at least one first encrypted two-dimensional code on the output interface of the first electronic device;
read the at least one first two-dimensional code with the input interface of the second electronic device and decrypting the at least one first two-dimensional code with the processor and memory of the second electronic device;
generate at least one second two-dimensional code encrypted with the processor and memory of the second electronic device in response to the decryption of the first two-dimensional code, and displaying the at least one second two-dimensional code at the output interface of the second electronic device; and
read the at least one second two-dimensional code with the input interface of the first electronic device and decrypting the at least one second two-dimensional code with the processor of the first electronic device;
where reading and decrypting the at least first two-dimensional code with the processor and memory of the second electronic device additionally comprises:
verifying if an identifier of an event corresponds to an event in the second electronic device;
selecting an amount to reload, thus generating the second two-dimensional code;
creating a transaction on the second electronic device; and
recharging the amount determined on the first electronic device.

7. A system for transferring encrypted data between electronic devices, the system comprising:
a first electronic device with an input/output interface, a memory and a processor;
a second electronic device with an input/output interface, a memory and a processor;
where the devices are configured to:
display at least one first encrypted two-dimensional code on the output interface of the first electronic device;
read the at least one first two-dimensional code with the input interface of the second electronic device and decrypting the at least one first two-dimensional code with the processor and memory of the second electronic device;
generate at least one second two-dimensional code encrypted with the processor and memory of the second electronic device in response to the decryption of the first two-dimensional code, and displaying the at least one second two-dimensional code at the output interface of the second electronic device; and
read the at least one second two-dimensional code with the input interface of the first electronic device and decrypting the at least one second two-dimensional code with the processor of the first electronic device;
where reading and decrypting the at least first two-dimensional code with the processor and memory of the second electronic device additionally comprises:
verifying if an identifier of an event corresponds to an event in the second electronic device;
select orders and/or products;
verifying a balance in the first electronic device, and if the balance corresponds, then generating the second two-dimensional code;
discounting an amount on the first electronic device; and
creating a transaction by reading the first two-dimensional code on the second electronic device.

8. A system for transferring encrypted data between electronic devices, the system comprising:
a first electronic device with an input/output interface, a memory and a processor;

a second electronic device with an input/output interface, a memory and a processor;
where the devices are configured to:
display at least one first encrypted two-dimensional code on the output interface of the first electronic device;
read the at least one first two-dimensional code with the input interface of the second electronic device and decrypting the at least one first two-dimensional code with the processor and memory of the second electronic device;
generate at least one second two-dimensional code encrypted with the processor and memory of the second electronic device in response to the decryption of the first two-dimensional code, and displaying the at least one second two-dimensional code at the output interface of the second electronic device; and
read the at least one second two-dimensional code with the input interface of the first electronic device and decrypting the at least one second two-dimensional code with the processor of the first electronic device;
wherein reading and decrypting the at least first two-dimensional code with the processor and memory of the second electronic device additionally comprises:
verifying if an identifier of an event corresponds to an event and if there is a balance in the second electronic device, and thus generating the second two-dimensional code if the identifier of the event is verified to correspond to the event and there is a balance in the second electronic device;
removing an amount on the second electronic device;
selecting a refund method on the first electronic device; and
creating a transaction on the first electronic device.

9. A system for transferring encrypted data between electronic devices, the system comprising:
a first electronic device with an input/output interface, a memory and a processor;
a second electronic device with an input/output interface, a memory and a processor;
where the devices are configured to:
display at least one first encrypted two-dimensional code on the output interface of the first electronic device;
read the at least one first two-dimensional code with the input interface of the second electronic device and decrypting the at least one first two-dimensional code with the processor and memory of the second electronic device;
generate at least one second two-dimensional code encrypted with the processor and memory of the second electronic device in response to the decryption of the first two-dimensional code, and displaying the at least one second two-dimensional code at the output interface of the second electronic device; and
read the at least one second two-dimensional code with the input interface of the first electronic device and decrypting the at least one second two-dimensional code with the processor of the first electronic device;
wherein the system is configured to perform a method comprising:
linking a card to the first electronic device, wherein data linked to the card includes a personal identification code (PIN);
wherein reading and decrypting the at least first two-dimensional code with the processor and memory of the second electronic device or wherein reading and decrypting the at least second two-dimensional code with the processor and memory of the first electronic device comprises:
selecting orders/products on the second electronic device, thus generating the second two-dimensional code on the second electronic device;
generating a new two-dimensional code and storing a transaction request on the first electronic device;
reading and decrypting the new two-dimensional code on the second electronic device;
verifying the validity of data and creating a transaction in case the data is valid on the second electronic device; and
obtaining orders/products in case the transaction is created in the second electronic device or by storing the transaction request in the first electronic device.

10. A system for transferring encrypted data between electronic devices, the system comprising:
a first electronic device with an input/output interface, a memory and a processor;
a second electronic device with an input/output interface, a memory and a processor;
where the devices are configured to:
display at least one first encrypted two-dimensional code on the output interface of the first electronic device;
read the at least one first two-dimensional code with the input interface of the second electronic device and decrypting the at least one first two-dimensional code with the processor and memory of the second electronic device;
generate at least one second two-dimensional code encrypted with the processor and memory of the second electronic device in response to the decryption of the first two-dimensional code, and displaying the at least one second two-dimensional code at the output interface of the second electronic device; and
read the at least one second two-dimensional code with the input interface of the first electronic device and decrypting the at least one second two-dimensional code with the processor of the first electronic device;
wherein reading and decrypting the at least first two-dimensional code with the processor and memory of the first electronic device additionally comprises:
verifying the legitimacy of the two-dimensional code with a card shown by a user to an operator;
validating the user's card;
generating the second two-dimensional code on the second electronic device and authenticating the card on the second electronic device; and
reading the second two-dimensional code on the first electronic device and obtaining the card authentication on the first electronic device.

11. A system for transferring encrypted data between electronic devices, the system comprising:
a first electronic device with an input/output interface, a memory and a processor;
a second electronic device with an input/output interface, a memory and a processor;
where the devices are configured to:
display at least one first encrypted two-dimensional code on the output interface of the first electronic device;
read the at least one first two-dimensional code with the input interface of the second electronic device and decrypting the at least one first two-dimensional code with the processor and memory of the second electronic device;

generate at least one second two-dimensional code encrypted with the processor and memory of the second electronic device in response to the decryption of the first two-dimensional code, and displaying the at least one second two-dimensional code at the output interface of the second electronic device; and read the at least one second two-dimensional code with the input interface of the first electronic device and decrypting the at least one second two-dimensional code with the processor of the first electronic device;

wherein the system is configured to perform a method comprising:

updating a document;

wherein reading and decrypting the at least first two-dimensional code with the processor and memory of the first electronic device additionally comprises:

authenticating a card based on a user card;

generating the second two-dimensional code on the first electronic device;

determining, on the first electronic device, whether the document is ready to be electronically signed;

generating, on the second electronic device, a third two-dimensional code if the document is ready to be electronically signed and determining if another user or witness must be added to the document; and authenticating, on the second electronic device, the document including the second and third two-dimensional codes.

12. A system for transferring encrypted data between electronic devices, the system comprising:

a first electronic device with an input/output interface, a memory and a processor;

a second electronic device with an input/output interface, a memory and a processor;

where the devices are configured to:

display at least one first encrypted two-dimensional code on the output interface of the first electronic device;

read the at least one first two-dimensional code with the input interface of the second electronic device and decrypting the at least one first two-dimensional code with the processor and memory of the second electronic device;

generate at least one second two-dimensional code encrypted with the processor and memory of the second electronic device in response to the decryption of the first two-dimensional code, and displaying the at least one second two-dimensional code at the output interface of the second electronic device; and read the at least one second two-dimensional code with the input interface of the first electronic device and decrypting the at least one second two-dimensional code with the processor of the first electronic device;

wherein reading and decrypting the at least first two-dimensional code with the processor and memory of the first electronic device additionally comprises:

determining if a document was signed by a user;

if the document was not signed by the user, determining if the user has a valid card;

if the document was signed by the user or if the user has a valid card, generating the second two-dimensional code on the first electronic device;

obtaining an access key on the second electronic device; and opening the document with the access key on the second electronic device.

13. A system for transferring encrypted data between electronic devices, the system comprising:

a first electronic device with an input/output interface, a memory and a processor;

a second electronic device with an input/output interface, a memory and a processor;

where the devices are configured to:

display at least one first encrypted two-dimensional code on the output interface of the first electronic device;

read the at least one first two-dimensional code with the input interface of the second electronic device and decrypting the at least one first two-dimensional code with the processor and memory of the second electronic device;

generate at least one second two-dimensional code encrypted with the processor and memory of the second electronic device in response to the decryption of the first two-dimensional code, and displaying the at least one second two-dimensional code at the output interface of the second electronic device; and read the at least one second two-dimensional code with the input interface of the first electronic device and decrypting the at least one second two-dimensional code with the processor of the first electronic device;

wherein reading and decrypting the at least first two-dimensional code with the processor and memory of the first electronic device additionally comprises:

determining if a user has a valid card;

generating the second two-dimensional code on the first electronic device if the user's card is determined to be valid;

obtaining a key on the second electronic device and scanning another two-dimensional code displayed on a gateway;

determining, on the second electronic device, whether the user has the correct key and generating a third two-dimensional code on the second electronic device, if the key is determined to be correct; and displaying the third two-dimensional code on the gateway and opening the gateway in view of the third two-dimensional code.

14. A system for transferring encrypted data between electronic devices, the system comprising:

a first electronic device with an input/output interface, a memory and a processor;

a second electronic device with an input/output interface, a memory and a processor;

where the devices are configured to:

display at least one first encrypted two-dimensional code on the output interface of the first electronic device;

read the at least one first two-dimensional code with the input interface of the second electronic device and decrypting the at least one first two-dimensional code with the processor and memory of the second electronic device;

generate at least one second two-dimensional code encrypted with the processor and memory of the second electronic device in response to the decryption of the first two-dimensional code, and displaying the at least one second two-dimensional code at the output interface of the second electronic device; and read the at least one second two-dimensional code with the input interface of the first electronic device and decrypting the at least one second two-dimensional code with the processor of the first electronic device;

wherein the method further comprises:

linking a card and a reload with the second electronic device;

wherein reading and decrypting the at least first two-dimensional code with the processor and memory of the second electronic device additionally comprises:
determining whether the card has a balance;
determining whether the card has a credit limit;
determining a payment method;
discounting an amount on the first electronic device;
determining whether there is a data signal and processing a payment in connection with the data signal; and
wherein reading and decrypting the at least second two-dimensional code with the processor and memory of the first electronic device additionally comprises:
creating a transaction; and
wherein by determining whether there is a data signal in the second electronic device, it is determined whether there is a data signal in the first electronic device.

15. A system for transferring encrypted data between electronic devices, the system comprising:
a first electronic device with an input/output interface, a memory and a processor;
a second electronic device with an input/output interface, a memory and a processor;
where the devices are configured to:
display at least one first encrypted two-dimensional code on the output interface of the first electronic device;
read the at least one first two-dimensional code with the input interface of the second electronic device and decrypting the at least one first two-dimensional code with the processor and memory of the second electronic device;
generate at least one second two-dimensional code encrypted with the processor and memory of the second electronic device in response to the decryption of the first two-dimensional code, and displaying the at least one second two-dimensional code at the output interface of the second electronic device; and
read the at least one second two-dimensional code with the input interface of the first electronic device and decrypting the at least one second two-dimensional code with the processor of the first electronic device;
wherein reading and decrypting the at least first two-dimensional code with the processor and memory of the second electronic device additionally comprises:
determining whether an application is correct and whether it is correct to generate the second two-dimensional code; and
wherein reading and decrypting the at least second two-dimensional code with the processor and memory of the first electronic device additionally comprises:
determining if there is a data signal and if there is a data signal, processing a login or a start of an apparatus and downloading data corresponding to the second electronic device using the data signal.

* * * * *